US012707467B2

(12) United States Patent
Huang et al.

(10) Patent No.: US 12,707,467 B2
(45) Date of Patent: Aug. 11, 2026

(54) UPLINK REFERENCE SIGNAL ASSOCIATION METHOD AND COMMUNICATION APPARATUS

(71) Applicant: HUAWEI TECHNOLOGIES CO., LTD., Shenzhen (CN)

(72) Inventors: Su Huang, Shanghai (CN); Xin Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 644 days.

(21) Appl. No.: 18/190,324

(22) Filed: Mar. 27, 2023

(65) Prior Publication Data

US 2023/0232405 A1 Jul. 20, 2023

Related U.S. Application Data

(63) Continuation of application No. PCT/CN2021/120609, filed on Sep. 26, 2021.

(30) Foreign Application Priority Data

Sep. 28, 2020 (CN) ......................... 202011045811.5

(51) Int. Cl.
*H04W 72/02* (2009.01)
*H04W 72/21* (2023.01)

(52) U.S. Cl.
CPC .................................... *H04W 72/21* (2023.01)

(58) Field of Classification Search
CPC . H04B 7/06956; H04B 7/0691; H04B 7/0404
See application file for complete search history.

(56) References Cited

U.S. PATENT DOCUMENTS

2017/0338926 A1 11/2017 Takata et al.
2021/0152397 A1* 5/2021 Jiang ..................... H04L 5/0048
(Continued)

FOREIGN PATENT DOCUMENTS

CN 105589506 A 5/2016
CN 109150467 A 1/2019
(Continued)

OTHER PUBLICATIONS

Ericsson, "Signalling Sequence Correction for UL SRS Configuration", 3GPP TSG-RAN Meeting #111-e, R2-2008495, Aug. 17-28, 2020, 7 pages.

(Continued)

*Primary Examiner* — Bo Hui A Zhu
(74) *Attorney, Agent, or Firm* — Maier & Maier, PLLC

(57) ABSTRACT

An uplink reference signal association method and a communication apparatus. The method includes: a first network device generates first configuration information, where the first configuration information indicates an association relationship between uplink reference signals simultaneously sent on different carriers, and the uplink reference signals having the association relationship share an antenna port or the uplink reference signals having the association relationship have a phase difference. The first network device sends the first configuration information to a terminal device. Through implementation, configuration of a large-bandwidth uplink reference signal can be implemented.

19 Claims, 20 Drawing Sheets

(56) References Cited

U.S. PATENT DOCUMENTS

| | | | | |
|---|---|---|---|---|
| 2021/0352613 | A1* | 11/2021 | Yoon | H04W 56/001 |
| 2022/0060307 | A1* | 2/2022 | Manolakos | H04L 5/0048 |
| 2022/0124636 | A1* | 4/2022 | Kim | H04W 52/14 |

FOREIGN PATENT DOCUMENTS

| | | | |
|---|---|---|---|
| EP | 4201128 | A1 | 6/2023 |
| WO | 2020000304 | A1 | 1/2020 |
| WO | 2020155362 | A1 | 8/2020 |
| WO | 2020164334 | A1 | 8/2020 |

OTHER PUBLICATIONS

Huawei et al., "SRS Design for NR Positioning", 3GPP TSG RAN WG1 Meeting #97, R1-1906053, May 13-17, 2019, 9 pages.
Qualcomm Incorporated, "Enhancements on SRS Flexibility, Switching, Coverage and Capacity", 3GPP TSG-RAN WG1 Meeting #102-e, R1-2006795, Aug. 17-28, 2020, 27 pages.
Qualcomm, "NR Positioning for Rel-17 Qualcomm Views", 3GPP RAN #84, Newport Beach, Jun. 3-6, 2019, RP-190861, 7 pages.
3GPP TS 38.305 V16.1.0, 3rd Generation Partnership Project; Technical Specification Group Radio Access Network; NG Radio Access Network (NG-RAN); Stage 2 Functional Specification of User Equipment (UE) Positioning in NG-RAN (Release 16), Jul. 2020, 114 pages.
3GPP TS 38.211 V16.2.0, 3rd Generation Partnership Project; Technical Specification Group Radio Access Network; NR; Physical Channels and Modulation (Release 16), Jun. 2020, 131 pages.

* cited by examiner

CONT. FROM FIG. 7A
CONT. FROM FIG. 7A
CONT. FROM FIG. 7A

TO FIG. 7C
TO FIG. 7C
TO FIG. 7C

UPLINK REFERENCE SIGNAL ASSOCIATION METHOD AND COMMUNICATION APPARATUS

CROSS-REFERENCE TO RELATED APPLICATIONS

This application is a continuation of International Application No. PCT/CN2021/120609, filed on Sep. 26, 2021, which claims priority to Chinese Patent Application No. 202011045811.5, filed on Sep. 28, 2020. The disclosures of the aforementioned applications are hereby incorporated by reference in their entireties.

TECHNICAL FIELD

The embodiments relate to the field of positioning technologies, an uplink reference signal association method, and a communication apparatus.

BACKGROUND

In a mobile communication system, positioning a terminal device is one of important functions. Current positioning technologies include a downlink positioning technology and an uplink positioning technology. The uplink positioning technology means that the terminal device sends an uplink reference signal to a network device. For example, the uplink reference signal may be a sounding reference signal (SRS). The network device measures the uplink reference signal and sends a measurement result to a location management device. The location management device determines location information of the terminal device based on the measurement result.

However, it is found in practice that currently, in a low-frequency communication system, positioning precision of the positioning technology is not high. A main reason is that a maximum bandwidth of a single uplink reference signal in a low-frequency NR communication system is 100 MHz, and precision of a positioning method that is based on timing ranging is directly associated with a bandwidth. A larger bandwidth may indicate higher ranging precision. Therefore, how to enhance an existing uplink reference signal configuration structure to implement configuration of a large-bandwidth uplink reference signal, and therefore improve positioning precision is a problem that needs to be urgently resolved currently.

SUMMARY

The embodiments may provide an uplink reference signal association method and a communication apparatus, to implement configuration of a large-bandwidth uplink reference signal.

According to a first aspect, the embodiments may provide an uplink reference signal association method. The method includes: A first network device generates first configuration information, where the first configuration information indicates an association relationship between uplink reference signals simultaneously sent on different carriers, and the uplink reference signals having the association relationship share an antenna port or the uplink reference signals having the association relationship have a phase difference. The first network device sends the first configuration information to a terminal device.

In the method described in the first aspect, a network side can configure, for the terminal device, which uplink reference signals share an antenna port or which uplink reference signals have a phase difference. That a plurality of uplink reference signals share an antenna port indicates that the plurality of uplink reference signals pass through a completely same channel. It may be equivalently considered as that the terminal device sends a new uplink reference signal, and a bandwidth of the new uplink reference signal is equal to a sum of bandwidths of the plurality of uplink reference signals. Therefore, enabling the plurality of uplink reference signals to share the antenna port can enlarge a signal bandwidth. Therefore, configuration of a large-bandwidth uplink reference signal can be implemented by configuring, for the terminal device, which uplink reference signals share an antenna port. By configuring, for the terminal device, which uplink reference signals have a phase difference, the network device may estimate the phase difference between these uplink reference signals, and then compensate for a channel phase of the uplink reference signal based on the phase difference, so that a plurality of uplink reference signals share an antenna port, and therefore a signal bandwidth is enlarged. Therefore, configuration of a large-bandwidth uplink reference signal can also be implemented by configuring, for the terminal device, which uplink reference signals have a phase difference.

In a possible implementation, the first network device generates second configuration information, where the second configuration information indicates an association relationship between uplink reference signals simultaneously sent on different carriers; and the first network device sends the second configuration information to a location management device. Based on this possible implementation, the association relationship between the uplink reference signals simultaneously sent on the different carriers may be indicated to the location management device by using the second configuration information, so that the location management device may indicate, to a second network device, the association relationship between the uplink reference signals simultaneously sent on the different carriers. Therefore, the second network device may perform joint measurement on the uplink reference signals having the association relationship, to obtain a measurement result.

In a possible implementation, the first configuration information further indicates that the uplink reference signals having the association relationship share the antenna port or the uplink reference signals having the association relationship have the fixed phase difference; and/or the second configuration information further indicates that the uplink reference signals having the association relationship share an antenna port or the uplink reference signals having the association relationship have a fixed phase difference. Based on this possible implementation, a type of the association relationship can be flexibly configured for the terminal device and/or the location management device.

In a possible implementation, in a process in which the terminal device sends the uplink reference signals having the association relationship, the phase difference between the uplink reference signals having the association relationship is a fixed value. Optionally, that the phase difference between the uplink reference signals having the association relationship changes very slightly in the process in which the terminal device sends the uplink reference signals having the association relationship may also be understood as that the phase difference between the uplink reference signals having the association relationship is a fixed value in the process in which the terminal device sends the uplink reference signals having the association relationship. The phase difference between the uplink reference signals having the association relationship is set to the fixed value in the process in which the terminal device sends the uplink reference signals having the association relationship. This helps the terminal device accurately estimate the phase difference between the uplink reference signals having the association relationship.

In a possible implementation, when the uplink reference signals have a plurality of antenna ports, same antenna port numbers of the uplink reference signals having the association relationship correspond to a same antenna port. In other words, when the uplink reference signals have a plurality of antenna ports, the same antenna port numbers of the uplink reference signals having the association relationship share an antenna port.

In a possible implementation, a manner in which the first configuration information indicates the association relationship between the uplink reference signals simultaneously sent on the different carriers may be: The first configuration information indicates an association relationship between uplink reference signal resources simultaneously sent on the different carriers. In other words, the first configuration information may indicate the association relationship between the uplink reference signals simultaneously sent on the different carriers by indicating the association relationship between the uplink reference signal resources simultaneously sent on the different carriers. In this way, the association relationship between the uplink reference signals simultaneously sent on the different carriers can be accurately indicated. For example, if the first configuration information indicates that there is an association relationship between an uplink reference signal resource 1 and an uplink reference signal resource 2 that are simultaneously sent on different carriers, the first configuration information is equivalent to indicating that there is an association relationship between an uplink reference signal corresponding to the uplink reference signal resource 1 and an uplink reference signal corresponding to the uplink reference signal resource 2.

Optionally, the first configuration information includes configuration information of a plurality of carriers, the configuration information of the carrier includes an index of the carrier and configuration information of a bandwidth part (BWP) on the carrier, the configuration information of the BWP includes an index of the BWP and configuration information of an uplink reference signal resource set in the BWP, and the configuration information of the uplink reference signal resource set includes an index of the uplink reference signal resource set and configuration information of an uplink reference signal resource in the uplink reference signal resource set. The first configuration information may indicate, in the following three implementations, the association relationship between the uplink reference signal resources simultaneously sent on the different carriers.

1. Configuration information of a first uplink reference signal resource set further includes at least one piece of first index information, and the first index information includes an index of a second carrier, an index of a second BWP on the second carrier, and an index of a second uplink reference signal resource set in the second BWP, to indicate that simultaneously sent uplink reference signal resources in the first uplink reference signal resource set and at least one second uplink reference signal resource set have an association relationship, where the first uplink reference signal resource set and the at least one second uplink reference signal resource set are resource sets configured on different carriers based on the first configuration information. The manner 1 is equivalent to indicating the association relationship between the uplink reference signal resources simultaneously sent on the different carriers by indicating an association relationship between uplink reference signal resource sets on the different carriers. This helps reduce signaling overheads.

2. Configuration information of a first BWP further includes at least one piece of second index information, and the second index information includes an index of a second carrier and an index of a second BWP on the second carrier, to indicate that simultaneously sent uplink reference signal resources in the first BWP and at least one second BWP have an association relationship, where the first BWP and the second BWP are BWPs configured on different carriers based on the first configuration information. The manner 2 is equivalent to indicating the association relationship between the uplink reference signal resources simultaneously sent on the different carriers by indicating an association relationship between BWPs on the different carriers. This helps reduce signaling overheads.

3. Configuration information of a first carrier further includes an index of at least one second carrier, to indicate that simultaneously sent uplink reference signal resources on the first carrier and the at least one second carrier have an association relationship, where the first carrier and the second carrier are different carriers configured based on the first configuration information. The manner 3 is equivalent to indicating the association relationship between the uplink reference signal resources simultaneously sent on the different carriers by indicating an association relationship between the different carriers. This helps reduce signaling overheads.

Optionally, the index of the second carrier includes one or both of the following: an index of a serving cell in which the second carrier is located, and indication information indicating that the second carrier is a normal uplink carrier or a supplementary uplink carrier of the serving cell in which the second carrier is located.

Optionally, the uplink reference signal resource is a sounding reference signal SRS resource, the configuration information of the first BWP further includes an SRS configuration (SRS-Config), and the SRS configuration includes the at least one piece of second index information.

In another possible implementation, a manner in which the first configuration information indicates the association relationship between the uplink reference signals simultaneously sent on the different carriers may be: The first configuration information indicates an association relationship between uplink reference signal resource sets on the different carriers. For an implementation in which the first configuration information indicates the association relationship between the uplink reference signal resource sets on the different carriers, refer to the descriptions in the manner 1. Details are not described herein. For example, if the first configuration information indicates that there is an association relationship between a first uplink reference signal resource set and at least one second uplink reference signal resource set, there is an association relationship between simultaneously sent uplink reference signals in the first uplink reference signal resource set and the at least one second uplink reference signal resource set. Indicating, in this possible implementation, the association relationship between the uplink reference signals simultaneously sent on the different carriers helps reduce signaling overheads.

In still another possible implementation, a manner in which the first configuration information indicates the association relationship between the uplink reference signals simultaneously sent on the different carriers may be: The first configuration information indicates an association relationship between BWPs on the different carriers. For an implementation in which the first configuration information indicates the association relationship between the BWPs on the different carriers, refer to the descriptions in the manner 2. Details are not described herein. For example, if the first configuration information indicates that there is an association relationship between a first BWP and at least one second BWP, there is an association relationship between simultaneously sent uplink reference signals in the first BWP and the at least one second BWP. Indicating, in this possible implementation, the association relationship between the uplink reference signals simultaneously sent on the different carriers helps reduce signaling overheads.

In yet another possible implementation, a manner in which the first configuration information indicates the association relationship between the uplink reference signals simultaneously sent on the different carriers may be: The first configuration information indicates an association relationship between the different carriers. For an implementation in which the first configuration information indicates the association relationship between the different carriers, refer to the descriptions in the manner 3. Details are not described herein. For example, if the first configuration information indicates that there is an association relationship between a first carrier and at least one second carrier, there is an association relationship between simultaneously sent uplink reference signals on the first carrier and the at least one second carrier. Indicating, in this possible implementation, the association relationship between the uplink reference signals simultaneously sent on the different carriers helps reduce signaling overheads.

In a possible implementation, a manner in which the second configuration information indicates the association relationship between the uplink reference signals simultaneously sent on the different carriers may be: The second configuration information indicates an association relationship between uplink reference signal resources simultaneously sent on the different carriers. In other words, the second configuration information may indicate the association relationship between the uplink reference signals simultaneously sent on the different carriers by indicating the association relationship between the uplink reference signal resources simultaneously sent on the different carriers. In this way, the association relationship between the uplink reference signals simultaneously sent on the different carriers can be accurately indicated. For example, if the second configuration information indicates that there is an association relationship between an uplink reference signal resource 1 and an uplink reference signal resource 2 that are simultaneously sent on different carriers, the second configuration information is equivalent to indicating that there is an association relationship between an uplink reference signal corresponding to the uplink reference signal resource 1 and an uplink reference signal corresponding to the uplink reference signal resource 2.

Optionally, the second configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set. The second configuration information may indicate, in the following two implementations, the association relationship between the uplink reference signal resources simultaneously sent on the different carriers.

1. Configuration information of a third uplink reference signal resource set further includes at least one piece of third index information, and the third index information includes an index of a fourth carrier and an index of a fourth uplink reference signal resource set on the fourth carrier, to indicate that simultaneously sent uplink reference signal resources in the third uplink reference signal resource set and at least one fourth uplink reference signal resource set have an association relationship, where the third uplink reference signal resource set and the at least one fourth uplink reference signal resource set are resource sets configured on different carriers based on the second configuration information. The manner 1 is equivalent to indicating the association relationship between the uplink reference signal resources simultaneously sent on the different carriers by indicating an association relationship between uplink reference signal resource sets on the different carriers. This helps reduce signaling overheads.

2. Configuration information of a third carrier further includes an index of at least one fourth carrier, to indicate that simultaneously sent uplink reference signal resources on the third carrier and the at least one fourth carrier have an association relationship, where the third carrier and the at least one fourth carrier are different carriers configured based on the second configuration information. The manner 2 is equivalent to indicating the association relationship between the uplink reference signal resources simultaneously sent on the different carriers by indicating an association relationship between the different carriers. This helps reduce signaling overheads.

Optionally, the index of the fourth carrier includes one or both of the following: an index of a serving cell in which the fourth carrier is located, and indication information indicating that the fourth carrier is a normal uplink carrier or a supplementary uplink carrier of the serving cell in which the fourth carrier is located.

In another possible implementation, a manner in which the second configuration information indicates the association relationship between the uplink reference signals simultaneously sent on the different carriers may be: The second configuration information indicates an association relationship between uplink reference signal resource sets on the different carriers. For an implementation in which the second configuration information indicates the association relationship between the uplink reference signal resource sets on the different carriers, refer to the descriptions in the manner 1 in which the second configuration information indicates the association relationship between the uplink reference signal resources simultaneously sent on the different carriers. Details are not described herein. For example, if the second configuration information indicates that there is an association relationship between a third uplink reference signal resource set and at least one fourth uplink reference signal resource set, there is an association relationship between simultaneously sent uplink reference signals in the third uplink reference signal resource set and the at least one fourth uplink reference signal resource set. Indicating, in this possible implementation, the association relationship between the uplink reference signals simultaneously sent on the different carriers helps reduce signaling overheads.

In still another possible implementation, a manner in which the second configuration information indicates the association relationship between the uplink reference signals simultaneously sent on the different carriers may be: The second configuration information indicates an association relationship between the different carriers. For an implementation in which the second configuration information indicates the association relationship between the different carriers, refer to the descriptions in the manner 2 in which the second configuration information indicates the association relationship between the uplink reference signal resources simultaneously sent on the different carriers. Details are not described herein. For example, if the second configuration information indicates that there is an association relationship between a third carrier and at least one fourth carrier, there is an association relationship between simultaneously sent uplink reference signals on the third carrier and the at least one fourth carrier. Indicating, in this possible implementation, the association relationship between the uplink reference signals simultaneously sent on the different carriers helps reduce signaling overheads.

In a possible implementation, the first network device receives capability information reported by the terminal device, where the capability information indicates whether the terminal device supports a plurality of simultaneously sent uplink reference signals in sharing an antenna port or indicates whether the terminal device supports a plurality of simultaneously sent uplink reference signals in having a phase difference. In this possible implementation, the first network device may accurately determine, based on the capability information of the terminal device, how to configure the uplink reference signal resources for the terminal device. Alternatively, the first network device may perform another operation based on the capability information of the terminal device.

In a possible implementation, the capability information is reported per frequency band, per frequency band group, per frequency band per frequency band group, or per frequency band group subset per frequency band group. In this possible implementation, the capability information of the terminal device can be reported at a fine granularity.

In a possible implementation, the first network device receives first information sent by the location management device, where the first information is used to request the first network device to configure uplink reference signals of a preset bandwidth, where the preset bandwidth is greater than 100 megahertz (MHz) or the preset bandwidth is greater than 400 MHz; or the first information is used to request the first network device to configure the association relationship between the uplink reference signals simultaneously sent on the different carriers. In this possible implementation, the location management device can request, in an implicit or explicit manner, the first network device to configure the association relationship between the uplink reference signal resources simultaneously sent on the different carriers.

In a possible implementation, the first information is further used to request the uplink reference signals having the association relationship to share the antenna port or the uplink reference signals having the association relationship to have the phase difference. In this possible implementation, the location management device can recommend, to the first network device based on capability information of the network device used to measure the uplink reference signal, a type of the association relationship that should be configured. This helps the first network device properly configure the type of the association relationship.

According to a second aspect, the embodiments may provide an uplink reference signal association method. The method includes: A terminal device receives first configuration information, where the first configuration information indicates an association relationship between uplink reference signals simultaneously sent on different carriers, and the uplink reference signals having the association relationship share an antenna port or the uplink reference signals having the association relationship have a phase difference. The terminal device sends the uplink reference signals having the association relationship.

In a possible implementation, the first configuration information further indicates that the uplink reference signals having the association relationship share the antenna port or the uplink reference signals having the association relationship have the phase difference.

In a possible implementation, in a process in which the terminal device sends the uplink reference signals having the association relationship, the phase difference between the uplink reference signals having the association relationship is a fixed value. Optionally, that the phase difference between the uplink reference signals having the association relationship changes very slightly in the process in which the terminal device sends the uplink reference signals having the association relationship may also be understood as that the phase difference between the uplink reference signals having the association relationship is a fixed value in the process in which the terminal device sends the uplink reference signals having the association relationship.

In a possible implementation, when the uplink reference signals have a plurality of antenna ports, same antenna port numbers of the uplink reference signals having the association relationship correspond to a same antenna port. In other words, when the uplink reference signals have a plurality of antenna ports, the same antenna port numbers of the uplink reference signals having the association relationship share an antenna port.

In a possible implementation, a manner in which the first configuration information indicates the association relationship between the uplink reference signals simultaneously sent on the different carriers may be: The first configuration information indicates an association relationship between uplink reference signal resources simultaneously sent on the different carriers.

Optionally, the first configuration information includes configuration information of a plurality of carriers, the configuration information of the carrier includes an index of the carrier and configuration information of a bandwidth part (BWP) on the carrier, the configuration information of the BWP includes an index of the BWP and configuration information of an uplink reference signal resource set in the BWP, and the configuration information of the uplink reference signal resource set includes an index of the uplink reference signal resource set and configuration information of an uplink reference signal resource in the uplink reference signal resource set. The first configuration information may indicate, in the following three implementations, the association relationship between the uplink reference signal resources simultaneously sent on the different carriers.

1. Configuration information of a first uplink reference signal resource set further includes at least one piece of first index information, and the first index information includes an index of a second carrier, an index of a second BWP on the second carrier, and an index of a second uplink reference signal resource set in the second BWP, to indicate that simultaneously sent uplink reference signal resources in the first uplink reference signal resource set and at least one second uplink reference signal resource set have an association relationship, where the first uplink reference signal resource set and the at least one second uplink reference signal resource set are resource sets configured on different carriers based on the first configuration information.

2. Configuration information of a first BWP further includes at least one piece of second index information, and the second index information includes an index of a second carrier and an index of a second BWP on the second carrier, to indicate that simultaneously sent uplink reference signal resources in the first BWP and at least one second BWP have an association relationship, where the first BWP and the at least one second BWP are BWPs configured on different carriers based on the first configuration information.

3. Configuration information of a first carrier further includes an index of at least one second carrier, to indicate that simultaneously sent uplink reference signal resources on the first carrier and the at least one second carrier have an association relationship, where the first carrier and the at least one second carrier are different carriers configured based on the first configuration information.

Optionally, the index of the second carrier includes one or both of the following: an index of a serving cell in which the second carrier is located, and indication information indicating that the second carrier is a normal uplink carrier or a supplementary uplink carrier of the serving cell in which the second carrier is located.

Optionally, the uplink reference signal resource is a sounding reference signal SRS resource, the configuration information of the first BWP further includes an SRS configuration (SRS-Config), and the SRS configuration includes the at least one piece of second index information.

In another possible implementation, a manner in which the first configuration information indicates the association relationship between the uplink reference signals simultaneously sent on the different carriers may be: The first configuration information indicates an association relationship between uplink reference signal resource sets on the different carriers. For an implementation in which the first configuration information indicates the association relationship between the uplink reference signal resource sets on the different carriers, refer to the descriptions in the manner 1 in which the first configuration information indicates the association relationship between the uplink reference signal resources simultaneously sent on the different carriers. Details are not described herein. For example, if the first configuration information indicates that there is an association relationship between a first uplink reference signal resource set and at least one second uplink reference signal resource set, there is an association relationship between simultaneously sent uplink reference signals in the first uplink reference signal resource set and the at least one second uplink reference signal resource set.

In still another possible implementation, a manner in which the first configuration information indicates the association relationship between the uplink reference signals simultaneously sent on the different carriers may be: The first configuration information indicates an association relationship between BWPs on the different carriers. For an implementation in which the first configuration information indicates the association relationship between the BWPs on the different carriers, refer to the descriptions in the manner 2 in which the first configuration information indicates the association relationship between the uplink reference signal resources simultaneously sent on the different carriers. Details are not described herein. For example, if the first configuration information indicates that there is an association relationship between a first BWP and at least one second BWP, there is an association relationship between simultaneously sent uplink reference signals in the first BWP and the at least one second BWP.

In yet another possible implementation, a manner in which the first configuration information indicates the association relationship between the uplink reference signals simultaneously sent on the different carriers may be: The first configuration information indicates an association relationship between the different carriers. For an implementation in which the first configuration information indicates the association relationship between the different carriers, refer to the descriptions in the manner 3 in which the first configuration information indicates the association relationship between the uplink reference signal resources simultaneously sent on the different carriers. Details are not described herein. For example, if the first configuration information indicates that there is an association relationship between a first carrier and at least one second carrier, there is an association relationship between simultaneously sent uplink reference signals on the first carrier and the at least one second carrier.

In a possible implementation, the terminal device reports capability information to a first network device, where the capability information indicates whether the terminal device supports a plurality of simultaneously sent uplink reference signals in sharing an antenna port or indicates whether the terminal device supports a plurality of simultaneously sent uplink reference signals in having a phase difference.

In a possible implementation, the terminal device reports the capability information to a location management device, where the capability information indicates whether the terminal device supports a plurality of simultaneously sent uplink reference signals in sharing an antenna port, or indicates whether the terminal device supports a plurality of simultaneously sent uplink reference signals in having a phase difference.

In a possible implementation, the capability information is reported per frequency band, per frequency band group, per frequency band per frequency band group, or per frequency band group subset per frequency band group.

In a possible implementation, the terminal device may send the uplink reference signals having the association relationship. If the terminal device supports a plurality of simultaneously sent uplink reference signals in sharing an antenna port, or supports a plurality of simultaneously sent uplink reference signals in having a phase difference, the terminal device sends the uplink reference signals having the association relationship, and enables the uplink reference signals having the association relationship to share the antenna port or have the phase difference. Based on this possible implementation, the terminal device can successfully send the uplink reference signals.

According to a third aspect, the embodiments may provide an uplink reference signal association method. The method includes: A location management device receives second configuration information sent by a first network device, where the second configuration information indicates an association relationship between uplink reference signals simultaneously sent on different carriers, and the uplink reference signals having the association relationship share an antenna port or the uplink reference signals having the association relationship have a phase difference. The location management device sends third configuration information to a second network device, where the third configuration information indicates an association relationship between uplink reference signals simultaneously sent on different carriers.

In a possible implementation, the second configuration information further indicates that the uplink reference signals having the association relationship share the antenna port or the uplink reference signals having the association relationship have the phase difference; and/or the third configuration information further indicates that the uplink reference signals having the association relationship share an antenna port or the uplink reference signals having the association relationship have a phase difference.

In a possible implementation, in a process in which a terminal device sends the uplink reference signals having the association relationship, the phase difference between the uplink reference signals having the association relationship is a fixed value.

In a possible implementation, when the uplink reference signals have a plurality of antenna ports, same antenna port numbers of the uplink reference signals having the association relationship correspond to a same antenna port.

In a possible implementation, a manner in which the second configuration information indicates the association relationship between the uplink reference signals simultaneously sent on the different carriers may be: The second configuration information indicates an association relationship between uplink reference signal resources simultaneously sent on the different carriers.

Optionally, the second configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set. The second configuration information may indicate, in the following two implementations, the association relationship between the uplink reference signal resources simultaneously sent on the different carriers.

1. Configuration information of a third uplink reference signal resource set further includes at least one piece of third index information, and the third index information includes an index of a fourth carrier and an index of a fourth uplink reference signal resource set on the fourth carrier, to indicate that simultaneously sent uplink reference signal resources in the third uplink reference signal resource set and at least one fourth uplink reference signal resource set have an association relationship, where the third uplink reference signal resource set and the at least one fourth uplink reference signal resource set are resource sets configured on different carriers based on the second configuration information.

2. Configuration information of a third carrier further includes an index of at least one fourth carrier, to indicate that simultaneously sent uplink reference signal resources on the third carrier and the at least one fourth carrier have an association relationship, where the third carrier and the at least one fourth carrier are different carriers configured based on the second configuration information.

Optionally, the index of the fourth carrier includes one or both of the following: an index of a serving cell in which the fourth carrier is located, and indication information indicating that the fourth carrier is a normal uplink carrier or a supplementary uplink carrier of the serving cell in which the fourth carrier is located.

In another possible implementation, a manner in which the second configuration information indicates the association relationship between the uplink reference signals simultaneously sent on the different carriers may be: The second configuration information indicates an association relationship between uplink reference signal resource sets on the different carriers. For an implementation in which the second configuration information indicates the association relationship between the uplink reference signal resource sets on the different carriers, refer to the descriptions in the manner 1 in which the second configuration information indicates the association relationship between the uplink reference signal resources simultaneously sent on the different carriers. Details are not described herein. For example, if the second configuration information indicates that there is an association relationship between a third uplink reference signal resource set and at least one fourth uplink reference signal resource set, there is an association relationship between simultaneously sent uplink reference signals in the third uplink reference signal resource set and the at least one fourth uplink reference signal resource set.

In still another possible implementation, a manner in which the second configuration information indicates the association relationship between the uplink reference signals simultaneously sent on the different carriers may be: The second configuration information indicates an association relationship between the different carriers. For an implementation in which the second configuration information indicates the association relationship between the different carriers, refer to the descriptions in the manner 2 in which the second configuration information indicates the association relationship between the uplink reference signal resources simultaneously sent on the different carriers. Details are not described herein. For example, if the second configuration information indicates that there is an association relationship between a third carrier and at least one fourth carrier, there is an association relationship between simultaneously sent uplink reference signals on the third carrier and the at least one fourth carrier.

In a possible implementation, a manner in which the third configuration information indicates the association relationship between the uplink reference signals simultaneously sent on the different carriers may be: The third configuration information indicates an association relationship between uplink reference signal resources simultaneously sent on the different carriers.

Optionally, the third configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set. The third configuration information may indicate, in the following two implementations, the association relationship between the uplink reference signal resources simultaneously sent on the different carriers.

1. Configuration information of a fifth uplink reference signal resource set further includes at least one piece of fourth index information, and the fourth index information includes an index of a sixth carrier and an index of a sixth uplink reference signal resource set on the sixth carrier, to indicate that simultaneously sent uplink reference signal resources in the fifth uplink reference signal resource set and at least one sixth uplink reference signal resource set have an association relationship, where the fifth uplink reference signal resource set and the at least one sixth uplink reference signal resource set are resource sets configured on different carriers based on the third configuration information.

2. Configuration information of a fifth carrier further includes an index of at least one sixth carrier, to indicate that simultaneously sent uplink reference signal resources on the fifth carrier and the at least one sixth carrier have an association relationship, where the fifth carrier and the at least one sixth carrier are different carriers configured based on the third configuration information.

Optionally, the index of the sixth carrier includes one or both of the following: an index of a serving cell in which the sixth carrier is located, and indication information indicating that the sixth carrier is a normal uplink carrier or a supplementary uplink carrier of the serving cell in which the sixth carrier is located.

In another possible implementation, a manner in which the third configuration information indicates the association relationship between the uplink reference signals simultaneously sent on the different carriers may be: The third configuration information indicates an association relationship between uplink reference signal resource sets on the different carriers. For an implementation in which the third configuration information indicates the association relationship between the uplink reference signal resource sets on the different carriers, refer to the descriptions in the manner 1 in which the third configuration information indicates the association relationship between the uplink reference signal resources simultaneously sent on the different carriers. Details are not described herein. For example, if the third configuration information indicates that there is an association relationship between a fifth uplink reference signal resource set and at least one sixth uplink reference signal resource set, there is an association relationship between simultaneously sent uplink reference signals in the fifth uplink reference signal resource set and the at least one sixth uplink reference signal resource set.

In still another possible implementation, a manner in which the third configuration information indicates the association relationship between the uplink reference signals simultaneously sent on the different carriers may be: The third configuration information indicates an association relationship between the different carriers. For an implementation in which the third configuration information indicates the association relationship between the different carriers, refer to the descriptions in the manner 2 in which the third configuration information indicates the association relationship between the uplink reference signal resources simultaneously sent on the different carriers. Details are not described herein. For example, if the third configuration information indicates that there is an association relationship between a fifth carrier and at least one sixth carrier, there is an association relationship between simultaneously sent uplink reference signals on the fifth carrier and the at least one sixth carrier.

In a possible implementation, the location management device sends first information to the first network device, where the first information is used to request the first network device to configure uplink reference signals of a preset bandwidth, where the preset bandwidth is greater than 100 megahertz (MHz) or the preset bandwidth is greater than 400 MHz; or the first information is used to request the first network device to configure the association relationship between the uplink reference signals simultaneously sent on the different carriers.

In a possible implementation, the first information is further used to request the uplink reference signals having the association relationship to share the antenna port or the uplink reference signals having the association relationship to have the phase difference.

In a possible implementation, the location management device receives capability information reported by the terminal device, where the capability information indicates whether the terminal device supports a plurality of simultaneously sent uplink reference signals in sharing an antenna port or indicates whether the terminal device supports a plurality of simultaneously sent uplink reference signals in having a phase difference.

In a possible implementation, the capability information is reported per frequency band, per frequency band group, per frequency band per frequency band group, or per frequency band group subset per frequency band group.

In a possible implementation, the location management device receives a measurement result sent by the second network device, where the measurement result is obtained by the second network device by measuring the uplink reference signals having the association relationship, and the measurement result includes indexes of resource sets in which the uplink reference signals having the association relationship are located and/or indexes of carriers on which the uplink reference signals having the association relationship are located. Based on this possible implementation, the location management device can determine uplink reference signal resources based on which the measurement result is obtained through measurement.

According to a fourth aspect, the embodiments may provide an uplink reference signal association method. The method includes: A second network device receives third configuration information, where the third configuration information indicates an association relationship between uplink reference signals simultaneously sent on different carriers, and the uplink reference signals having the association relationship share an antenna port or the uplink reference signals having the association relationship have a phase difference. The second network device measures the uplink reference signals having the association relationship.

In a possible implementation, the third configuration information further indicates that the uplink reference signals having the association relationship share the antenna port or the uplink reference signals having the association relationship have the phase difference.

In a possible implementation, in a process in which a terminal device sends the uplink reference signals having the association relationship, the phase difference between the uplink reference signals having the association relationship is a fixed value.

In a possible implementation, when the uplink reference signals have a plurality of antenna ports, same antenna port numbers of the uplink reference signals having the association relationship correspond to a same antenna port.

In a possible implementation, a manner in which the third configuration information indicates the association relationship between the uplink reference signals simultaneously sent on the different carriers may be: The third configuration information indicates an association relationship between uplink reference signal resources simultaneously sent on the different carriers.

Optionally, the third configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set. The third configuration information may indicate, in the following two implementations, the association relationship between the uplink reference signal resources simultaneously sent on the different carriers.

1. Configuration information of a fifth uplink reference signal resource set further includes at least one piece of fourth index information, and the fourth index information includes an index of a sixth carrier and an index of a sixth uplink reference signal resource set on the sixth carrier, to indicate that simultaneously sent uplink reference signal resources in the fifth uplink reference signal resource set and at least one sixth uplink reference signal resource set have an association relationship, where the fifth uplink reference signal resource set and the at least one sixth uplink reference signal resource set are resource sets configured on different carriers based on the third configuration information.

2. Configuration information of a fifth carrier further includes an index of at least one sixth carrier, to indicate that simultaneously sent uplink reference signal resources on the fifth carrier and the at least one sixth carrier have an association relationship, where the fifth carrier and the at least one sixth carrier are different carriers configured based on the third configuration information.

Optionally, the index of the sixth carrier includes one or both of the following: an index of a serving cell in which the sixth carrier is located, and indication information indicating that the sixth carrier is a normal uplink carrier or a supplementary uplink carrier of the serving cell in which the sixth carrier is located.

In another possible implementation, a manner in which the third configuration information indicates the association relationship between the uplink reference signals simultaneously sent on the different carriers may be: The third configuration information indicates an association relationship between uplink reference signal resource sets on the different carriers. For an implementation in which the third configuration information indicates the association relationship between the uplink reference signal resource sets on the different carriers, refer to the descriptions in the manner 1 in which the third configuration information indicates the association relationship between the uplink reference signal resources simultaneously sent on the different carriers. Details are not described herein. For example, if the third configuration information indicates that there is an association relationship between a fifth uplink reference signal resource set and at least one sixth uplink reference signal resource set, there is an association relationship between simultaneously sent uplink reference signals in the fifth uplink reference signal resource set and the at least one sixth uplink reference signal resource set.

In still another possible implementation, a manner in which the third configuration information indicates the association relationship between the uplink reference signals simultaneously sent on the different carriers may be: The third configuration information indicates an association relationship between the different carriers. For an implementation in which the third configuration information indicates the association relationship between the different carriers, refer to the descriptions in the manner 2 in which the third configuration information indicates the association relationship between the uplink reference signal resources simultaneously sent on the different carriers. Details are not described herein. For example, if the third configuration information indicates that there is an association relationship between a fifth carrier and at least one sixth carrier, there is an association relationship between simultaneously sent uplink reference signals on the fifth carrier and the at least one sixth carrier.

In a possible implementation, the second network device sends a measurement result to a location management device, where the measurement result is obtained by the second network device by measuring the uplink reference signals having the association relationship, and the measurement result includes indexes of resource sets in which the uplink reference signals having the association relationship are located and/or indexes of carriers on which the uplink reference signals having the association relationship are located.

For beneficial effects of the second aspect to the fourth aspect, refer to the beneficial effects of the first aspect. Details are not described herein.

According to a fifth aspect, a communication apparatus is provided. The apparatus may be a first network device, an apparatus in the first network device, or an apparatus that can be used together with the first network device. The communication apparatus may alternatively be a chip system. The communication apparatus may perform the method according to the first aspect. A function of the communication apparatus may be implemented by hardware or may be implemented by hardware by executing corresponding software. The hardware or the software includes one or more units corresponding to the function. The unit may be software and/or hardware. For operations performed by the communication apparatus and beneficial effects thereof, refer to the method according to the first aspect and the beneficial effects thereof. Repeated parts are not described again.

According to a sixth aspect, a communication apparatus is provided. The apparatus may be a terminal device, an apparatus in the terminal device, or an apparatus that can be used together with the terminal device. The communication apparatus may alternatively be a chip system. The communication apparatus may perform the method according to the second aspect. A function of the communication apparatus may be implemented by hardware, or may be implemented by hardware by executing corresponding software. The hardware or the software includes one or more units corresponding to the function. The unit may be software and/or hardware. For operations performed by the communication apparatus and beneficial effects thereof, refer to the method according to the second aspect and the beneficial effects thereof. Repeated parts are not described again.

According to a seventh aspect, a communication apparatus is provided. The apparatus may be a location management device, an apparatus in the location management device, or an apparatus that can be used together with the location management device. The communication apparatus may alternatively be a chip system. The communication apparatus may perform the method according to the third aspect. A function of the communication apparatus may be implemented by hardware or may be implemented by hardware by executing corresponding software. The hardware or the software includes one or more units corresponding to the function. The unit may be software and/or hardware. For operations performed by the communication apparatus and beneficial effects thereof, refer to the method according to the third aspect and the beneficial effects thereof. Repeated parts are not described again.

According to an eighth aspect, a communication apparatus is provided. The apparatus may be a second network device, an apparatus in the second network device, or an apparatus that can be used together with the second network device. The communication apparatus may alternatively be a chip system. The communication apparatus may perform the method according to the fourth aspect. A function of the communication apparatus may be implemented by hardware, or may be implemented by hardware by executing corresponding software. The hardware or the software includes one or more units corresponding to the function. The unit may be software and/or hardware. For operations performed by the communication apparatus and beneficial effects thereof, refer to the method according to the fourth aspect and the beneficial effects thereof. Repeated parts are not described again.

According to a ninth aspect, the embodiments may provide a communication apparatus. The communication apparatus includes a processor. When the processor invokes a computer program in a memory, the method performed by the first network device in the method according to the first aspect is performed.

According to a tenth aspect, the embodiments may provide a communication apparatus. The communication apparatus includes a processor. When the processor invokes a computer program in a memory, the method performed by the terminal device in the method according to the second aspect is performed.

According to an eleventh aspect, the embodiments may provide a communication apparatus. The communication apparatus includes a processor. When the processor invokes a computer program in a memory, the method performed by the location management device in the method according to the third aspect is performed.

According to a twelfth aspect, the embodiments may provide a communication apparatus. The communication apparatus includes a processor. When the processor invokes a computer program in a memory, the method performed by the second network device in the method according to the fourth aspect is performed.

According to a thirteenth aspect, the embodiments may provide a communication apparatus. The communication apparatus includes a processor and a memory. The memory is configured to store computer-executable instructions. The processor is configured to execute the computer-executable instructions stored in the memory, to enable the communication apparatus to perform the method performed by the first network device in the method according to the first aspect.

According to a fourteenth aspect, the embodiments may provide a communication apparatus. The communication apparatus includes a processor and a memory. The memory is configured to store computer-executable instructions. The processor is configured to execute the computer-executable instructions stored in the memory, to enable the communication apparatus to perform the method performed by the terminal device in the method according to the second aspect.

According to a fifteenth aspect, the embodiments may provide a communication apparatus. The communication apparatus includes a processor and a memory. The memory is configured to store computer-executable instructions. The processor is configured to execute the computer-executable instructions stored in the memory, to enable the communication apparatus to perform the method performed by the location management device in the method according to the third aspect.

According to a sixteenth aspect, the embodiments may provide a communication apparatus. The communication apparatus includes a processor and a memory. The memory is configured to store computer-executable instructions. The processor is configured to execute the computer-executable instructions stored in the memory, to enable the communication apparatus to perform the method performed by the second network device in the method according to the fourth aspect.

According to a seventeenth aspect, the embodiments may provide a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the first network device in the method according to the first aspect.

According to an eighteenth aspect, the embodiments may provide a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the terminal device in the method according to the second aspect.

According to a nineteenth aspect, the embodiments may provide a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the location management device in the method according to the third aspect.

According to a twentieth aspect, the embodiments may provide a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the second network device in the method according to the fourth aspect.

According to a twenty-first aspect, the embodiments may provide a communication apparatus. The communication apparatus includes a processor and an interface circuit. The interface circuit is configured to receive computer-executable instructions and transmit the computer-executable instructions to the processor. The processor runs the computer-executable instructions to perform the method performed by the first network device in the method according to the first aspect.

According to a twenty-second aspect, the embodiments may provide a communication apparatus. The communication apparatus includes a processor and an interface circuit. The interface circuit is configured to receive computer-executable instructions and transmit the computer-executable instructions to the processor. The processor runs the computer-executable instructions to perform the method performed by the terminal device in the method according to the second aspect.

According to a twenty-third aspect, the embodiments may provide a communication apparatus. The communication apparatus includes a processor and an interface circuit. The interface circuit is configured to receive computer-executable instructions and transmit the computer-executable instructions to the processor. The processor runs the computer-executable instructions to perform the method performed by the location management device in the method according to the third aspect.

According to a twenty-fourth aspect, the embodiments may provide a communication apparatus. The communication apparatus includes a processor and an interface circuit. The interface circuit is configured to receive computer-executable instructions and transmit the computer-executable instructions to the processor. The processor runs the computer-executable instructions to perform the method performed by the second network device in the method according to the fourth aspect.

According to a twenty-fifth aspect, the embodiments may provide a non-transitory computer-readable storage medium. The non-transitory computer-readable storage medium is configured to store computer-executable instructions. When the computer-executable instructions are executed, the method performed by the first network device in the method according to the first aspect is implemented.

According to a twenty-sixth aspect, the embodiments may provide a non-transitory computer-readable storage medium. The non-transitory computer-readable storage medium is configured to store computer-executable instructions. When the computer-executable instructions are executed, the method performed by the terminal device in the method according to the second aspect is implemented.

According to a twenty-seventh aspect, the embodiments may provide a non-transitory computer-readable storage medium. The non-transitory computer-readable storage medium is configured to store computer-executable instructions. When the computer-executable instructions are executed, the method performed by the location management device in the method according to the third aspect is implemented.

According to a twenty-eighth aspect, the embodiments may provide a non-transitory computer-readable storage medium. The non-transitory computer-readable storage medium is configured to store computer-executable instructions. When the computer-executable instructions are executed, the method performed by the second network device in the method according to the fourth aspect is implemented.

According to a twenty-ninth aspect, the embodiments may provide a computer program product including a computer program. When the computer program is executed, the method performed by the first network device in the method according to the first aspect is implemented.

According to a thirtieth aspect, the embodiments may provide a computer program product including a computer program. When the computer program is executed, the method performed by the terminal device in the method according to the second aspect is implemented.

According to a thirty-first aspect, the embodiments may provide a computer program product including a computer program. When the computer program is executed, the method performed by the location management device in the method according to the third aspect is implemented.

According to a thirty-second aspect, the embodiments may provide a computer program product including a computer program. When the computer program is executed, the method performed by the second network device in the method according to the fourth aspect is implemented.

According to a thirty-third aspect, the embodiments may provide a communication system. The communication system includes the communication apparatus according to the fifth aspect, the ninth aspect, the thirteenth aspect, the seventeenth aspect, or the twenty-first aspect, the communication apparatus according to the sixth aspect, the tenth aspect, the fourteenth aspect, the eighteenth aspect, or the twenty-second aspect, the communication apparatus according to the seventh aspect, the eleventh aspect, the fifteenth aspect, the nineteenth aspect, or the twenty-third aspect, and the communication apparatus according to the eighth aspect, the twelfth aspect, the sixteenth aspect, the twentieth aspect, or the twenty-fourth aspect.

DETAILED DESCRIPTION OF THE EMBODIMENTS

The following further describes embodiments in detail with reference to accompanying drawings.

In the embodiments and the accompanying drawings, the terms "first", "second", and the like are intended to distinguish between different objects but do not indicate a particular order. In addition, the terms "include", "have", and any other variant thereof are intended to cover non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" means that a particular characteristic, structure, or feature described with reference to embodiments may be included in at least one embodiment. The phrase may not necessarily refer to a same embodiment and is not an independent or optional embodiment exclusive from another embodiment. It is explicitly and implicitly understood by persons skilled in the art that embodiments may be combined with another embodiment.

"At least one (item)" means one or more, "a plurality of" means two or more, and "at least two (items)" means two, three, or more. The term "and/or" is used to describe a correspondence between corresponding objects, and indicates that three relationships may exist. For example, "A and/or B" may indicate the following three cases: only A exists, only B exists, and both A and B exist, where A and B may be singular or plural. The character "/" generally represents an "or" relationship between the corresponding objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand the embodiments, the following first describes a system architecture.

A method provided in the embodiments may be applied to various communication systems, for example, an internet of things (IoT) system, a narrow band internet of things (NB-IoT) system, a long term evolution (LTE) system, a 5th generation (5G) communication system, an LTE-5G hybrid architecture, a 5G new radio (NR) system, and a new communication system emerging in future communication development.

Figure 1:
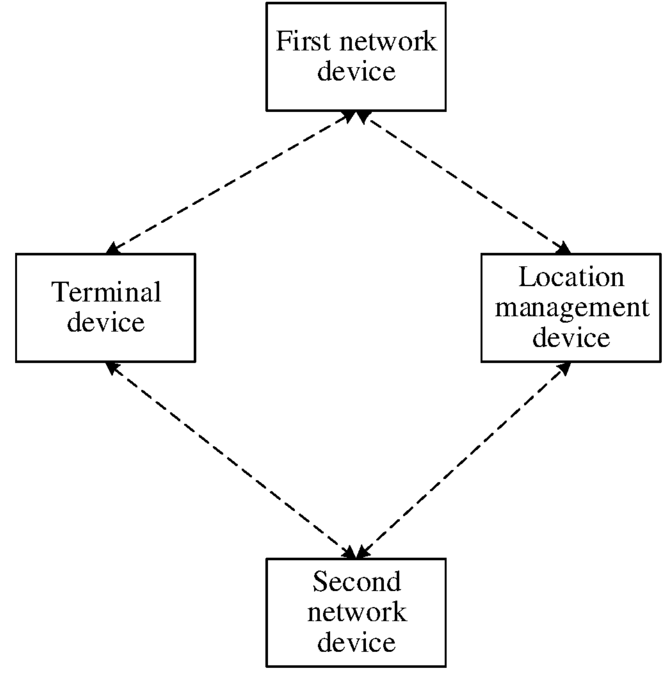
FIG. 1 is a schematic structural diagram of a system architecture according to an embodiment.

FIG. 1 is a schematic diagram of a system architecture according to an embodiment. As shown in FIG. 1, the system architecture includes a terminal device, a first network device, a second network device, and a location management device.

The terminal device in the embodiments is an entity that is on a user side and that is configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment (UE), or the like. The terminal device may be a mobile terminal, for example, a mobile phone (or referred to as a "cellular" phone); and a computer that has a mobile terminal, for example, a portable, pocket-sized, handheld, computer built-in, or in-vehicle mobile apparatus, which exchanges a voice and/or data with the radio access network. For example, the terminal device may alternatively be a device such as a personal communication service (PCS) phone, a cordless phone, a session initiation protocol (SIP) phone, a wireless local loop (WLL) station, or a personal digital assistant (PDA). Common terminal devices include, for example, a car, an unmanned aerial vehicle, a mechanical arm, a mobile phone, a tablet computer, a notebook computer, a palmtop computer, a mobile internet device (MID), and a wearable device such as a smartwatch, a smart band, or a pedometer. However, the embodiments are not limited thereto.

The network device in the embodiments may be an access network device or another network device. The network device is an entity that is on a network side and that is configured to transmit or receive a signal, may be configured to mutually convert a received over-the-air frame and an internet protocol (IP) packet, and serves as a router between the terminal device and a remaining part of an access network. The remaining part of the access network may include an IP network and the like. The network device may further coordinate attribute management of an air interface. For example, the network device may be an evolved NodeB (eNB) in LTE, a new radio (NR) controller, an ng-eNB, a gNodeB (gNB) in a 5G system, a central unit, a new radio base station, a radio remote module, a micro base station, a relay, a distributed unit, or any other radio access device. However, the embodiments are not limited thereto.

The first network device may be a serving access network device of the terminal device. The second network device is an access network device configured to measure an uplink reference signal sent by the terminal device. The second network device may include one or more cells, and each cell includes one or more transmission reception points (TRPs) or one or more reception points (RPs). The second network device may measure the uplink reference signal through the TRP or the RP. Optionally, the second network device may also be the first network device, or the second network device may be different from the first network device.

The location management device is a device that is on the network side and that is configured to determine positioning information of the terminal device. The location management device may be a location management function (LMF) entity, an evolved serving mobile location center (E-SMLC), or another device that can be used to determine the positioning information of the terminal device.

Figure 2:
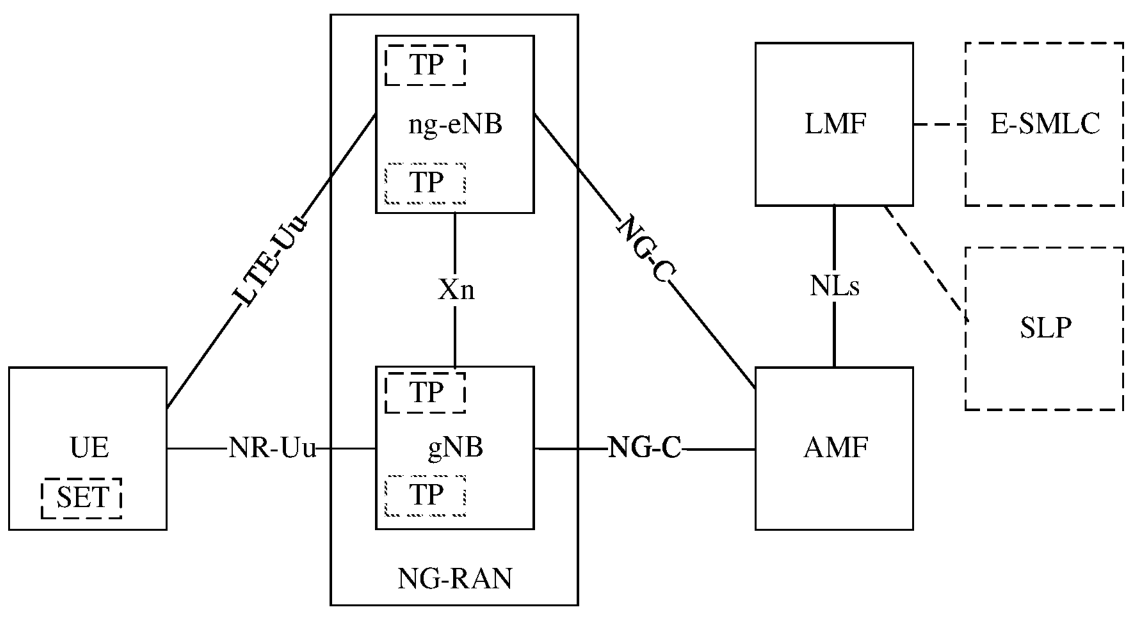
FIG. 2 is a schematic structural diagram of another system architecture according to an embodiment.

In a possible implementation, the system architecture shown in FIG. 1 may further include another device. For example, FIG. 2 is a schematic diagram of another system architecture. In FIG. 2, that the terminal device is UE, the first network device is a gNB, the second network device is an ng-eNB, and the location management device is an LMF is used as an example. As shown in FIG. 2, the system architecture may further include an access management function (AMF) entity. The AMF entity is a control plane network function provided by an operator network, and is responsible for access control and mobility management for accessing the operator network by the terminal device. For example, the access control and the mobility management include functions such as mobility status management, temporary user identity allocation, and user authentication and authorization. Optionally, the system architecture may further include a user plane location platform (SLP) and an enhanced serving mobile location center (E-SMLC) entity. In the embodiments, only a network device that is closely related to the uplink reference signal association method is described, and details of another related network device are not described.

In the embodiments, an uplink reference signal is a reference signal sent by a terminal device to an access network device (for example, a base station) on a network side. The uplink reference signal may be a sounding reference signal (SRS) or another uplink reference signal. The following uses the SRS as an example to describe a positioning technology supported by the uplink reference signal.

1. Uplink time difference of arrival (UL-TDOA) positioning technology: In the positioning technology, each cell measures an uplink relative time of arrival (UL-RTOA) for an SRS sent by a terminal device, and reports a measurement result to an LMF. The LMF positions the terminal device based on the measurement result.

2. Uplink angle of arrival (UL-AOA) positioning technology: In the positioning technology, each cell measures a UL-AOA for an SRS sent by a terminal device, and reports a measurement result to an LMF. The LMF positions the terminal device based on the measurement result.

3. Multi-cell round trip time (RTT) positioning technology: In the positioning technology, a terminal device measures a user equipment receive-transmit time difference (UE-RxTxTimeDiff) for a PRS sent by each cell, and reports a measurement result to an LMF. Each cell measures a gNB receive-transmit time difference (gNB-RxTxTimeDiff) for an SRS sent by the terminal device, and reports a measurement result to the LMF. The LMF positions the terminal device based on the measurement result.

Figure 3:
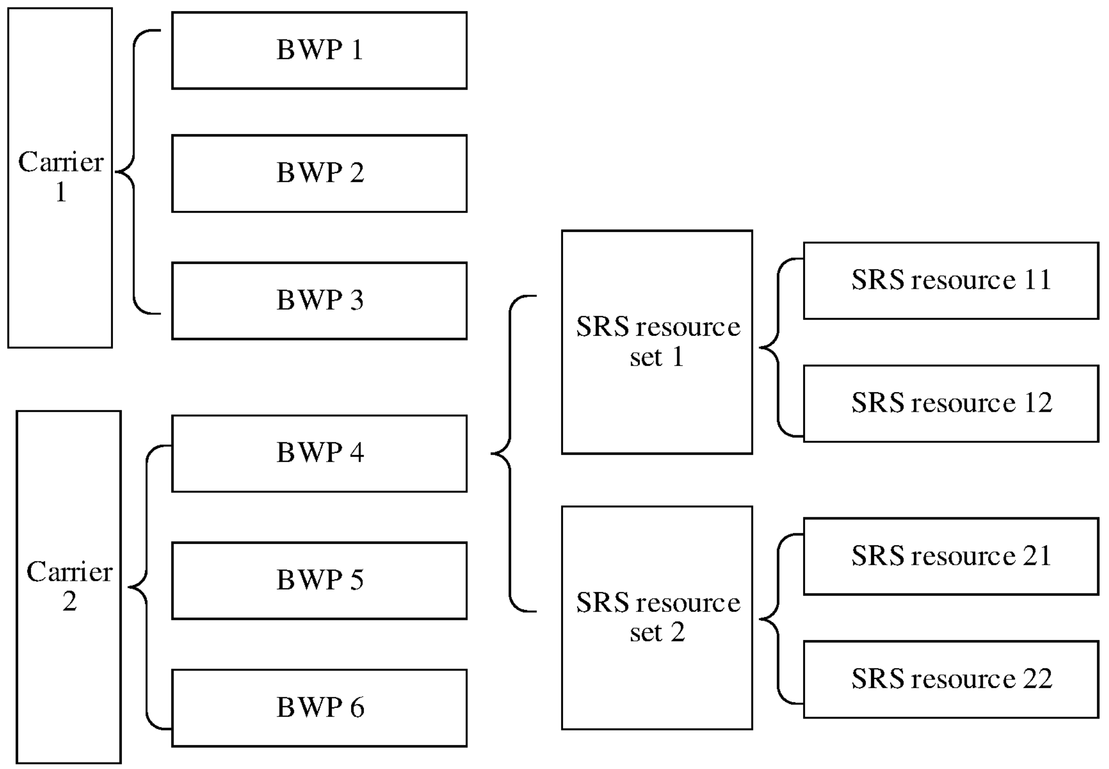
FIG. 3 is a schematic diagram of an SRS configuration level according to an embodiment.

In the foregoing positioning technologies, a TRP or an RP in each cell may be used to measure the SRS. An example in which the TRP measures the SRS is used for description below. The following describes several concepts related to an SRS configuration, as shown in FIG. 3.

1. Serving cell/carrier: Each serving cell may include one carrier or two carriers. When the serving cell includes two carriers, one carrier is a normal uplink carrier, and the other carrier is a supplementary uplink carrier SUL. Each carrier includes one or more BWPs.

2. BWP: The BWP is a bandwidth part on a carrier, and corresponds to a resource block RB) set, a subcarrier spacing, and a cyclic prefix (CP) type. In Rel-15 and Rel-16, a plurality of BWPs may be configured on one carrier, but there is a maximum of one activated BWP on the carrier at a moment. A terminal sends data, uplink control information, and an SRS on the activated BWP. One or more SRS resource sets may be configured on one BWP.

3. SRS resource set: One SRS resource set includes one or more SRS resources, and the SRS resources in the SRS resource set have a same periodicity and a same SRS power control parameter.

4. SRS resource: The SRS resource is a minimum granularity of an SRS configuration, and one SRS resource corresponds to one SRS transmit beam.

Currently, in a low-frequency communication system, positioning precision of a positioning technology is not high. A main reason is that a maximum bandwidth of a single uplink reference signal in a low-frequency NR communication system is 100 MHz, and precision of a positioning method that is based on timing ranging is directly associated with a bandwidth. A larger bandwidth may indicate higher ranging precision. Therefore, how to enhance an existing uplink reference signal configuration structure to implement configuration of a large-bandwidth uplink reference signal, and therefore improve positioning precision is a problem that needs to be urgently resolved currently.

To implement configuration of a large-bandwidth uplink reference signal, the embodiments may provide an uplink reference signal association method and a communication apparatus. The following further describes in detail the uplink reference signal association method and the communication apparatus provided in the embodiments.

Figure 4:
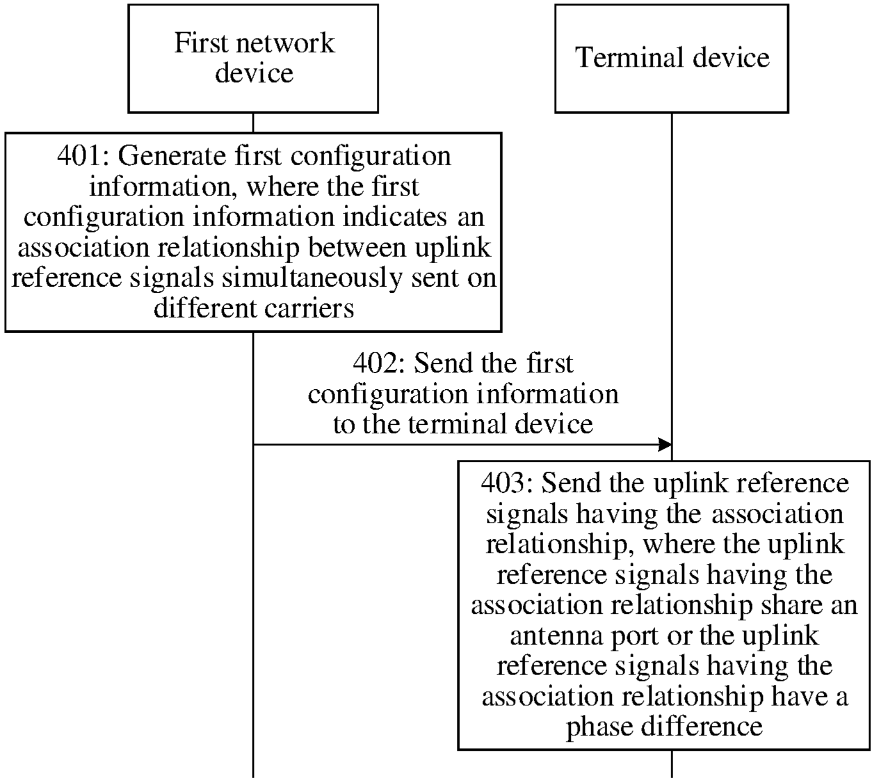
FIG. 4 is a schematic flowchart of an uplink reference signal association method according to an embodiment.

FIG. 4 is a schematic flowchart of an uplink reference signal association method according to an embodiment. As shown in FIG. 4, the uplink reference signal association method includes the following step 401 to step 403. The method shown in FIG. 4 may be performed by a terminal device and a first network device, or may be performed by a chip in the terminal device and a chip in the first network device. In FIG. 4, an example in which the method is performed by the terminal device and the first network device is used for description.

401: The first network device generates first configuration information, where the first configuration information indicates an association relationship between uplink reference signals simultaneously sent on different carriers.

The first network device may be a serving network device of the terminal device. For example, the first network device is a serving base station of the terminal device.

For example, the first configuration information may indicate that there is an association relationship between simultaneously sent uplink reference signals on a carrier 1 and a carrier 2 of the terminal device, and there is an association relationship between simultaneously sent uplink reference signals on a carrier 3 and a carrier 4 of the terminal device.

For another example, the first configuration information may indicate that there is an association relationship between simultaneously sent uplink reference signals in a BWP 1 of the carrier 1 and a BWP 3 of the carrier 2 of the terminal device, and there is an association relationship between simultaneously sent uplink reference signals in a BWP 2 of the carrier 1 and a BWP 4 of the carrier 2 of the terminal device.

For another example, the first configuration information may indicate that there is an association relationship between simultaneously sent uplink reference signals on an SRS resource set 11 and an SRS resource set 31 of the terminal device. The SRS resource set 11 is an SRS resource set in the BWP 1 of the carrier 1. The SRS resource set 31 is an SRS resource set in the BWP 3 of the carrier 2.

The simultaneously sent uplink reference signals may be understood as uplink reference signals with a same symbol index. Alternatively, the simultaneously sent uplink reference signals may be understood as uplink reference signals that have different symbols index but are simultaneously sent due to different timing.

In a possible implementation, a manner in which the first configuration information indicates the association relationship between the uplink reference signals simultaneously sent on the different carriers may be: The first configuration information indicates an association relationship between uplink reference signal resources simultaneously sent on the different carriers. In other words, the first configuration information may indicate the association relationship between the uplink reference signals simultaneously sent on the different carriers by indicating the association relationship between the uplink reference signal resources simultaneously sent on the different carriers. In this way, the association relationship between the uplink reference signals simultaneously sent on the different carriers can be accurately indicated. For example, if the first configuration information indicates that there is an association relationship between an uplink reference signal resource 1 and an uplink reference signal resource 2 that are simultaneously sent on different carriers, the first configuration information is equivalent to indicating that there is an association relationship between an uplink reference signal corresponding to the uplink reference signal resource 1 and an uplink reference signal corresponding to the uplink reference signal resource 2.

Optionally, the first configuration information includes configuration information of a plurality of carriers, the configuration information of the carrier includes an index of the carrier and configuration information of a bandwidth part (BWP) on the carrier, the configuration information of the BWP includes an index of the BWP and configuration information of an uplink reference signal resource set in the BWP, and the configuration information of the uplink reference signal resource set includes an index of the uplink reference signal resource set and configuration information of an uplink reference signal resource in the uplink reference signal resource set. In other words, the first configuration information may further indicate BWPs of the terminal device on carriers, uplink reference signal resource sets in these BWPs, and uplink reference signal resources in these uplink reference signal resource sets.

Figure 5A:
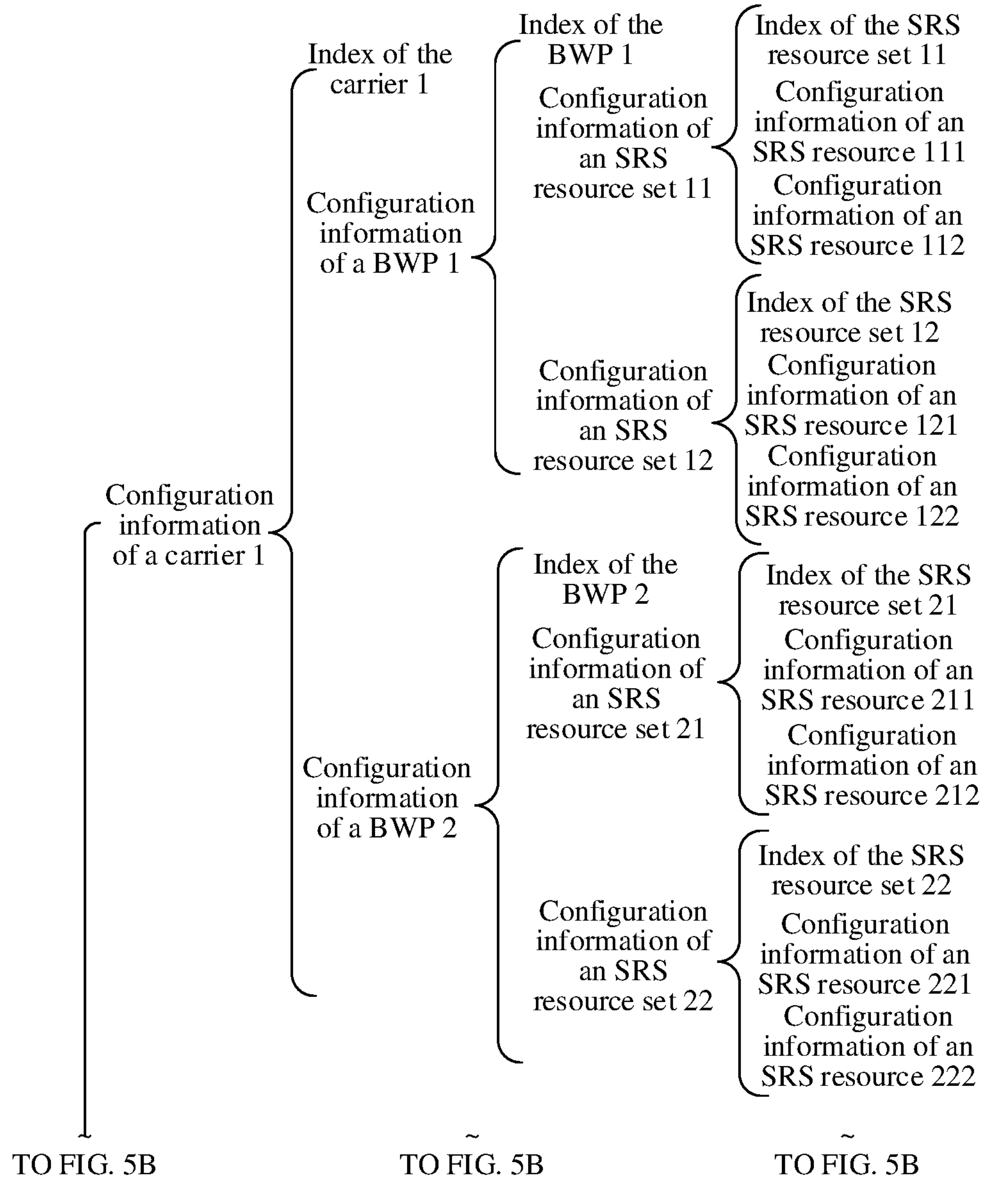
FIG. 5A to FIG. 5C are a schematic diagram of one type of first configuration information according to an embodiment.
Figure 5B:
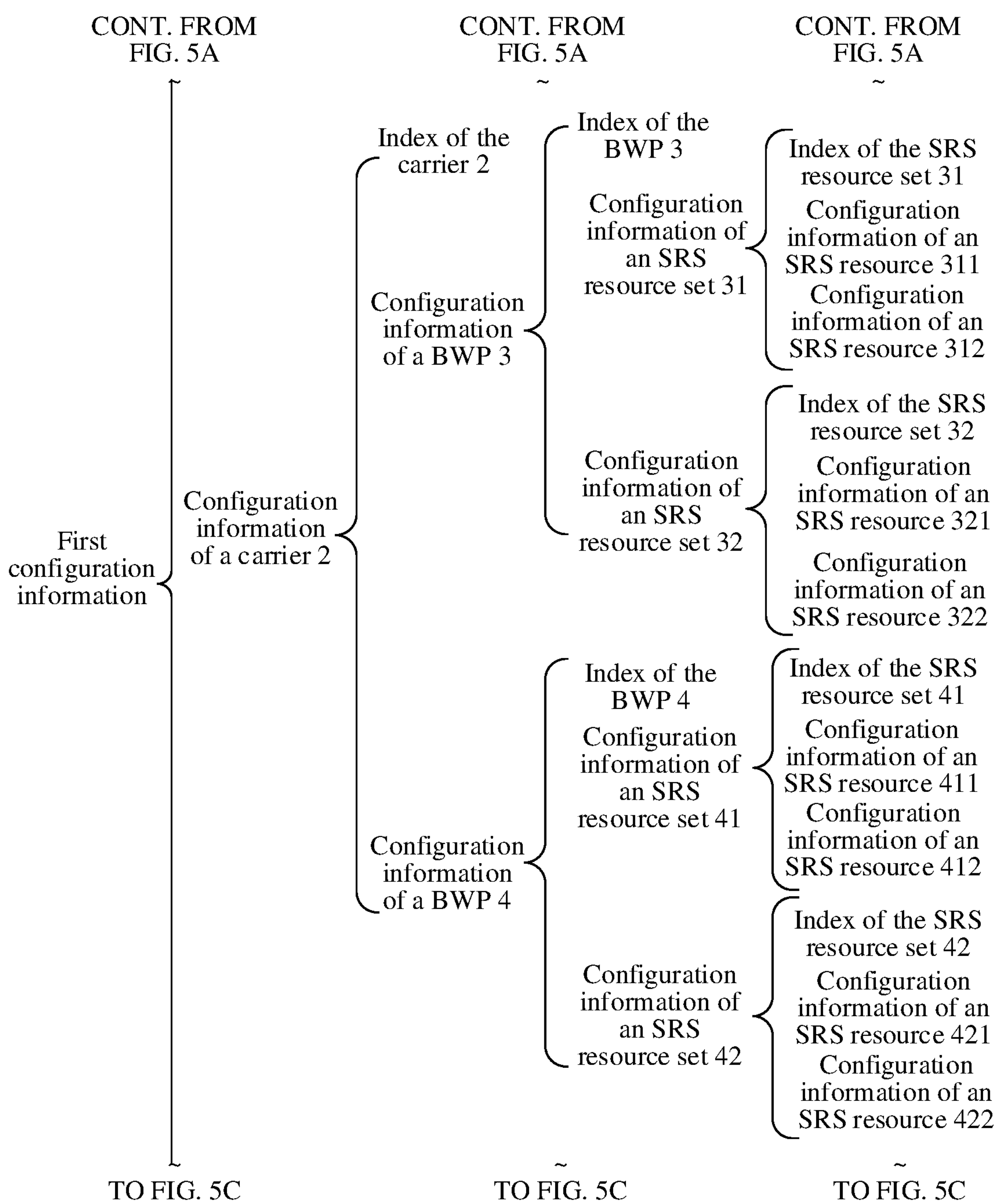
Figure 5C:
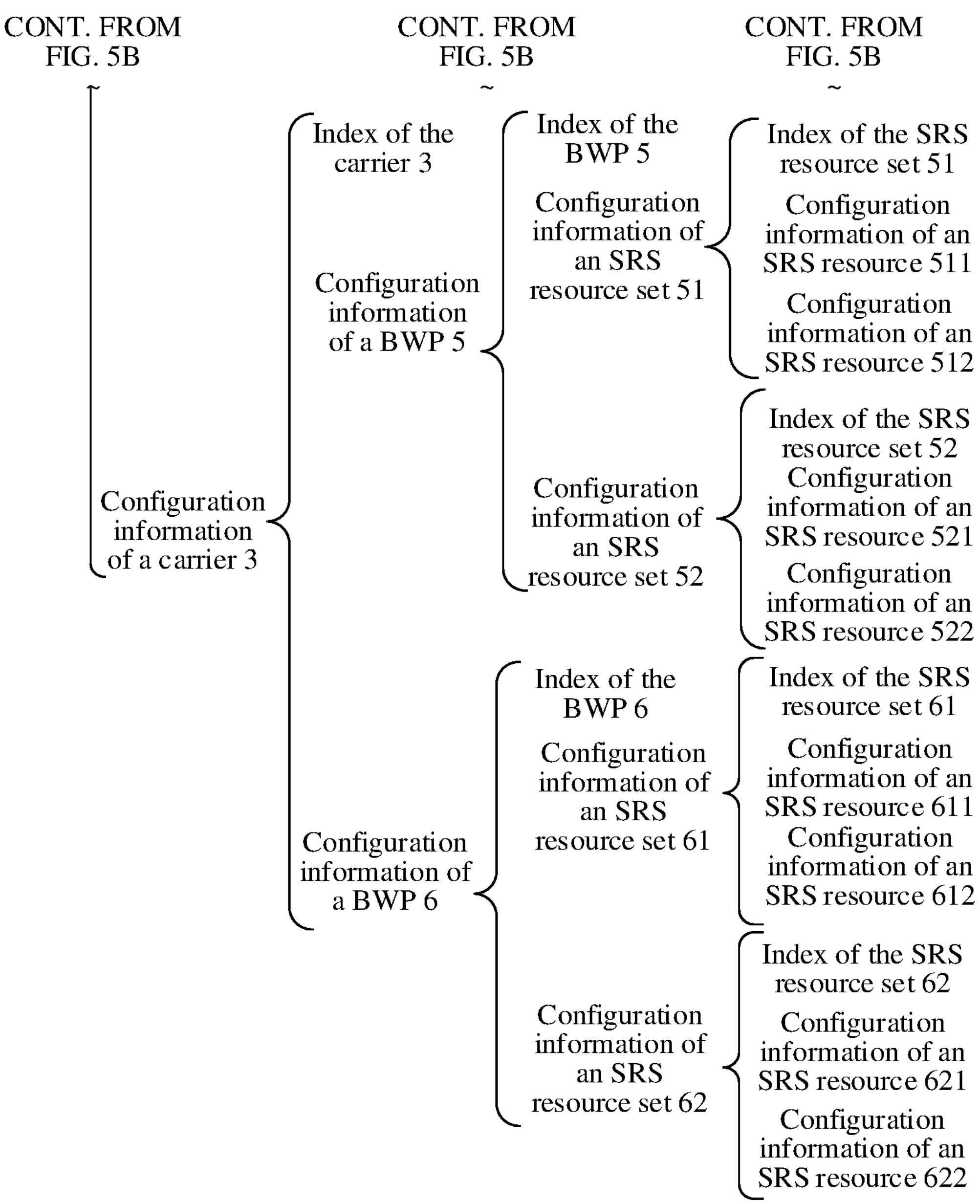

For example, as shown in FIG. 5A to FIG. 5C, the terminal device has three carriers: a carrier 1 to a carrier 3. The first configuration information includes configuration information of the carrier 1 to configuration information of the carrier 3. The configuration information of the carrier 1 is used as an example. The configuration information of the carrier 1 includes an index of the carrier 1. Because the carrier 1 includes a BWP 1 and a BWP 2, the configuration information of the carrier 1 further includes configuration information of the BWP 1 and configuration information of the BWP 2. Optionally, the configuration information of the carrier 1 may further include other attribute information of the carrier 1.

The configuration information of the BWP 1 is used as an example for description. As shown in FIG. 5A to FIG. 5C, the configuration information of the BWP 1 includes an index of the BWP 1. Because the BWP 1 includes an SRS resource set 11 and an SRS resource set 12, the configuration information of the BWP 1 further includes configuration information of the SRS resource set 11 and configuration information of the SRS resource set 12.

The configuration information of the SRS resource set 11 includes an index of the SRS resource set 11. Because the SRS resource set 11 includes an SRS resource 111 and an SRS resource 112, the configuration information of the SRS resource set 11 further includes configuration information of the SRS resource 111 and configuration information of the SRS resource 112. The configuration information of the SRS resource 111 includes an index of the SRS resource 111. The configuration information of the SRS resource 112 includes an index of the SRS resource 112.

Similarly, the configuration information of the SRS resource set 12 includes an index of the SRS resource set 12, configuration information of an SRS resource 121, and configuration information of an SRS resource 122. The configuration information of the SRS resource 121 includes an index of the SRS resource 121. The configuration information of the SRS resource 122 includes an index of the SRS resource 122.

In other words, the first configuration information indicates that the terminal device includes the BWP 1 and the BWP 2 on the carrier 1. The BWP 1 includes the SRS resource set 11 and the SRS resource set 12. The SRS resource set 11 includes the SRS resource 111 and the SRS resource 112. The SRS resource set 12 includes the SRS resource 121 and the SRS resource 122. The BWP 2 includes an SRS resource set 21 and an SRS resource set 22. The SRS resource set 21 includes an SRS resource 211 and an SRS resource 212. The SRS resource set 22 includes an SRS resource 221 and an SRS resource 222. Other carriers are similar to the carrier 1, and details are not described herein.

The first configuration information may indicate, in the following three implementations, the association relationship between the uplink reference signal resources simultaneously sent on the different carriers.

1. Configuration information of a first uplink reference signal resource set further includes at least one piece of first index information, and the first index information includes an index of a second carrier, an index of a second BWP on the second carrier, and an index of a second uplink reference signal resource set in the second BWP, to indicate that simultaneously sent uplink reference signal resources in the first uplink reference signal resource set and at least one second uplink reference signal resource set have an association relationship, where the first uplink reference signal resource set and the at least one second uplink reference signal resource set are resource sets configured on different carriers based on the first configuration information. The manner 1 is equivalent to indicating the association relationship between the uplink reference signal resources simultaneously sent on the different carriers by indicating an association relationship between uplink reference signal resource sets on the different carriers. This helps reduce signaling overheads.

Optionally, if the uplink reference signal resource is an SRS resource, the configuration information of the first uplink reference signal resource set may be an SRS-ResourceSet or an SRS-PosResourceSet.

For example, an information element structure of the configuration information of the first uplink reference signal resource set may be as follows:

```
SRS-ResourceSet ::=                                              SEQUENCE {
    srs-ResourceSetId                                            SRS-ResourceSetId,
    srs-ResourceIdList                                                SEQUENCE
(SIZE(1..maxNrofSRS-ResourcesPerSet)) OF SRS-ResourceId           OPTIONAL, -- Cond Setup
    resourceType                                                 CHOICE {
        aperiodic                                                   SEQUENCE {
    aperiodicSRS-ResourceTrigger                                             INTEGER
(1..maxNrofSRS-TriggerStates−1),
    csi-RS                                                         NZP-CSI-RS-ResourceId
OPTIONAL, -- Cond NonCodebook
    slotOffset                                                        INTEGER   (1..32)
OPTIONAL, -- Need S
        ...,
        [[
    aperiodicSRS-ResourceTriggerList                                  SEQUENCE
(SIZE(1..maxNrofSRS-TriggerStates−2))
                                                              OF          INTEGER
(1..maxNrofSRS-TriggerStates−1)   OPTIONAL   -- Need M
        ]]
        },
        semi-persistent                                            SEQUENCE {
    associatedCSI-RS                                               NZP-CSI-RS-ResourceId
OPTIONAL, -- Cond NonCodebook
        ...
        },
       periodic                                                     SEQUENCE {
    associatedCSI-RS                                               NZP-CSI-RS-ResourceId
OPTIONAL, -- Cond NonCodebook
```

-continued

```
            ...
          }
        },
        usage                                              ENUMERATED
{beamManagement, codebook, nonCodebook, antennaSwitching},
        alpha                                                       Alpha
OPTIONAL, -- Need S
        p0                                              INTEGER   (-202..24)
OPTIONAL, -- Cond Setup
      pathlossReferenceRSPathlossReferenceRS-Config
OPTIONAL, -- Need M
      srs-PowerControlAdjustmentStates                ENUMERATED   {sameAsFci2,
separateClosedLoop}              OPTIONAL, -- Need S
        ...,
         [[
        pathlossReferenceRS-List-r16                            SEQUENCE
(SIZE(1..maxNrofSRS-PathlossReferenceRS-r16-1)) OF PathlossReferenceRS-Config
      OPTIONAL,   -- Need M
      ]]
      [[
      assocSRS-ResourceSetList-r17       SEQUENCE
(SIZE(1..maxNrAssocSRS-ResourceSet-r17)) OF SRS-ResourceSetID-Info-r17
   OPTIONAL   -- Need R
      -- or
      assocSRS-ResourceSet-r17          SRS-ResourceSetID-Info-r17      OPTIONAL
   -- Need R
      ]]
      }
      SRS-ResourceSetID-Info-r17 ::= SEQUENCE {
        servingCellId-r17               INTEGER (0..31),
        uplinkBWP-r17                   INTEGER (0..3),
        srs-ResourceSetId-r17           SRS-ResourceSetId
      }
```

In the foregoing information element structure, SRS-ResourceSetID-Info-r17 in the underlined part represents the first index information. servingCellId-r17 in the underlined part represents the index of the second carrier. uplinkBWP-r17 in the underlined part represents the index of the second BWP. srs-ResourceSetId-r17 in the underlined part represents the index of the second uplink reference signal resource set. It can be understood from the foregoing information element structure that the configuration information of the first uplink reference signal resource set may include one or more pieces of first index information.

Figure 6A:
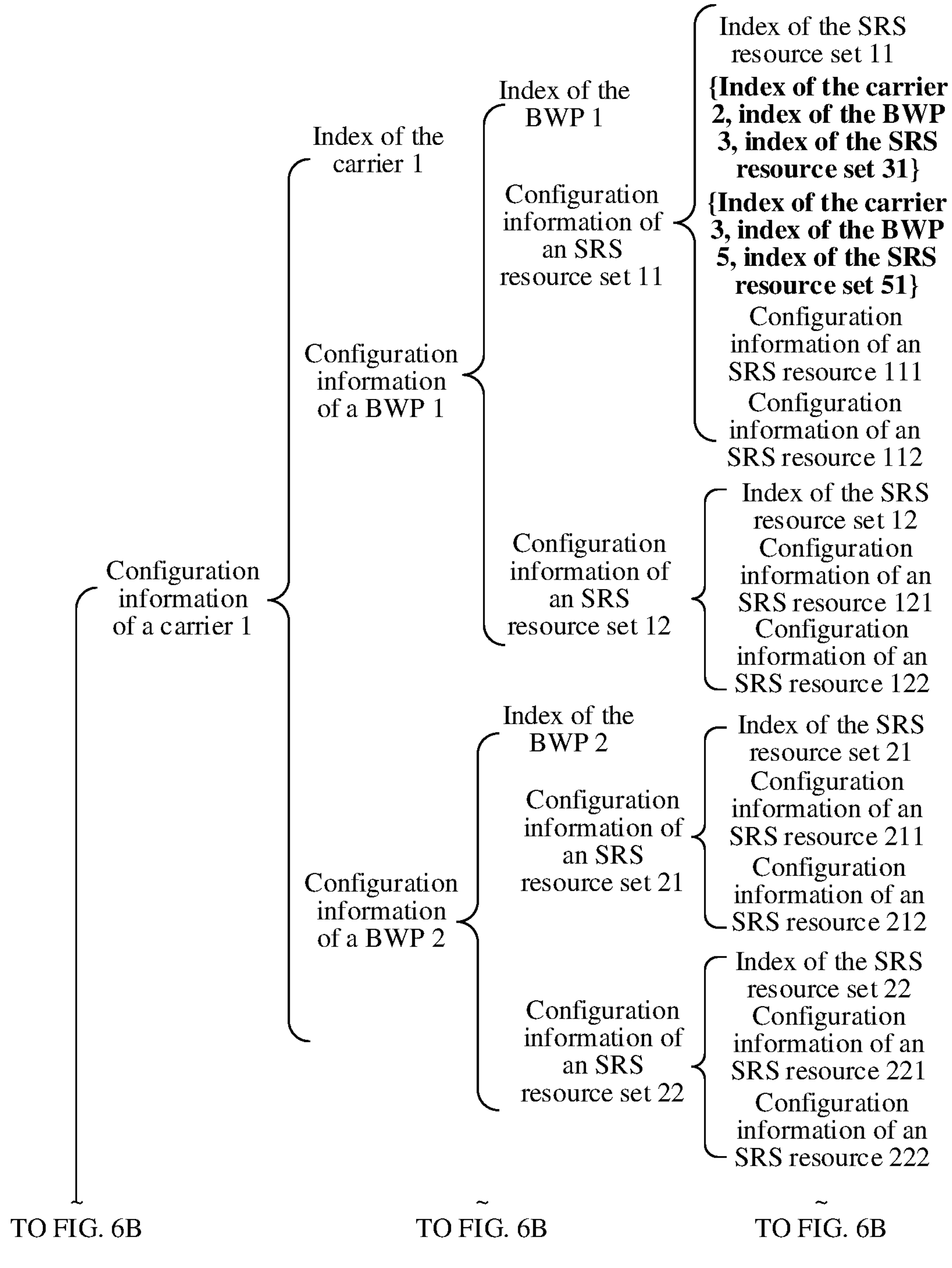
FIG. 6A to FIG. 6C are a schematic diagram of another type of first configuration information according to an embodiment.
Figure 6B:
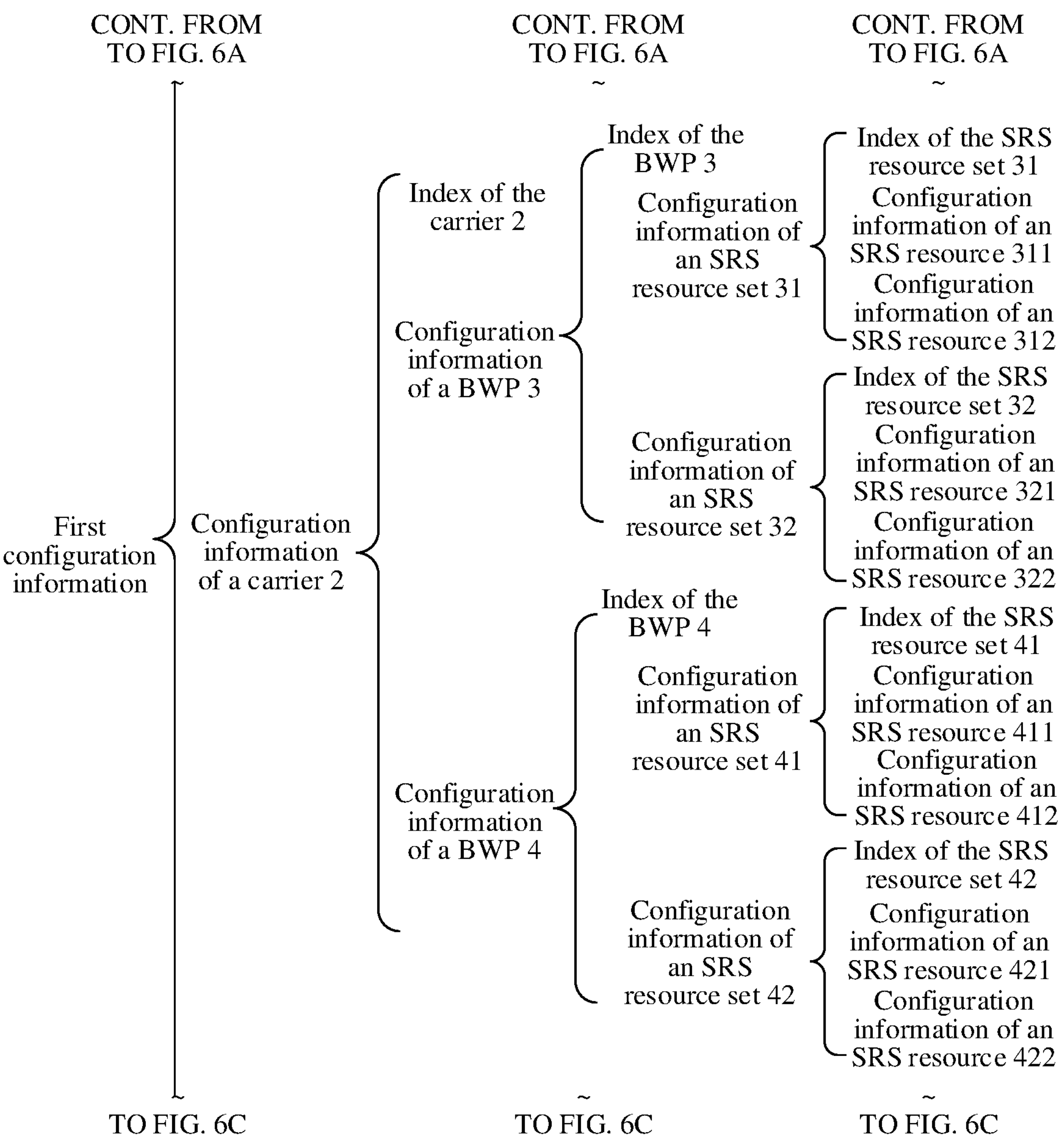
Figure 6C:
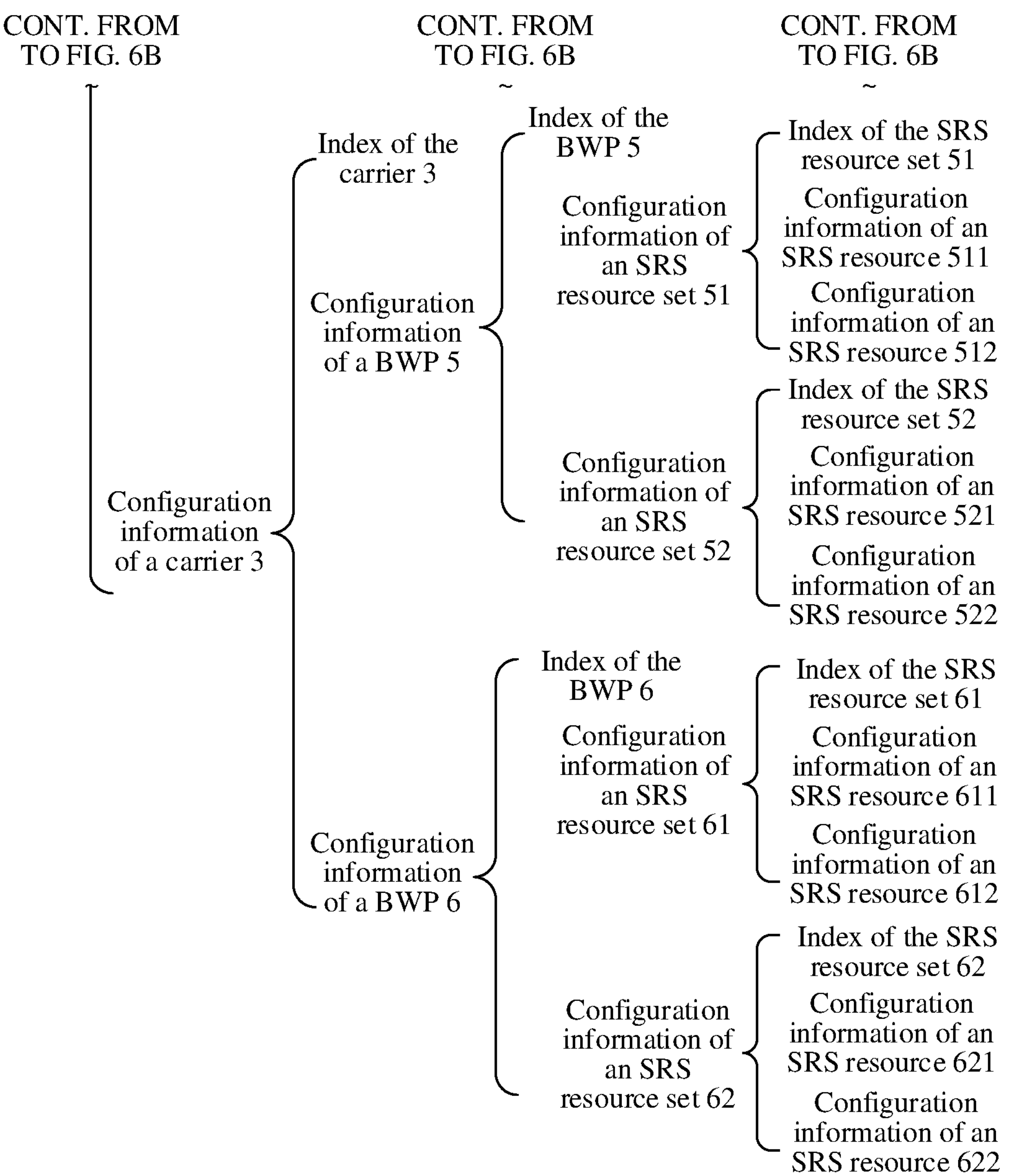

For another example, as shown in FIG. 6A to FIG. 6C, it is assumed that the configuration information of the SRS resource set 11 on the carrier 1 includes {index of the carrier 2, index of the BWP 3 on the carrier 2, index of the SRS resource set 31 in the BWP 3} and {index of the carrier 3, index of a BWP 5 on the carrier 3, index of an SRS resource set 51 in the BWP 5}. In this case, the first configuration information indicates that there is an association relationship between simultaneously sent SRS resources in the SRS resource set 11, the SRS resource set 31, and the SRS resource set 51.

Optionally, if indexes of uplink reference signal resource sets on carriers are different, the configuration information of the first uplink reference signal resource set may include only an index of the at least one second uplink reference signal resource set, and does not need to include the index of the second carrier and the index of the second BWP.

Optionally, that simultaneously sent uplink reference signal resources in the first uplink reference signal resource set and at least one second uplink reference signal resource set have an association relationship may not be indicated in the manner 1. For example, an index of the first uplink reference signal resource set and the index of the at least one second uplink reference signal resource set may be configured to be the same, to indicate that the simultaneously sent uplink reference signal resources in the first uplink reference signal resource set and the at least one second uplink reference signal resource set have an association relationship.

2. Configuration information of a first BWP further includes at least one piece of second index information, and the second index information includes an index of a second carrier and an index of a second BWP on the second carrier, to indicate that simultaneously sent uplink reference signal resources in the first BWP and at least one second BWP have an association relationship, where the first BWP and the second BWP are BWPs configured on different carriers based on the first configuration information. The manner 2 is equivalent to indicating the association relationship between the uplink reference signal resources simultaneously sent on the different carriers by indicating an association relationship between BWPs on the different carriers. This helps reduce signaling overheads.

Optionally, if the uplink reference signal resource is an SRS resource, the configuration information of the first BWP includes an SRS configuration (SRS-Config). The SRS configuration in the configuration information of the first BWP may include the at least one piece of second index information. Alternatively, a location other than the SRS configuration in the configuration information of the first BWP may include the at least one piece of second index information. An SRS-ResourceSet or an SRS-PosResource-Set is in the SRS configuration.

For example, an information element structure of the SRS configuration may be as follows:

```
  SRS-Config ::=                                              SEQUENCE {
  srs-ResourceSetToReleaseList                                        SEQUENCE
(SIZE(1..maxNrofSRS-ResourceSets)) OF SRS-ResourceSetId   OPTIONAL,   -- Need N
  srs-ResourceSetToAddModList                                         SEQUENCE
(SIZE(1..maxNrofSRS-ResourceSets)) OF SRS-ResourceSet     OPTIONAL,   -- Need N
  srs-ResourceToReleaseList                                           SEQUENCE
(SIZE(1..maxNrofSRS-Resources)) OF SRS-ResourceId         OPTIONAL,   -- Need N
  srs-ResourceToAddModList                                            SEQUENCE
(SIZE(1..maxNrofSRS-Resources)) OF SRS-Resource           OPTIONAL,   -- Need N
  tpc-Accumulation                                          ENUMERATED   {disabled}
OPTIONAL,   -- Need S
      ...,
      [[
      srs-RequestForDCI-Format1-2-r16                         INTEGER   (1..2)
OPTIONAL,   -- Need S
      srs-RequestForDCI-Format0-2-r16                         INTEGER   (1..2)
OPTIONAL,   -- Need S
      srs-ResourceSetToAddModListForDCI-Format0-2-r16                 SEQUENCE
(SIZE(1..maxNrofSRS-ResourceSets)) OF SRS-ResourceSet OPTIONAL, -- Need N
      srs-ResourceSetToReleaseListForDCI-Format0-2-r16                SEQUENCE
(SIZE(1..maxNrofSRS-ResourceSets)) OF SRS-ResourceSetId OPTIONAL,-- Need N
      srs-PosResourceSetToReleaseList-r16                             SEQUENCE
(SIZE(1..maxNrofSRS-PosResourceSets-r16)) OF SRS-PosResourceSetId-r16
  OPTIONAL,   -- Need N
      srs-PosResourceSetToAddModList-r16                              SEQUENCE
(SIZE(1..maxNrofSRS-PosResourceSets-r16)) OF SRS-PosResourceSet-r16   OPTIONAL,-- Need
N
      srs-PosResourceToReleaseList-r16                                SEQUENCE
(SIZE(1..maxNrofSRS-PosResources-r16)) OF SRS-PosResourceId-r16   OPTIONAL,-- Need N
      srs-PosResourceToAddModList-r16                                 SEQUENCE
(SIZE(1..maxNrofSRS-PosResources-r16)) OF SRS-PosResource-r16 OPTIONAL      -- Need N
  ]]
  [[
  associatedSRS-List-r17            SEQUENCE   (SIZE(1..maxNrAssocBWP-r17))   OF
AssociatedSRS-Info-r17      OPTIONAL        -- Need R
  -- or
  associatedSRS-r17                 AssociatedSRS-Info-r17      OPTIONAL        -- Need
R
  ]]
  }
  AssociatedSRS-Info-r17 ::= SEQUENCE {
    servingCellId-r17               INTEGER (0..31),
    uplinkBWP-r17                   INTEGER (0..3)
  }
```

In the foregoing information element structure, AssociatedSRS-Info-r17 in the underlined part represents the second index information. servingCellId-r17 in the underlined part represents the index of the second carrier. uplinkBWP-r17 in the underlined part represents the index of the second BWP. It can be understood from the foregoing information element structure that the configuration information of the first BWP may include one or more pieces of second index information.

Figure 7A:
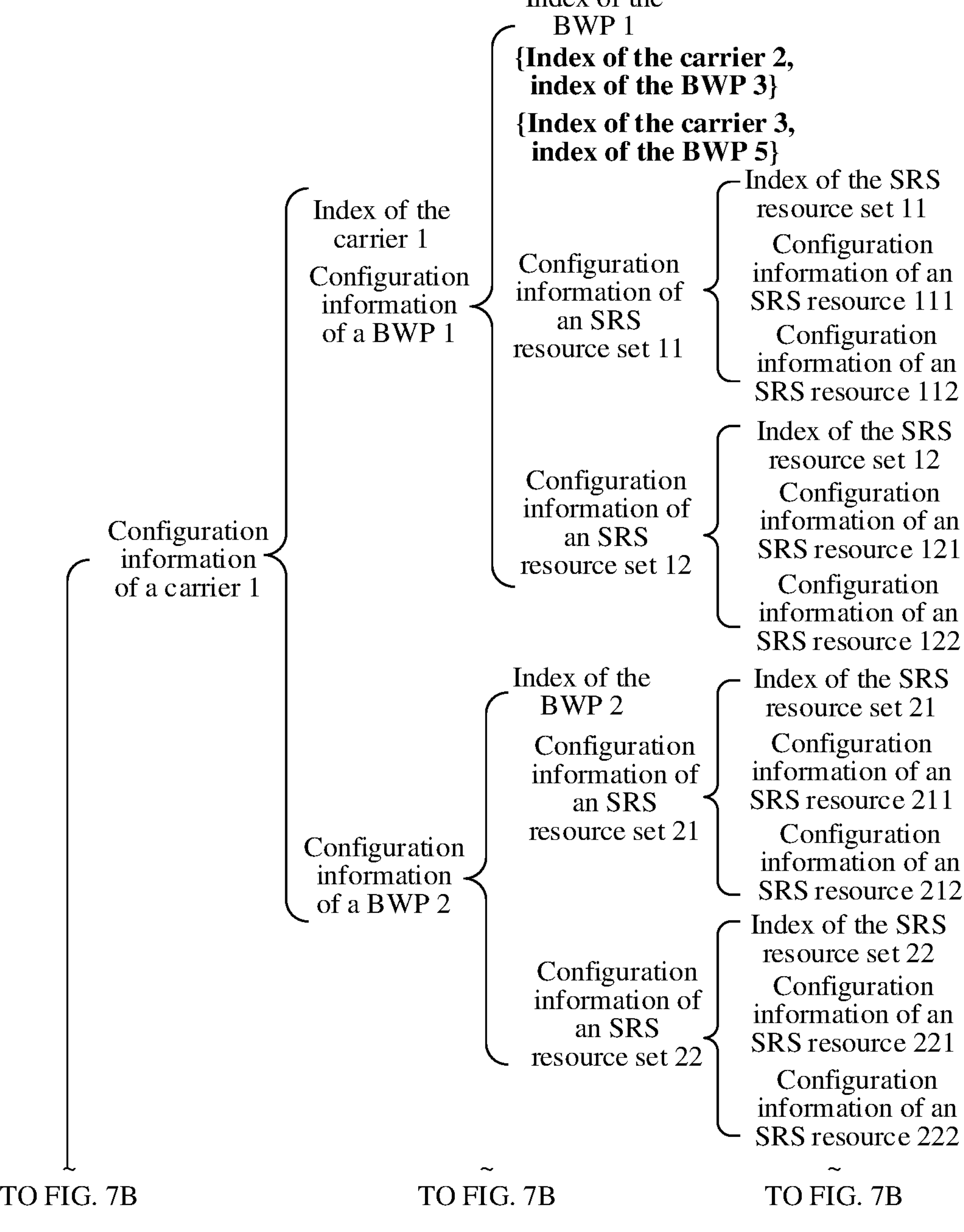
FIG. 7A to FIG. 7C are a schematic diagram of still another type of first configuration information according to an embodiment.
Figure 7B:
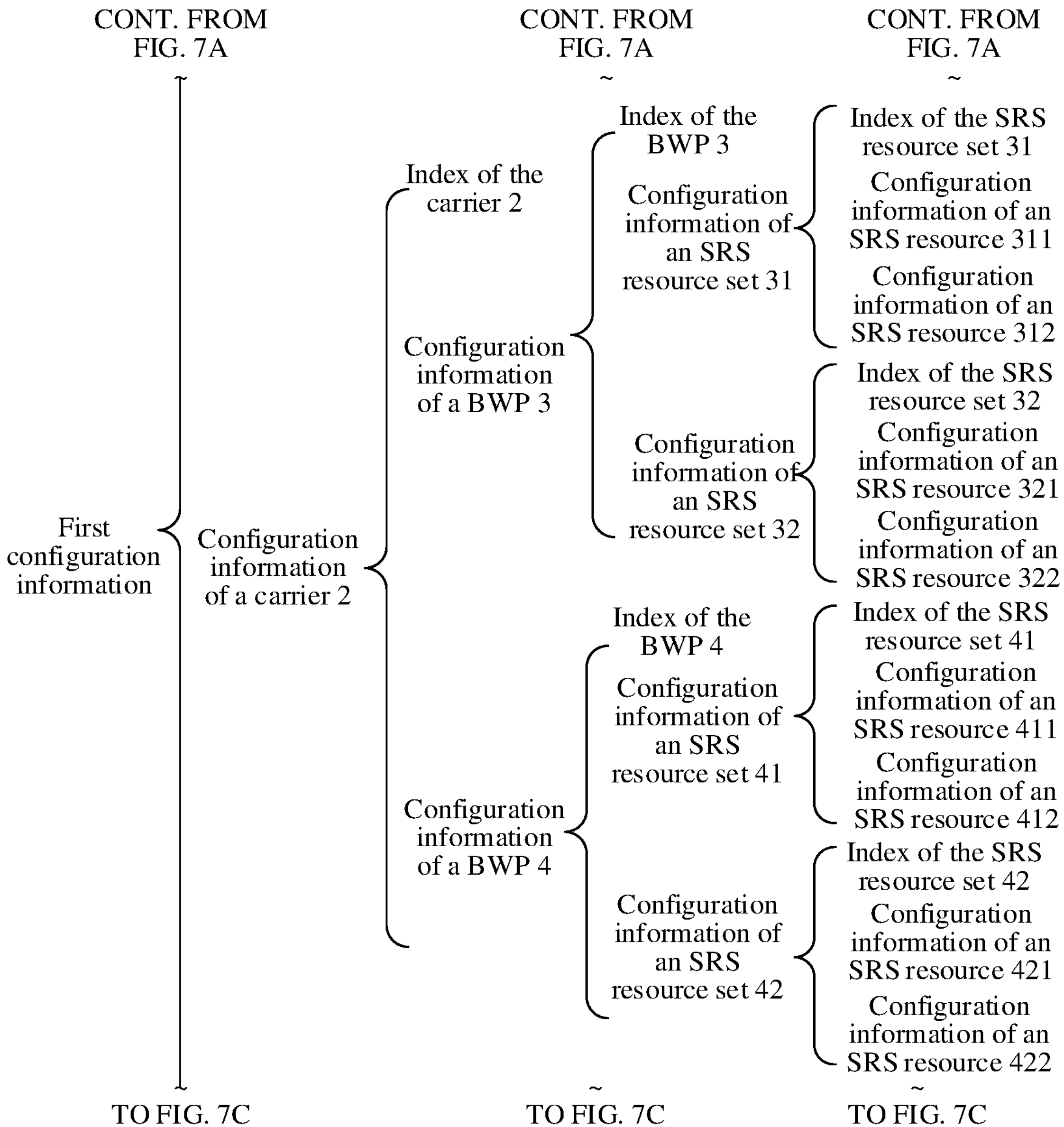
Figure 7C:
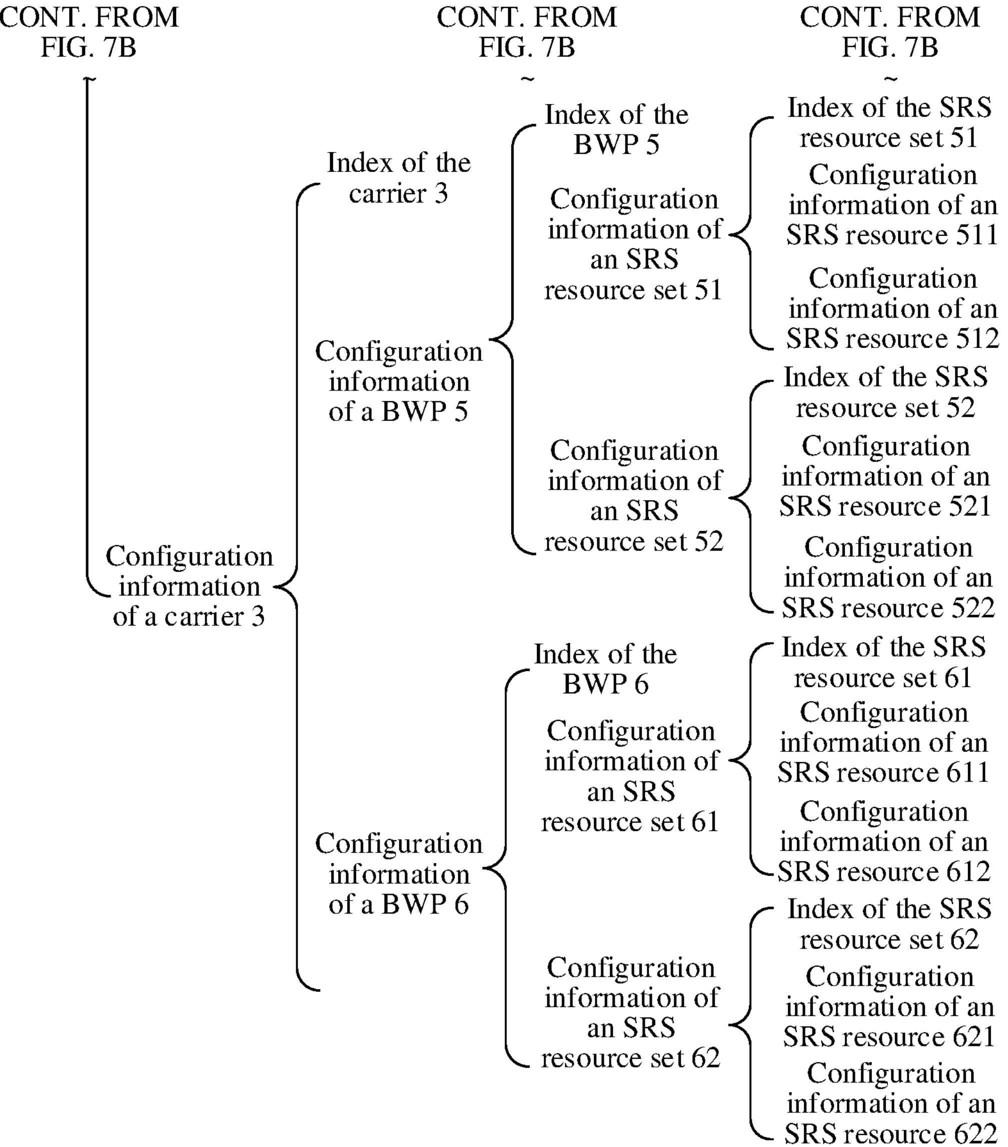

For another example, as shown in FIG. 7A to FIG. 7C, it is assumed that the configuration information of the BWP 1 on the carrier 1 includes {index of a carrier 2, index of a BWP 3 on the carrier 2} and {index of the carrier 3, index of a BWP 5 on the carrier 3}. In this case, the first configuration information indicates that there is an association relationship between simultaneously sent SRS resources in the BWP 1, the BWP 3, and the BWP 5.

Optionally, if indexes of BWPs on carriers are different, the configuration information of the first BWP may include only an index of the at least one second BWP, and does not need to include the index of the second carrier.

Optionally, that simultaneously sent uplink reference signal resources in an index of the first BWP and at least one second BWP have an association relationship may not be indicated in the manner 2. For example, an index of the first BWP and the index of the at least one second BWP may be configured to be the same, to indicate that the simultaneously sent uplink reference signal resources in the first BWP and the at least one second BWP have an association relationship.

3. Configuration information of a first carrier further includes an index of at least one second carrier, to indicate that simultaneously sent uplink reference signal resources on the first carrier and the at least one second carrier have an association relationship, where the first carrier and the second carrier are different carriers configured based on the first configuration information. The manner 3 is equivalent to indicating the association relationship between the uplink reference signal resources simultaneously sent on the different carriers by indicating an association relationship between the different carriers. This helps reduce signaling overheads.

Optionally, the configuration information of the first carrier may be ServingCellConfig.

For example, an information element structure of the configuration information of the first carrier may be as follows:

```
ServingCellConfig ::=                    SEQUENCE {
  tdd-UL-DL-ConfigurationDedicated          TDD-UL-DL-ConfigDedicatedOPTIONAL,
-- Cond TDD
  initialDownlinkBWP                        BWP-DownlinkDedicatedOPTIONAL,  --
Need M
  downlinkBWP-ToReleaseList                 SEQUENCE (SIZE (1..maxNrofBWPs)) OF
BWP-Id                    OPTIONAL,   -- Need N
  downlinkBWP-ToAddModList                  SEQUENCE (SIZE (1..maxNrofBWPs))
OF BWP-Downlink                 OPTIONAL,   -- Need N
  firstActiveDownlinkBWP-Id                          BWP-Id
OPTIONAL,   -- Cond SyncAndCellAdd
  bwp-InactivityTimer                       ENUMERATED {ms2, ms3, ms4, ms5, ms6,
ms8, ms10, ms20, ms30,
                                              ms40,  ms50,  ms60,
ms80, ms100, ms200, ms300, ms500,
                                              ms750, ms1280, ms1920,
ms2560, spare10, spare9, spare8,
                                              spare7,  spare6,  spare5,
spare4, spare3, spare2, spare1}     OPTIONAL,   --Need R
  defaultDownlinkBWP-Id                              BWP-Id
OPTIONAL,   -- Need S
  uplinkConfigUplinkConfigOPTIONAL,   -- Need M
  supplementaryUplinkUplinkConfigOPTIONAL,   -- Need M
  pdcch-ServingCellConfigSetupRelease           {PDCCH-ServingCellConfig}
OPTIONAL,   -- Need M
  pdsch-ServingCellConfigSetupRelease           {PDSCH-ServingCellConfig}
OPTIONAL,   -- Need M
  csi-MeasConfigSetupRelease                        {CSI-MeasConfig}
OPTIONAL,   -- Need M
  sCellDeactivationTimer                    ENUMERATED {ms20, ms40, ms80, ms160,
ms200, ms240,
                                              ms320, ms400, ms480,
ms520, ms640, ms720,
                                              ms840, ms1280, spare2,
spare1}     OPTIONAL,   -- Cond ServingCellWithoutPUCCH
  crossCarrierSchedulingConfigCrossCarrierSchedulingConfigOPTIONAL,   -- Need M
     tag-Id                                    TAG-Id,
     dummy                                        ENUMERATED   {enabled}
OPTIONAL,   -- Need R
  pathlossReferenceLinking                      ENUMERATED   {spCell, sCell}
OPTIONAL,   -- Cond SCellOnly
  servingCellMOMeasObjectIdOPTIONAL,   -- Cond MeasObject
     ...,
      [[
  lte-CRS-ToMatchAroundSetupRelease             {RateMatchPatternLTE-CRS}
OPTIONAL,   -- Need M
  rateMatchPatternToAddModList                      SEQUENCE   (SIZE
(1..maxNrofRateMatchPatterns)) OF RateMatchPattern         OPTIONAL,   -- Need N
  rateMatchPatternToReleaseList                     SEQUENCE   (SIZE
(1..maxNrofRateMatchPatterns)) OF RateMatchPatternId       OPTIONAL,   -- Need N
  downlinkChannelBW-PerSCS-List               SEQUENCE   (SIZE   (1..maxSCSs))   OF
SCS-SpecificCarrier                       OPTIONAL   -- Need S
     ]],
     [[
  supplementaryUplinkRelease                        ENUMERATED   {true}
OPTIONAL,   -- Need N
     tdd-UL-DL-ConfigurationDedicated-iab-mt-v16xy
TDD-UL-DL-ConfigDedicated-IAB-MT-v16xy               OPTIONAL,   -- Need
FFS
     firstWithinActiveTimeBWP-Id-r16                     BWP-Id
OPTIONAL,   -- Cond MultipleNonDormantBWP
     firstOutsideActiveTimeBWP-Id-r16                    BWP-Id
OPTIONAL,   -- Cond MultipleNonDormantBWP-WUS
     ca-SlotOffset-r16                         CHOICE {
        refSCS15kHz                               INTEGER (-2..2),
        refSCS30KHz                               INTEGER (-5..5),
        refSCS60KHz                               INTEGER (-10..10),
        refSCS120KHz                              INTEGER (-20..20)
  }
OPTIONAL,   -- Cond AsyncCA
     channelAccessConfig-r16                         ChannelAccessConfig-r16
OPTIONAL   -- Need M
  ]]
  [[
  srs-AssociatedCellList-r17       SEQUENCE   (SIZE(1..maxNrAssocBWP-r17))   OF
SRS-AssociatedCell-Info-r17      OPTIONAL       -- Need R
  -- or
  srs-associatedCell-r17            SRS-AssociatedCell-Info-r17      OPTIONAL      --
Need R
  ]]
  }
```

-continued

```
SRS-AssociatedCell-Info-r17 ::= SEQUENCE {
  servingCellId-r17           INTEGER (0..31)
}
```

servingCellId-r17 in SRS-AssociatedCell-Info-r17 in the underlined part represents an index of a second BWP.

Figure 8A:
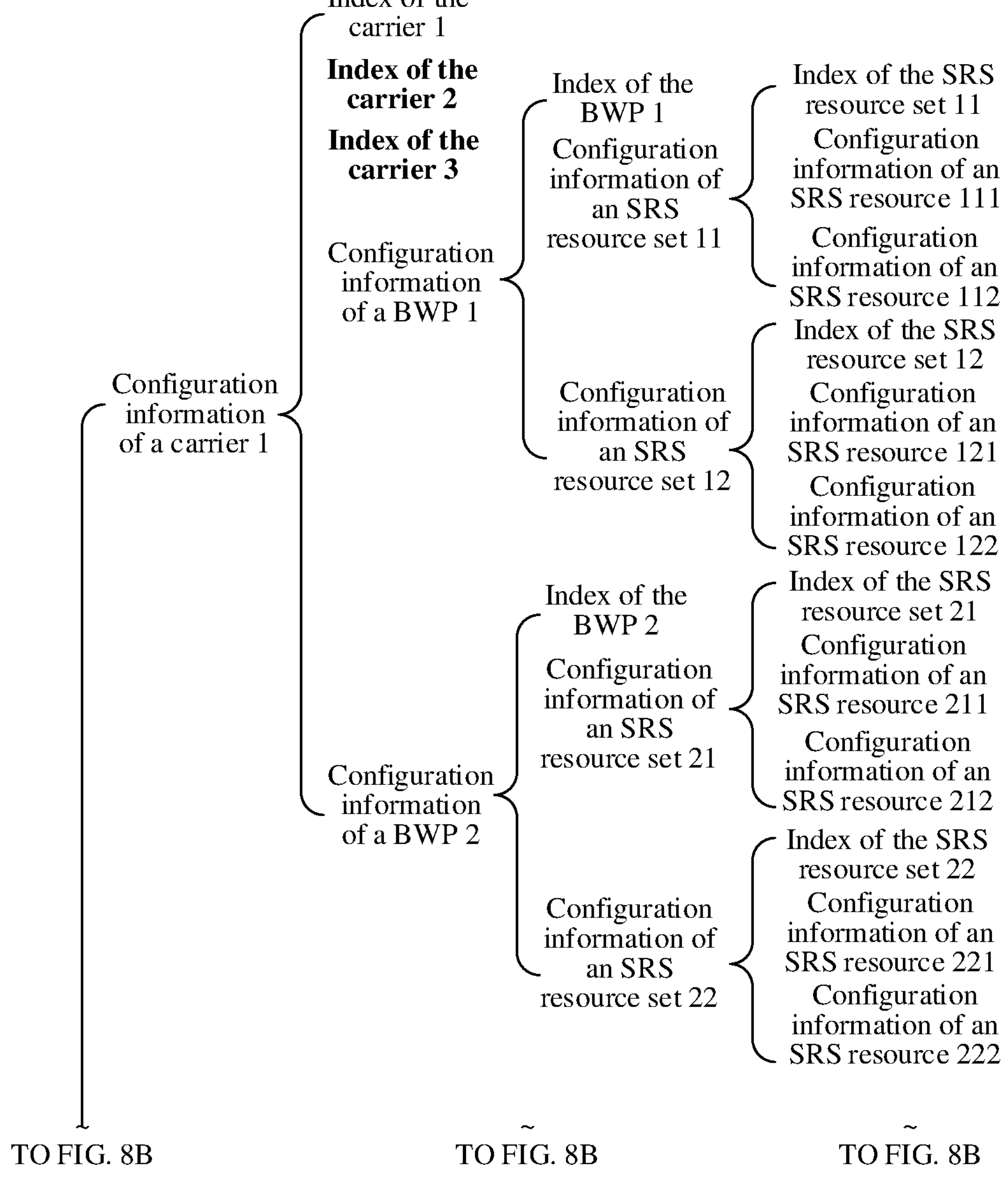
FIG. 8A to FIG. 8C are a schematic diagram of yet another type of first configuration information according to an embodiment.
Figure 8B:
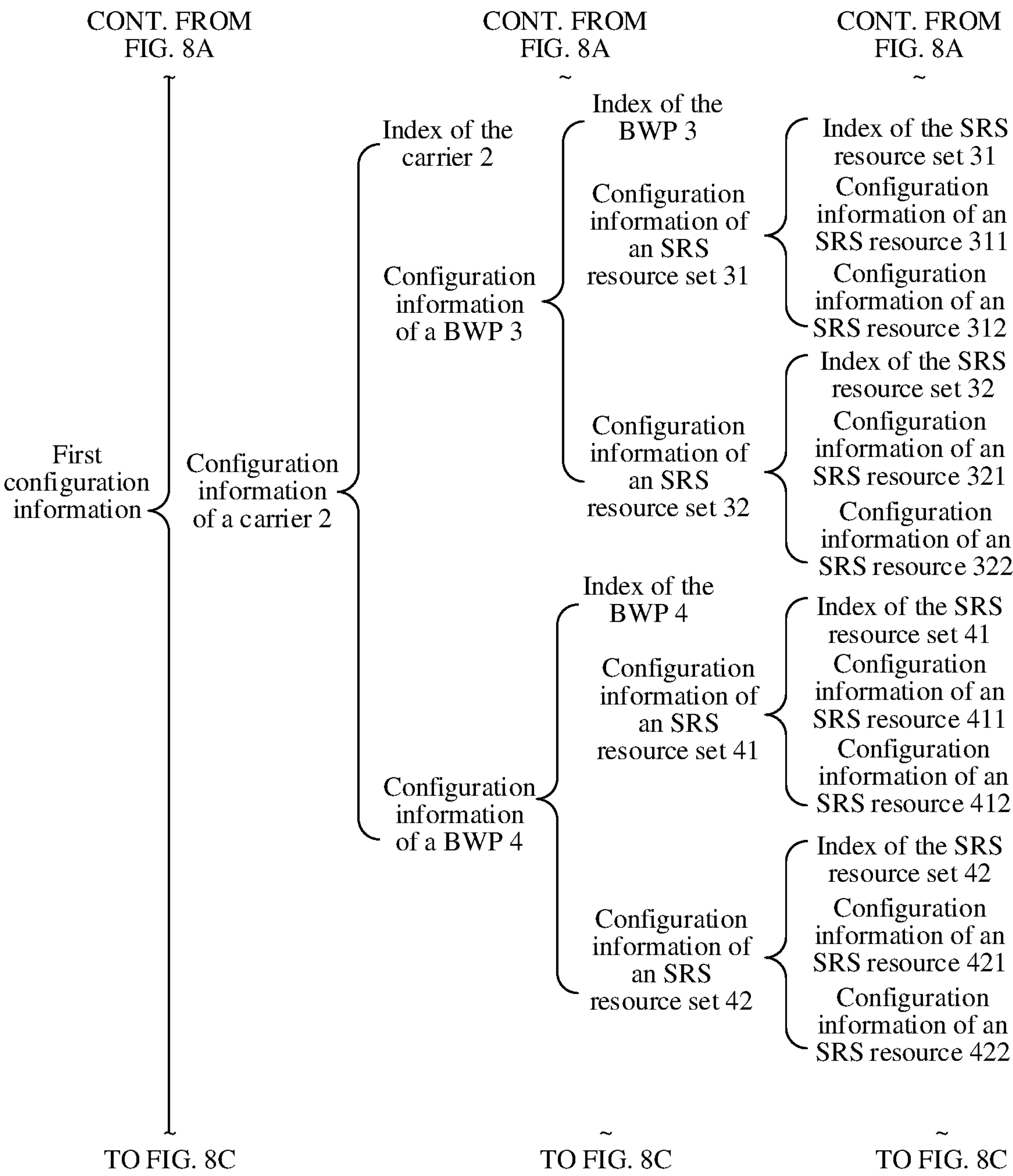
Figure 8C:
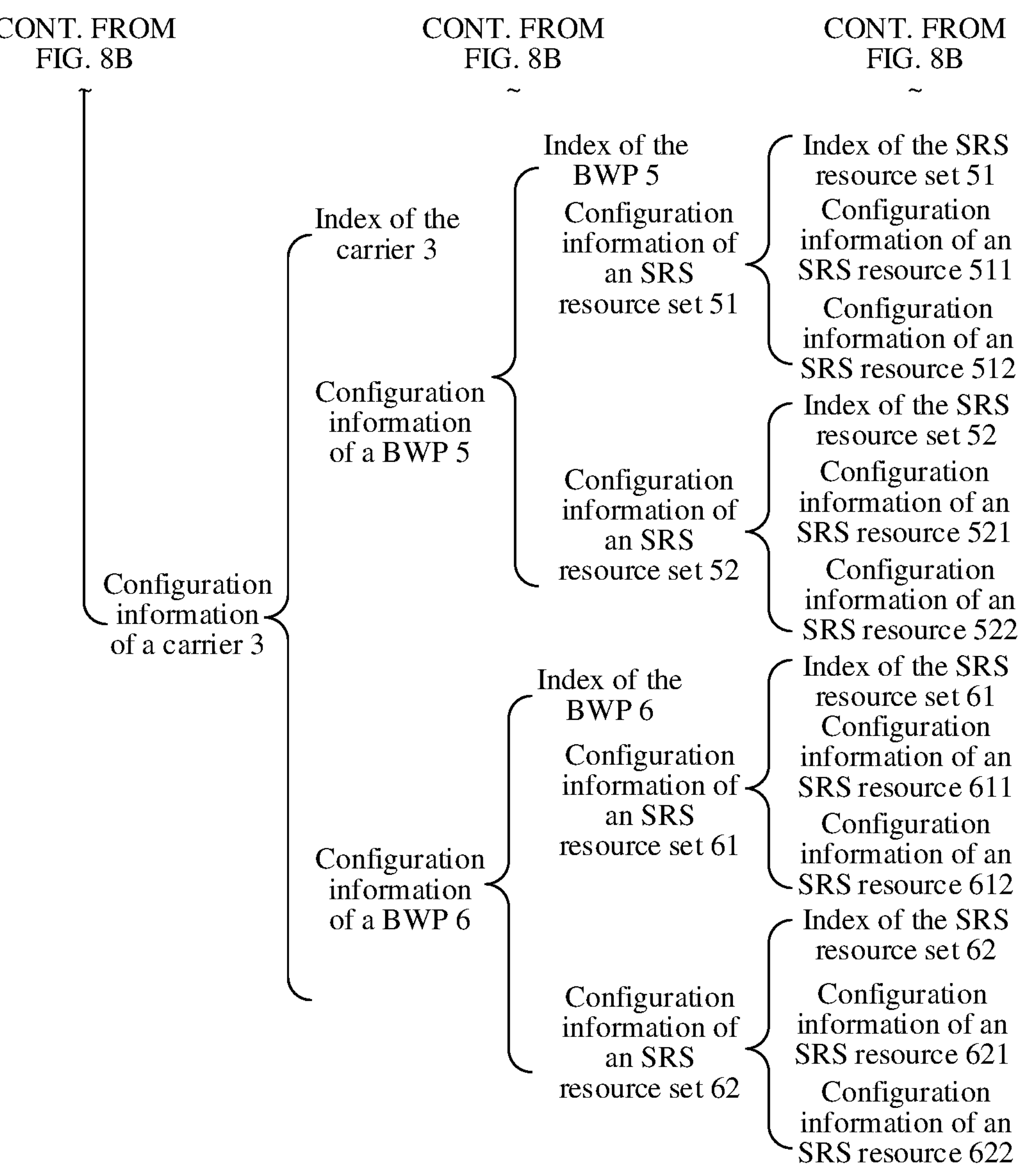

For another example, as shown in FIG. 8A to FIG. 8C, it is assumed that the configuration information of the carrier 1 includes an index of a carrier 2 and an index of the carrier 3. In this case, the first configuration information indicates that there is an association relationship between simultaneously sent uplink reference signal resources on the carrier 1, the carrier 2, and the carrier 3.

Optionally, in the manner 1 to the manner 3, the index of the second carrier includes one or both of the following: an index of a serving cell in which the second carrier is located, and indication information indicating that the second carrier is a normal uplink carrier or a supplementary uplink carrier of the serving cell in which the second carrier is located. For example, if the serving cell in which the second carrier is located includes only one uplink carrier, the index of the second carrier may be represented by using the index of the serving cell in which the second carrier is located. If the serving cell in which the second carrier is located includes two uplink carriers, the index of the second carrier may be represented by using the index of the serving cell in which the second carrier is located and the indication information indicating whether the second carrier is the normal uplink carrier or the supplementary uplink carrier of the serving cell in which the second carrier is located. Based on this optional manner, the second carrier can be accurately indicated.

In another possible implementation, a manner in which the first configuration information indicates the association relationship between the uplink reference signals simultaneously sent on the different carriers may be: The first configuration information indicates an association relationship between uplink reference signal resource sets on the different carriers. For an implementation in which the first configuration information indicates the association relationship between the uplink reference signal resource sets on the different carriers, refer to the descriptions in the manner 1. Details are not described herein. For example, if the first configuration information indicates that there is an association relationship between a first uplink reference signal resource set and at least one second uplink reference signal resource set, there is an association relationship between simultaneously sent uplink reference signals in the first uplink reference signal resource set and the at least one second uplink reference signal resource set.

In still another possible implementation, a manner in which the first configuration information indicates the association relationship between the uplink reference signals simultaneously sent on the different carriers may be: The first configuration information indicates an association relationship between BWPs on the different carriers. For an implementation in which the first configuration information indicates the association relationship between the BWPs on the different carriers, refer to the descriptions in the manner 2. Details are not described herein. For example, if the first configuration information indicates that there is an association relationship between a first BWP and at least one second BWP, there is an association relationship between simultaneously sent uplink reference signals in the first BWP and the at least one second BWP.

In yet another possible implementation, a manner in which the first configuration information indicates the association relationship between the uplink reference signals simultaneously sent on the different carriers may be: The first configuration information indicates an association relationship between the different carriers. For an implementation in which the first configuration information indicates the association relationship between the different carriers, refer to the descriptions in the manner 3. Details are not described herein. For example, if the first configuration information indicates that there is an association relationship between a first carrier and at least one second carrier, there is an association relationship between simultaneously sent uplink reference signals on the first carrier and the at least one second carrier.

402: The first network device sends the first configuration information to the terminal device.

In this embodiment, the first network device sends the first configuration information to the terminal device after generating the first configuration information.

403: The terminal device sends the uplink reference signals having the association relationship, where the uplink reference signals having the association relationship share an antenna port or the uplink reference signals having the association relationship have a phase difference.

In this embodiment, the terminal device sends the uplink reference signals having the association relationship after receiving the first configuration information.

An antenna port is defined such that a channel over which a symbol on the antenna port is carried can be inferred from a signal over which another symbol on the antenna port is carried. In other words, if a channel over which a symbol on an antenna port is carried can be inferred from a channel over which another symbol on another antenna port is carried, the two antenna ports are a same antenna port. In this embodiment, the uplink reference signals having the association relationship and sharing an antenna port means that antenna ports of the uplink reference signals having the association relationship are a same antenna port. The uplink reference signals having the association relationship and sharing an antenna port may alternatively be understood as channels of the uplink reference signals having the association relationship are the same, phases of the uplink reference signals having the association relationship are continuous, or the phases of the uplink reference signals having the association relationship are the same.

When sending the uplink reference signals having the association relationship, the terminal device enables the uplink reference signals having the association relationship to share an antenna port, or enables the uplink reference signals having the association relationship to have a phase difference. For example, it is assumed that there is an association relationship between an SRS 111, an SRS 311, and an SRS 511 that are simultaneously sent on different carriers. If the SRSs having the association relationship share an antenna port, the SRS 111, the SRS 311, and the SRS 511 pass through a completely same channel, and a second network device simultaneously measures channels that the SRS 111, the SRS 311, and the SRS 511 pass through. It may be equivalently considered as that the terminal device sends a new SRS whose bandwidth is equal to a sum of bandwidths of the SRS 111, the SRS 311, and the SRS 511, and the second network device also receives the new SRS. This is equivalent to expanding a signal bandwidth. Because positioning precision may depend on the signal bandwidth, the positioning precision may be improved.

For another example, it is assumed that there is an association relationship between an SRS 111, an SRS 311, and an SRS 511 that are simultaneously sent on different carriers. If the SRSs having the association relationship have a phase difference, channels that the SRS 111, the SRS 311, and the SRS 511 pass through have same features except having a phase difference. In this way, in an aspect, the second network device may estimate the phase difference, and then compensate for a channel phase of some SRSs in the SRS 111, the SRS 311, and the SRS 511 based on the phase difference, to enable the channels of the SRS 111, the SRS 311, and the SRS 511 to have a same phase, and enable the SRS 111, the SRS 311, and the SRS 511 to share an antenna port. Based on the foregoing analysis, enabling the SRS 111, the SRS 311, and the SRS 511 to share an antenna port is equivalent to expanding a signal bandwidth. Because positioning precision may depend on the signal bandwidth, the positioning precision may be improved. In another aspect, even if the second network device cannot estimate the phase difference and does not compensate for the phase difference, the second network device may still combine measurement results on the respective channels of the SRS 111, the SRS 311, and the SRS 511, to obtain a frequency diversity gain and improve the positioning precision. However, an equivalent large bandwidth gain cannot be obtained.

It can be understood that in the method described in FIG. 4, a network side can configure, for the terminal device, which uplink reference signals share an antenna port or which uplink reference signals have a phase difference. A plurality of uplink reference signals sharing an antenna port may indicate that the plurality of uplink reference signals may pass through a completely same channel. It may be equivalently considered as that the terminal device sends a new uplink reference signal, and a bandwidth of the new uplink reference signal is equal to a sum of bandwidths of the plurality of uplink reference signals. Therefore, enabling the plurality of uplink reference signals to share the antenna port can enlarge a signal bandwidth. Therefore, configuration of a large-bandwidth uplink reference signal can be implemented by configuring, for the terminal device, which uplink reference signals share an antenna port. By configuring, for the terminal device, which uplink reference signals have a phase difference, the network device may estimate the phase difference between these uplink reference signals, and then compensate for a channel phase of the uplink reference signal based on the phase difference, so that a plurality of uplink reference signals may share an antenna port and therefore a signal bandwidth may be enlarged. Therefore, configuration of a large-bandwidth uplink reference signal can also be implemented by configuring, for the terminal device, which uplink reference signals have a phase difference.

In a possible implementation, in a process in which the terminal device sends the uplink reference signals having the association relationship, the phase difference between the uplink reference signals having the association relationship is a fixed value. Optionally, that the phase difference between the uplink reference signals having the association relationship changes very slightly in the process in which the terminal device sends the uplink reference signals having the association relationship may also be understood as that the phase difference between the uplink reference signals having the association relationship is a fixed value in the process in which the terminal device sends the uplink reference signals having the association relationship. The phase difference between the uplink reference signals having the association relationship is set to the fixed value in the process in which the terminal device sends the uplink reference signals having the association relationship. This helps the terminal device accurately estimate the phase difference between the uplink reference signals having the association relationship. For example, it is assumed that there is an association relationship between an SRS 111, an SRS 311, and an SRS 511 that are simultaneously sent on different carriers. In a process in which the terminal device sends the SRSs having the association relationship, a phase difference between the SRS 111 and the SRS 311 is a fixed value 1, a phase difference between the SRS 111 and the SRS 511 is a fixed value 2, and a phase difference between the SRS 311 and the SRS 511 is a fixed value 3. The fixed value 1, the fixed value 2, and the fixed value 3 may be the same or different.

In a possible implementation, when the uplink reference signals have a plurality of antenna ports, same antenna port numbers of the uplink reference signals having the association relationship correspond to a same antenna port. In other words, when the uplink reference signals have a plurality of antenna ports, the same antenna port numbers of the uplink reference signals having the association relationship share an antenna port. For example, it is assumed that there is an association relationship between an SRS 111, an SRS 311, and an SRS 511 that are simultaneously sent on different carriers. The SRS 111 has two antenna ports, and antenna port numbers are separately an antenna port #1 and an antenna port #2. The SRS 311 has two antenna ports, and antenna port numbers are separately an antenna port #1 and an antenna port #2. The SRS 511 has two antenna ports, and antenna port numbers are separately an antenna port #1 and an antenna port #2. The antenna port #1 of the SRS 111, the antenna port #1 of the SRS 311, and the antenna port #1 of the SRS 511 correspond to a same antenna port. The antenna port #2 of the SRS 111, the antenna port #2 of the SRS 311, and the antenna port #2 of the SRS 511 correspond to a same antenna port.

In a possible implementation, the first configuration information further indicates that the uplink reference signals having the association relationship share the antenna port or the uplink reference signals having the association relationship have the phase difference. For example, a protocol may specify the following two association types: The uplink reference signals having the association relationship share an antenna port, and the uplink reference signals having the association relationship have a phase difference. The first network device may select one association type from the two association types based on a requirement, and indicate the selected association type to the terminal device by using the first configuration information. After receiving the first configuration information, the terminal device sends the uplink reference signals having the association relationship based on the association type indicated by the first configuration information. Based on this possible implementation, the network side can flexibly configure a type of the association relationship for the terminal device.

Optionally, the type of the association relationship may not be indicated by the first configuration information, and the protocol may directly specify an association type. For example, the protocol may directly specify that the uplink reference signals having the association relationship share an antenna port, or the protocol may directly specify that the uplink reference signals having the association relationship have a phase difference.

Figure 9:
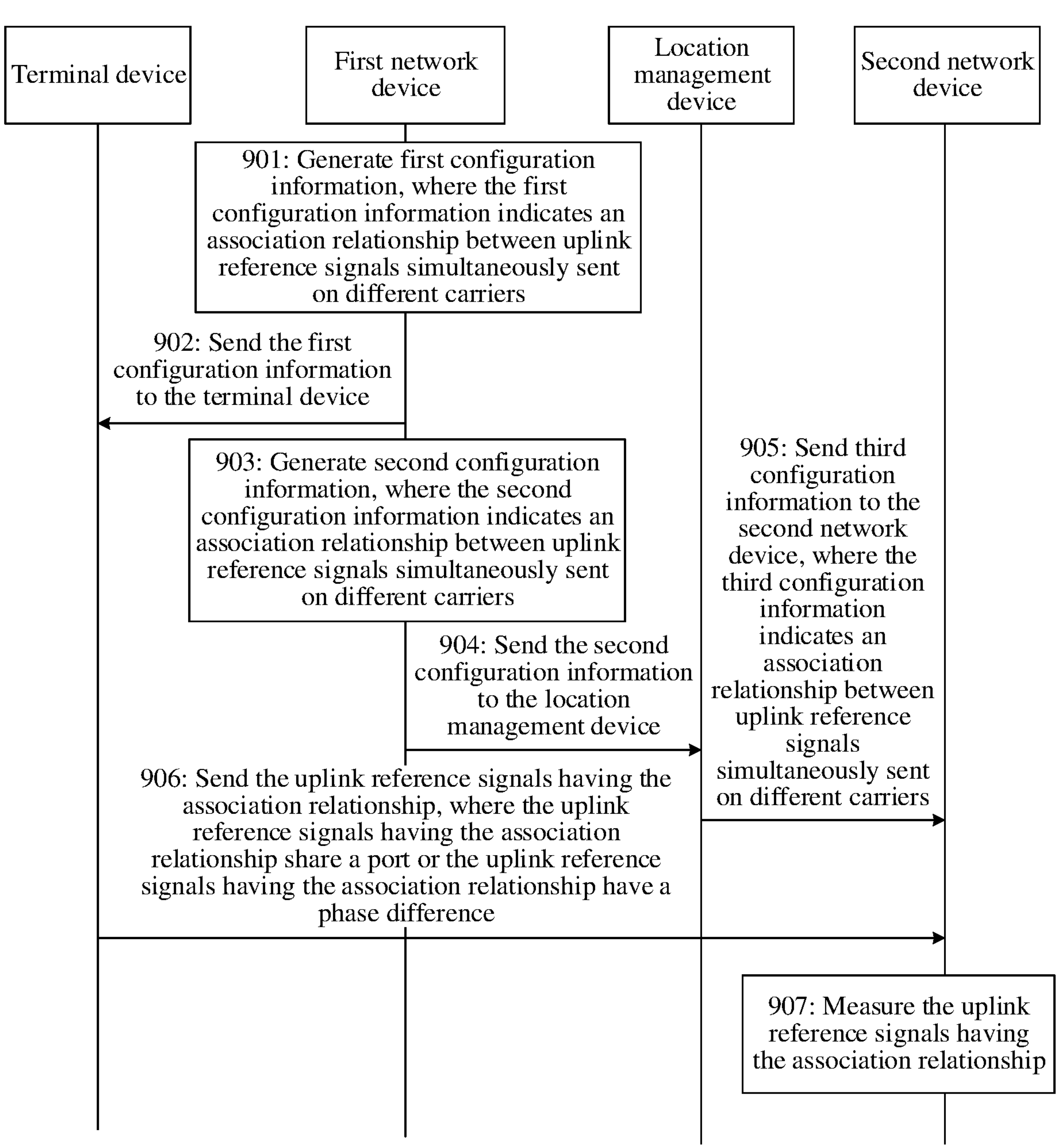
FIG. 9 is a schematic flowchart of another uplink reference signal association method according to an embodiment.

FIG. 9 is a schematic flowchart of an uplink reference signal association method according to an embodiment. As shown in FIG. 9, the uplink reference signal association method includes the following step 901 to step 907. The method shown in FIG. 9 may be performed by a terminal device, a first network device, a second network device, and a location management device, or may be performed by a chip in the terminal device, a chip in the first network device, a chip in the second network device, and a chip in the location management device. In FIG. 9, an example in which the method is performed by the terminal device, the first network device, the second network device, and the location management device is used for description.

901: The first network device generates first configuration information, where the first configuration information indicates an association relationship between uplink reference signals simultaneously sent on different carriers.

902: The first network device sends the first configuration information to the terminal device.

For implementations of step 901 and step 902, refer to the implementations of step 401 and step 402. Details are not described herein.

903: The first network device generates second configuration information, where the second configuration information indicates an association relationship between uplink reference signals simultaneously sent on different carriers.

Step 903 and step 904 may be performed before step 901 and step 902 or may be performed after step 901 and step 902. Alternatively, step 903 and step 904 may be performed simultaneously with step 901 and step 902.

The association relationship indicated by the second configuration information may be the same as or different from the association relationship indicated by the first configuration information. For example, the first configuration information indicates that there is an association relationship between simultaneously sent SRSs in an SRS resource set 11, an SRS resource set 31, and an SRS resource set 51. The second configuration information also indicates that there is an association relationship between the simultaneously sent SRSs in the SRS resource set 11, the SRS resource set 31, and the SRS resource set 51.

For another example, the first configuration information indicates that there is an association relationship between simultaneously sent SRSs in a BWP 1, a BWP 3, and a BWP 5. The second configuration information indicates that there is an association relationship between simultaneously sent SRSs in an SRS resource set 11, an SRS resource set 31, and an SRS resource set 51. Alternatively, the second configuration information indicates that there is an association relationship between simultaneously sent SRSs on a carrier 1, a carrier 2, and a carrier 3. The carrier 1 includes the BWP 1, and the BWP 1 includes the SRS resource set 11. The carrier 2 includes the BWP 3, and the BWP 3 includes the SRS resource set 31. The carrier 3 includes the BWP 5, and the BWP 5 includes the SRS resource set 51.

For another example, the first configuration information indicates that there is an association relationship between simultaneously sent SRSs on a carrier 1, a carrier 2, and a carrier 3. The second configuration information indicates that there is an association relationship between the simultaneously sent SRSs on the carrier 1, the carrier 2, and the carrier 3.

In a possible implementation, a manner in which the second configuration information indicates the association relationship between the uplink reference signals simultaneously sent on the different carriers may be: The second configuration information indicates an association relationship between uplink reference signal resources simultaneously sent on the different carriers. In other words, the second configuration information may indicate the association relationship between the uplink reference signals simultaneously sent on the different carriers by indicating the association relationship between the uplink reference signal resources simultaneously sent on the different carriers. In this way, the association relationship between the uplink reference signals simultaneously sent on the different carriers can be accurately indicated. For example, if the second configuration information indicates that there is an association relationship between an uplink reference signal resource 1 and an uplink reference signal resource 2 that are simultaneously sent on different carriers, the second configuration information is equivalent to indicating that there is an association relationship between an uplink reference signal corresponding to the uplink reference signal resource 1 and an uplink reference signal corresponding to the uplink reference signal resource 2.

Optionally, the second configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set. In other words, the second configuration information may further indicate uplink reference signal resource sets of the terminal device on carriers, and uplink reference signal resources in these uplink reference signal resource sets. The uplink reference signal resource set indicated in the second configuration information may be an uplink reference signal resource set in an activated BWP on a carrier. An uplink reference signal resource set may be activated on one carrier at a moment.

Figure 10:
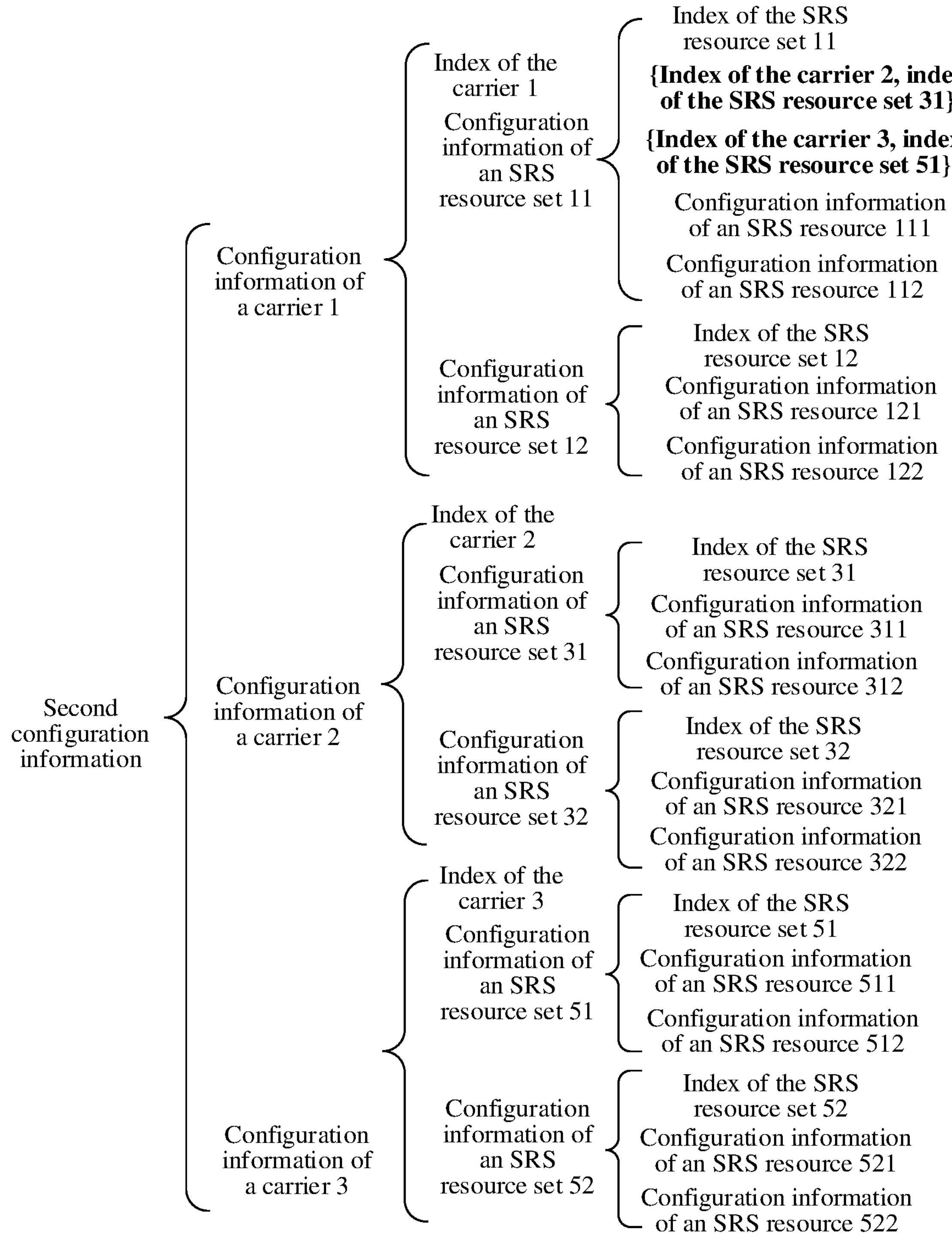
FIG. 10 is a schematic diagram of one type of second configuration information according to an embodiment.

For example, the first configuration information is shown in FIG. 6A to FIG. 6C. A BWP 1 on a carrier 1 is activated, a BWP 3 on a carrier 2 is activated, and a BWP 5 on a carrier 3 is activated. As shown in FIG. 10, the second configuration information includes configuration information of the carrier 1 to configuration information of the carrier 3. The configuration information of the carrier 1 includes an index of the carrier 1, configuration information of an SRS resource set 11, and configuration information of an SRS resource set 12. Configuration information of the carrier 2 includes an index of the carrier 2, configuration information of an SRS resource set 31, and configuration information of an SRS resource set 32. The configuration information of the carrier 3 includes an index of the carrier 3, configuration information of an SRS resource set 51, and configuration information of an SRS resource set 52.

In other words, the second configuration information indicates that the terminal device includes the SRS resource set 11 and the SRS resource set 12 on the carrier 1. The SRS resource set 11 includes an SRS resource 111 and an SRS resource 112. The SRS resource set 12 includes an SRS resource 121 and an SRS resource 122. In addition, the second configuration information indicates that the terminal device includes the SRS resource set 31 and the SRS resource set 32 on the carrier 2. The SRS resource set 31 includes an SRS resource 311 and an SRS resource 312. The SRS resource set 32 includes an SRS resource 321 and an SRS resource 322. In addition, the second configuration information indicates that the terminal device includes the SRS resource set 51 and the SRS resource set 52 on the carrier 3. The SRS resource set 51 includes an SRS resource 511 and an SRS resource 512. The SRS resource set 52 includes an SRS resource 521 and an SRS resource 522.

The second configuration information may indicate, in the following two implementations, the association relationship between the uplink reference signal resources simultaneously sent on the different carriers.

1. Configuration information of a third uplink reference signal resource set further includes at least one piece of third index information, and the third index information includes an index of a fourth carrier and an index of a fourth uplink reference signal resource set on the fourth carrier, to indicate that simultaneously sent uplink reference signal resources in the third uplink reference signal resource set and at least one fourth uplink reference signal resource set have an association relationship, where the third uplink reference signal resource set and the at least one fourth uplink reference signal resource set are resource sets configured on different carriers based on the second configuration information. The manner 1 is equivalent to indicating the association relationship between the uplink reference signal resources simultaneously sent on the different carriers by indicating an association relationship between uplink reference signal resource sets on the different carriers. This helps reduce signaling overheads.

A principle of the manner 1 in which the second configuration information indicates the association relationship is the same as that of the manner 1 in which the first configuration information indicates the association relationship. Details are not described herein.

Optionally, if indexes of uplink reference signal resource sets on carriers are different, the configuration information of the third uplink reference signal resource set may include only an index of the at least one fourth uplink reference signal resource set and does not need to include the index of the fourth carrier.

Optionally, that simultaneously sent uplink reference signal resources in the third uplink reference signal resource set and at least one fourth uplink reference signal resource set have an association relationship may not be indicated in the manner 1 in which the second configuration information indicates the association relationship. For example, an index of the third uplink reference signal resource set and the index of the at least one fourth uplink reference signal resource set may be configured to be the same, to indicate that the simultaneously sent uplink reference signal resources in the third uplink reference signal resource set and the at least one fourth uplink reference signal resource set have an association relationship.

2. Configuration information of a third carrier further includes an index of at least one fourth carrier, to indicate that simultaneously sent uplink reference signal resources on the third carrier and the at least one fourth carrier have an association relationship, where the third carrier and the at least one fourth carrier are different carriers configured based on the second configuration information. The manner 2 is equivalent to indicating the association relationship between the uplink reference signal resources simultaneously sent on the different carriers by indicating an association relationship between the different carriers. This helps reduce signaling overheads.

A principle of the manner 2 in which the second configuration information indicates the association relationship is the same as that of the manner 3 in which the first configuration information indicates the association relationship. Details are not described herein.

Optionally, in the manner 1 and the manner 2 in which the second configuration information indicates the association relationship, the index of the fourth carrier includes one or both of the following: an index of a serving cell in which the fourth carrier is located, and indication information indicating that the fourth carrier is a normal uplink carrier or a supplementary uplink carrier of the serving cell in which the fourth carrier is located. For example, if the serving cell includes only one uplink carrier, the index of the fourth carrier may be represented by using the index of the serving cell in which the fourth carrier is located. If the serving cell includes two uplink carriers, the index of the fourth carrier may be represented by using the index of the serving cell in which the fourth carrier is located and the indication information indicating whether the fourth carrier is the normal uplink carrier or the supplementary uplink carrier of the serving cell in which the fourth carrier is located.

In another possible implementation, a manner in which the second configuration information indicates the association relationship between the uplink reference signals simultaneously sent on the different carriers may be: The second configuration information indicates an association relationship between uplink reference signal resource sets on the different carriers. For an implementation in which the second configuration information indicates the association relationship between the uplink reference signal resource sets on the different carriers, refer to the descriptions in the manner 1 in which the second configuration information indicates the association relationship. Details are not described herein. For example, if the second configuration information indicates that there is an association relationship between a third uplink reference signal resource set and a fourth uplink reference signal resource set, there is an association relationship between simultaneously sent uplink reference signals in the third uplink reference signal resource set and the fourth uplink reference signal resource set.

In still another possible implementation, a manner in which the second configuration information indicates the association relationship between the uplink reference signals simultaneously sent on the different carriers may be: The second configuration information indicates an association relationship between the different carriers. For an implementation in which the second configuration information indicates the association relationship between the different carriers, refer to the descriptions in the manner 2 in which the second configuration information indicates the association relationship. Details are not described herein. For example, if the second configuration information indicates that there is an association relationship between a third carrier and a fourth carrier, there is an association relationship between simultaneously sent uplink reference signals on the third carrier and the fourth carrier.

904: The first network device sends the second configuration information to the location management device.

In this embodiment, the first network device sends the second configuration information to the location management device after generating the second configuration information.

905: The location management device sends third configuration information to the second network device, where the third configuration information further indicates an association relationship between uplink reference signals simultaneously sent on different carriers.

In this embodiment, after receiving the second configuration information sent by the first network device, the location management device sends the third configuration information to the second network device.

The third configuration information may be generated based on the second configuration information. The third configuration information may include all or some content of the second configuration information.

For example, the first configuration information indicates that there is an association relationship between the simultaneously sent SRSs in the SRS resource set 11, the SRS resource set 31, and the SRS resource set 51. The second configuration information also indicates that there is an association relationship between the simultaneously sent SRSs in the SRS resource set 11, the SRS resource set 31, and the SRS resource set 51. The third configuration information also indicates that there is an association relationship between the simultaneously sent SRSs in the SRS resource set 11, the SRS resource set 31, and the SRS resource set 51. Alternatively, the third configuration information indicates that there is an association relationship between simultaneously sent SRSs in the SRS resource set 11 and the SRS resource set 31.

For another example, the first configuration information indicates that there is an association relationship between the simultaneously sent SRSs on the carrier 1, the carrier 2, and the carrier 3. The second configuration information indicates that there is an association relationship between the simultaneously sent SRSs on the carrier 1, the carrier 2, and the carrier 3. The third configuration information also indicates that there is an association relationship between the simultaneously sent SRSs on the carrier 1, the carrier 2, and the carrier 3. Alternatively, the third configuration information indicates that there is an association relationship between simultaneously sent SRSs on the carrier 1 and the carrier 2.

In a possible implementation, a manner in which the third configuration information indicates the association relationship between the uplink reference signals simultaneously sent on the different carriers may be: The third configuration information indicates an association relationship between uplink reference signal resources simultaneously sent on the different carriers. In other words, the third configuration information may indicate the association relationship between the uplink reference signals simultaneously sent on the different carriers by indicating the association relationship between the uplink reference signal resources simultaneously sent on the different carriers. In this way, the association relationship between the uplink reference signals simultaneously sent on the different carriers can be accurately indicated. For example, if the third configuration information indicates that there is an association relationship between the uplink reference signal resource 1 and the uplink reference signal resource 2 that are simultaneously sent on different carriers, the third configuration information is equivalent to indicating that there is an association relationship between an uplink reference signal corresponding to the uplink reference signal resource 1 and an uplink reference signal corresponding to the uplink reference signal resource 2.

Optionally, the third configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set. In other words, the third configuration information may further indicate uplink reference signal resource sets of the terminal device on carriers, and uplink reference signal resources in these uplink reference signal resource sets. The uplink reference signal resource set indicated in the third configuration information may be an uplink reference signal resource set in an activated BWP on a carrier.

The third configuration information may indicate, in the following two implementations, the association relationship between the uplink reference signal resources simultaneously sent on the different carriers.

1. Configuration information of a fifth uplink reference signal resource set further includes at least one piece of fourth index information, and the fourth index information includes an index of a sixth carrier and an index of a sixth uplink reference signal resource set on the sixth carrier, to indicate that simultaneously sent uplink reference signal resources in the fifth uplink reference signal resource set and at least one sixth uplink reference signal resource set have an association relationship, where the fifth uplink reference signal resource set and the at least one sixth uplink reference signal resource set are resource sets configured on different carriers based on the third configuration information. The manner 1 is equivalent to indicating the association relationship between the uplink reference signal resources simultaneously sent on the different carriers by indicating an association relationship between uplink reference signal resource sets on the different carriers. This helps reduce signaling overheads.

A principle of the manner 1 in which the third configuration information indicates the association relationship is the same as that of the manner 1 in which the first configuration information indicates the association relationship. Details are not described herein.

Optionally, if indexes of uplink reference signal resource sets on carriers are different, the configuration information of the fifth uplink reference signal resource set may include only an index of the at least one sixth uplink reference signal resource set and does not need to include the index of the sixth carrier.

Optionally, that simultaneously sent uplink reference signal resources in the fifth uplink reference signal resource set and at least one sixth uplink reference signal resource set have an association relationship may not be indicated in the manner 1. For example, an index of the fifth uplink reference signal resource set and the index of the at least one sixth uplink reference signal resource set may be configured to be the same, to indicate that the simultaneously sent uplink reference signal resources in the fifth uplink reference signal resource set and the at least one sixth uplink reference signal resource set have an association relationship.

2. Configuration information of a fifth carrier further includes an index of at least one sixth carrier, to indicate that simultaneously sent uplink reference signal resources on the fifth carrier and the at least one sixth carrier have an association relationship, where the fifth carrier and the at least one sixth carrier are different carriers configured based on the third configuration information. The manner 2 is equivalent to indicating the association relationship between the uplink reference signal resources simultaneously sent on the different carriers by indicating an association relationship between the different carriers. This helps reduce signaling overheads.

A principle of the manner 2 in which the third configuration information indicates the association relationship is the same as that of the manner 3 in which the first configuration information indicates the association relationship. Details are not described herein.

Optionally, in the manner 1 and the manner 2 in which the third configuration information indicates the association relationship, the index of the sixth carrier includes one or both of the following: an index of a serving cell in which the sixth carrier is located, and indication information indicating that the sixth carrier is a normal uplink carrier or a supplementary uplink carrier of the serving cell in which the sixth carrier is located. For example, if the serving cell includes only one uplink carrier, the index of the sixth carrier may be represented by using the index of the serving cell in which the sixth carrier is located. If the serving cell includes two uplink carriers, the index of the sixth carrier may be represented by using the index of the serving cell in which the sixth carrier is located and the indication information indicating whether the sixth carrier is the normal uplink carrier or the supplementary uplink carrier of the serving cell in which the sixth carrier is located.

In another possible implementation, a manner in which the third configuration information indicates the association relationship between the uplink reference signals simultaneously sent on the different carriers may be: The third configuration information indicates an association relationship between uplink reference signal resource sets on the different carriers. For an implementation in which the third configuration information indicates the association relationship between the uplink reference signal resource sets on the different carriers, refer to the descriptions in the manner 1 in which the third configuration information indicates the association relationship. Details are not described herein. For example, if the third configuration information indicates that there is an association relationship between a fifth uplink reference signal resource set and a sixth uplink reference signal resource set, there is an association relationship between simultaneously sent uplink reference signals in the fifth uplink reference signal resource set and the sixth uplink reference signal resource set.

In still another possible implementation, a manner in which the third configuration information indicates the association relationship between the uplink reference signals simultaneously sent on the different carriers may be: The third configuration information indicates an association relationship between the different carriers. For an implementation in which the third configuration information indicates the association relationship on the different carriers, refer to the descriptions in the manner 2 in which the third configuration information indicates the association relationship. Details are not described herein. For example, if the third configuration information indicates that there is an association relationship between a fifth carrier and a sixth carrier, there is an association relationship between simultaneously sent uplink reference signals on the fifth carrier and the sixth carrier.

In a possible implementation, the first configuration information, the second configuration information, and the third configuration information each further indicate that the uplink reference signals having the association relationship share an antenna port or the uplink reference signals having the association relationship have a phase difference. For example, a protocol may specify the following two association types: The uplink reference signals having the association relationship share an antenna port, and the uplink reference signals having the association relationship have a phase difference. The first network device may select one association type from the two association types based on a requirement, and indicate the selected association type to the terminal device by using the first configuration information. After receiving the first configuration information, the terminal device sends the uplink reference signals having the association relationship based on the association type indicated by the first configuration information. After receiving the third configuration information, the second network device measures the uplink reference signals having the association relationship based on the association type indicated by the third configuration information. Based on this possible implementation, a network side can flexibly configure a type of the association relationship for the terminal device.

Optionally, the type of the association relationship may not be indicated by the first configuration information, the second configuration information, and the third configuration information, and the protocol may directly specify an association type. For example, the protocol may directly specify that the uplink reference signals having the association relationship share an antenna port, or the protocol may directly specify that the uplink reference signals having the association relationship have a phase difference.

906: The terminal device sends the uplink reference signals having the association relationship, where the uplink reference signals having the association relationship share an antenna port or the uplink reference signals having the association relationship have a phase difference.

For an implementation of step 906, refer to the implementation of step 403. Details are not described herein.

907: The second network device measures the uplink reference signals having the association relationship.

In this embodiment, after receiving the third configuration information, the second network device measures the uplink reference signals having the association relationship that are configured based on the third configuration information. The second network device may perform joint measurement on the uplink reference signals having the association relationship that are configured based on the third configuration information.

Optionally, the second network device may perform joint measurement on the uplink reference signals having the association relationship through a TRP or an RP.

It can be understood that according to the method described in FIG. 9, configuration of a large-bandwidth uplink reference signal can be implemented.

Figure 11:
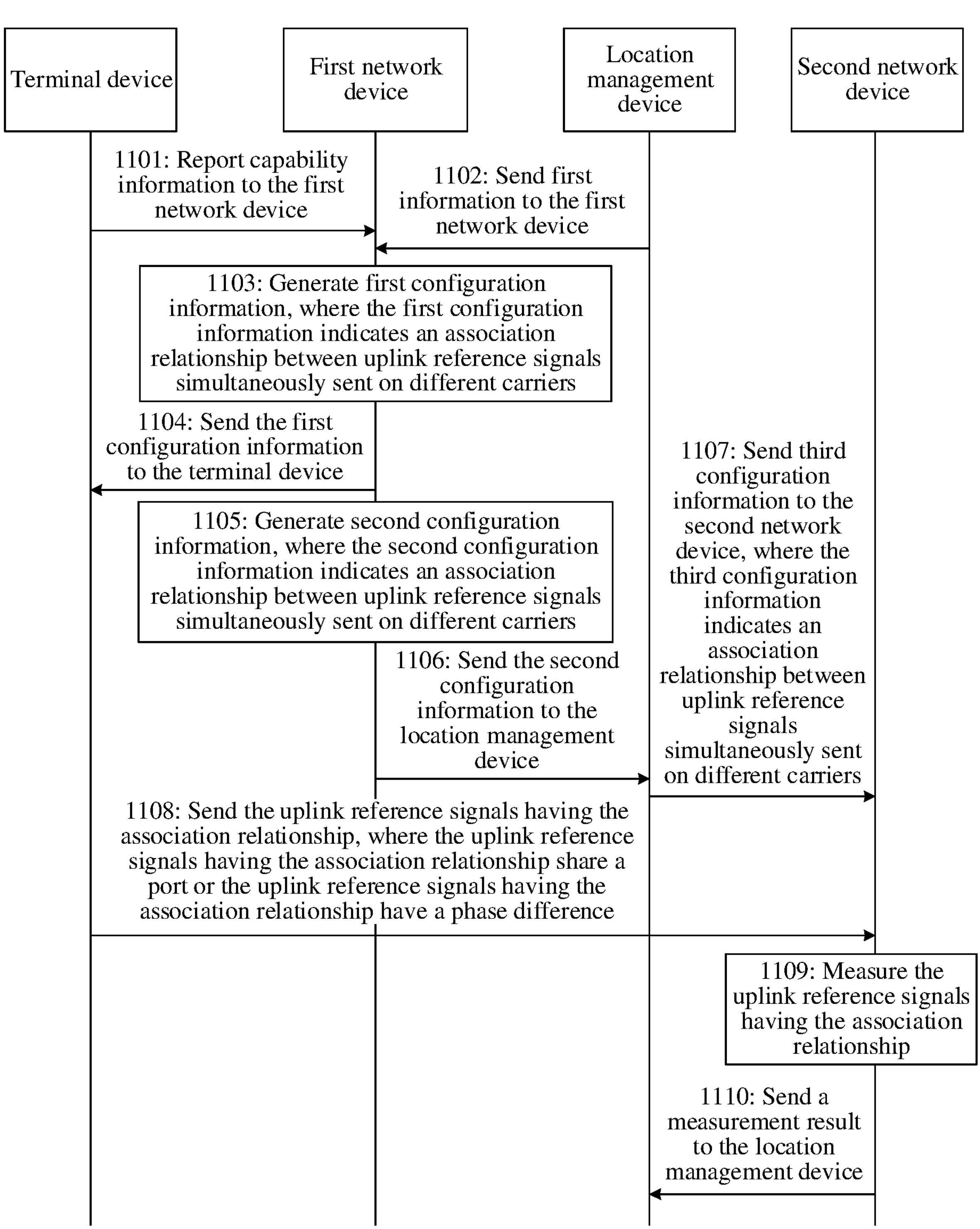
FIG. 11 is a schematic flowchart of still another uplink reference signal association method according to an embodiment.

FIG. 11 is a schematic flowchart of an uplink reference signal association method according to an embodiment. As shown in FIG. 11, the uplink reference signal association method includes the following step 1101 to step 1110. The method shown in FIG. 11 may be performed by a terminal device, a first network device, a second network device, and a location management device, or may be performed by a chip in the terminal device, a chip in the first network device, a chip in the second network device, and a chip in the location management device. In FIG. 11, an example in which the method is performed by the terminal device, the first network device, the second network device, and the location management device is used for description.

1101: The terminal device reports capability information to the first network device, where the capability information indicates whether the terminal device supports a plurality of simultaneously sent uplink reference signals in sharing an antenna port, or indicates whether the terminal device supports a plurality of simultaneously sent uplink reference signals in having a phase difference.

Step 1101 may be performed before step 1102, or may be performed after step 1102, or may be simultaneously performed with step 1102.

The capability information of the terminal device is reported to the first network device, so that the first network device may accurately determine, based on the capability information of the terminal device, how to configure the uplink reference signal for the terminal device. Alternatively, the first network device may perform another operation based on the capability information of the terminal device.

In a possible implementation, the capability information is reported per frequency band, per frequency band group, per frequency band per frequency band group, or per frequency band group subset per frequency band group. In this possible implementation, the capability information of the terminal device can be reported at a fine granularity.

1. Reporting per frequency band: The terminal device reports one piece of capability information for each frequency band of the terminal device. One frequency band may include one or more carriers.

For example, the terminal device includes a frequency band 1 and a frequency band 2. The terminal device first reports capability information corresponding to the frequency band 1, and then reports capability information corresponding to the frequency band 2. The capability information corresponding to the frequency band 1 indicates whether the terminal device supports, in the frequency band 1, a plurality of simultaneously sent uplink reference signals in sharing an antenna port, or whether the terminal device supports, in the frequency band 1, a plurality of simultaneously sent uplink reference signals in having a phase difference.

The capability information corresponding to the frequency band 2 indicates whether the terminal device supports, in the frequency band 2, a plurality of simultaneously sent uplink reference signals in sharing an antenna port, or whether the terminal device supports, in the frequency band 2, a plurality of simultaneously sent uplink reference signals in having a phase difference.

2. Reporting per frequency band group: One frequency band group may include one or more frequency bands. It is assumed that the terminal device has three frequency band groups, which are separately a frequency band group 1, a frequency band group 2, and a frequency band group 3. The frequency band group 1 includes a frequency band 1, the frequency band group 2 includes a frequency band 2, and the frequency band group 3 includes a frequency band 1 and a frequency band 2. The terminal device first reports capability information corresponding to the frequency band group 1, then reports capability information corresponding to the frequency band group 2, and then reports capability information corresponding to the frequency band group 3.

The capability information corresponding to the frequency band group 1 indicates whether the terminal device supports, in the frequency band group 1, a plurality of simultaneously sent uplink reference signals in sharing an antenna port, or whether the terminal device supports, in the frequency band group 1, a plurality of simultaneously sent uplink reference signals in having a phase difference.

The capability information corresponding to the frequency band group 2 indicates whether the terminal device supports, in the frequency band group 2, a plurality of simultaneously sent uplink reference signals in sharing an antenna port, or whether the terminal device supports, in the frequency band group 2, a plurality of simultaneously sent uplink reference signals in having a phase difference.

The capability information corresponding to the frequency band group 3 indicates whether the terminal device supports, in the frequency band group 3, a plurality of simultaneously sent uplink reference signals in sharing an antenna port, or whether the terminal device supports, in the frequency band group 3, a plurality of simultaneously sent uplink reference signals in having a phase difference.

3. Reporting per frequency band per frequency band group: It is assumed that the terminal device has three frequency band groups, which are separately a frequency band group 1, a frequency band group 2, and a frequency band group 3. The frequency band group 1 includes a frequency band 1, the frequency band group 2 includes a frequency band 2, and the frequency band group 3 includes a frequency band 1 and a frequency band 2. The terminal device first reports capability information corresponding to the frequency band 1 in the frequency band group 1, then reports capability information corresponding to the frequency band 2 in the frequency band group 2, then reports capability information corresponding to the frequency band 1 in the frequency band group 3, and then reports capability information corresponding to the frequency band 2 in the frequency band group 3.

4. Reporting per frequency band subset per frequency band group: It is assumed that the terminal device has three frequency band groups, which are separately a frequency band group 1, a frequency band group 2, and a frequency band group 3. The frequency band group 1 includes a frequency band 1, the frequency band group 2 includes a frequency band 2, and the frequency band group 3 includes a frequency band 1 and a frequency band 2. The frequency band group 1 includes one frequency band subset, which is the frequency band 1. The frequency band group 2 includes one frequency band subset, which is the frequency band 2. The frequency band group 3 includes three frequency band subsets, which are separately the frequency band 1, the frequency band 2, and the frequency band 1 and the frequency band 2.

The terminal device first reports capability information corresponding to the frequency band 1 in the frequency band group 1, then reports capability information corresponding to the frequency band 2 in the frequency band group 2, then reports capability information corresponding to the frequency band 1 in the frequency band group 3, then reports capability information corresponding to the frequency band 2 in the frequency band group 3, and then reports capability information corresponding to the frequency band 1 and the frequency band 2 in the frequency band group 3.

In a possible implementation, the terminal device may further report the capability information to the location management device. The capability information may also be reported per frequency band, per frequency band group, per frequency band per frequency band group, or per frequency band group subset per frequency band group. After receiving the capability information of the terminal device, the location management device may determine, based on the capability information of the terminal device, whether to request the first network device to generate the first configuration information.

In a possible implementation, the terminal device does not report the capability information to the first network device. The terminal device reports the capability information to the location management device, and the location management device forwards the capability information to the first network device.

In another possible implementation, the terminal device may not report the capability information to the first network device and the location management device, and the first network device and the location management device may consider by default that the terminal device supports a plurality of simultaneously sent uplink reference signals in sharing an antenna port, or the terminal device supports a plurality of simultaneously sent uplink reference signals in having a phase difference.

1102: The location management device sends first information to the first network device.

The first information has the following two cases:

1. The first information is used to request the first network device to configure uplink reference signals of a preset bandwidth, where the preset bandwidth is greater than 100 megahertz MHz or the preset bandwidth is greater than 400 MHz.

In the case 1, after receiving the first information used to request the first network device to configure the uplink reference signals of the preset bandwidth, the first network device generates the first configuration information, where the first configuration information indicates an association relationship between uplink reference signals simultaneously sent on different carriers. In other words, the location management device implicitly requests the first network device to configure the association relationship between the uplink reference signals simultaneously sent on the different carriers.

In a possible implementation, the first information may be used to request the first network device to configure uplink reference signals of a preset bandwidth at a preset frequency. When the preset frequency belongs to a frequency range 1, the preset bandwidth is greater than 100 megahertz (MHz). When the preset frequency belongs to a frequency range 2, the preset bandwidth is greater than 400 MHz. The frequency range 1 may be less than 7.1 GHz, and the frequency range 2 may be 24 GHz to 52.6 GHz.

2. The first information is used to request the first network device to configure an association relationship between uplink reference signals simultaneously sent on different carriers.

In the case 2, the location management device can explicitly requests the first network device to configure the association relationship between the uplink reference signals simultaneously sent on the different carriers.

In a possible implementation, the first information is further used to request the uplink reference signals having the association relationship to share an antenna port or the uplink reference signals having the association relationship to have a phase difference. In this possible implementation, the location management device can recommend, to the first network device based on capability information of the network device used to measure the uplink reference signal, a type of the association relationship that should be configured. This helps the first network device properly configure the type of the association relationship.

In a possible implementation, the location management device may not perform step 1102, and the first network device autonomously generates the first configuration information.

1103: The first network device generates the first configuration information, where the first configuration information indicates the association relationship between the uplink reference signals simultaneously sent on the different carriers, and the uplink reference signals having the association relationship share the antenna port or the uplink reference signals having the association relationship have the phase difference.

In this embodiment, the first network device may generate the first configuration information after receiving the capability information of the terminal device and the first information sent by the location management device.

The first network device may generate the first configuration information and second configuration information based on the capability information of the terminal device. For example, that the terminal device reports the capability information per frequency band is used as an example. It is assumed that the terminal device includes a frequency band 1 and a frequency band 2. The terminal device first reports capability information corresponding to the frequency band 1, and then reports capability information corresponding to the frequency band 2. The capability information corresponding to the frequency band 1 indicates that the terminal device supports, in the frequency band 1, a plurality of simultaneously sent uplink reference signals in sharing an antenna port. The capability information corresponding to the frequency band 2 indicates that the terminal device does not support, in the frequency band 2, a plurality of simultaneously sent uplink reference signals in sharing an antenna port.

The frequency band 1 includes a carrier 1 and a carrier 2, and the frequency band 2 includes a carrier 3. The first configuration information may indicate an association relationship between simultaneously sent uplink reference signals on the carrier 1 and the carrier 2. The second configuration information may indicate the association relationship between the simultaneously sent uplink reference signals on the carrier 1 and the carrier 2.

1104: The first network device sends the first configuration information to the terminal device.

1105: The first network device generates the second configuration information, where the second configuration information indicates an association relationship between uplink reference signals simultaneously sent on different carriers.

1106: The first network device sends the second configuration information to the location management device.

1107: The location management device sends third configuration information to the second network device, where the third configuration information further indicates an association relationship between uplink reference signals simultaneously sent on different carriers.

1108: The terminal device sends the uplink reference signals having the association relationship.

In a possible implementation, the terminal device may sends the uplink reference signals having the association relationship. If the terminal device supports a plurality of simultaneously sent uplink reference signals in sharing an antenna port, or supports a plurality of simultaneously sent uplink reference signals in having a phase difference, the terminal device sends the uplink reference signals having the association relationship, and enables the uplink reference signals having the association relationship to share an antenna port or have a phase difference. In other words, the terminal device needs to first determine whether the terminal device supports a plurality of simultaneously sent uplink reference signals in sharing an antenna port, or whether the terminal device supports a plurality of simultaneously sent uplink reference signals in having a phase difference. If the terminal device supports a plurality of simultaneously sent uplink reference signals in sharing an antenna port or having a phase difference, the terminal device sends the uplink reference signals having the association relationship, and enables the uplink reference signals having the association relationship to share an antenna port or have a phase difference. Based on this possible implementation, the terminal device can successfully send the uplink reference signals.

For example, it is assumed that the terminal device includes a frequency band 1 and a frequency band 2. Capability information corresponding to the frequency band 1 indicates that the terminal device supports, in the frequency band 1, a plurality of simultaneously sent uplink reference signals in sharing an antenna port. Capability information corresponding to the frequency band 2 indicates that the terminal device does not support, in the frequency band 2, a plurality of simultaneously sent uplink reference signals in sharing an antenna port. The frequency band 1 includes a carrier 1 and a carrier 2, and the frequency band 2 includes a carrier 3. The first configuration information indicates an association relationship between simultaneously sent uplink reference signals on the carrier 1 and the carrier 2. Because the terminal device supports, in the frequency band 1, a plurality of simultaneously sent uplink reference signals in sharing an antenna port, when the terminal device simultaneously sends the uplink reference signals on the carrier 1 and the carrier 2, the terminal device enables the simultaneously sent uplink reference signals on the carrier 1 and the carrier 2 to share an antenna port.

1109: The second network device measures the uplink reference signals having the association relationship.

For other descriptions of step 1105 to step 1109, refer to the descriptions of step 903 to step 907. Details are not described herein. Optionally, throughout embodiments, that the second network device measures the uplink reference signals having the association relationship may alternatively be replaced with that the second network device receives the uplink reference signals having the association relationship.

1110: The second network device sends a measurement result to the location management device, where the measurement result is obtained by the second network device by measuring the uplink reference signals having the association relationship, and the measurement result includes indexes of resource sets in which the uplink reference signals having the association relationship are located and/or indexes of carriers on which the uplink reference signals having the association relationship are located.

In this embodiment, the second network device sends the measurement result to the location management device after measuring the uplink reference signals having the association relationship that are configured by the third configuration information.

For example, it is assumed that the measurement result is obtained by performing joint measurement on simultaneously sent SRSs in an SRS resource set 11 and an SRS resource set 31. The SRS resource set 11 is an SRS resource set on a carrier 1, and the SRS resource set 31 is an SRS resource set on a carrier 2. In this case, the measurement result may carry an index of the SRS resource set 11 and an index of the SRS resource set 31. Alternatively, {index of the carrier 1, index of the SRS resource set 11} and {index of the carrier 2, index of the SRS resource set 31} may be carried.

For another example, it is assumed that the measurement result is obtained by performing joint measurement on simultaneously sent SRSs on a carrier 1 and a carrier 2. In this case, the measurement result may carry an index of the carrier 1 and an index of the carrier 2.

The indexes of the resource sets in which the uplink reference signals having the association relationship are located and/or the indexes of the carriers on which the uplink reference signals having the association relationship are located are carried in the measurement result, so that the location management device can determine uplink reference signal resources based on which the measurement result is obtained.

In another possible implementation, the terminal device may not include, in the measurement result, the indexes of the resource sets in which the uplink reference signals having the association relationship are located or the indexes of the carriers on which the uplink reference signals having the association relationship are located.

Figure 12:
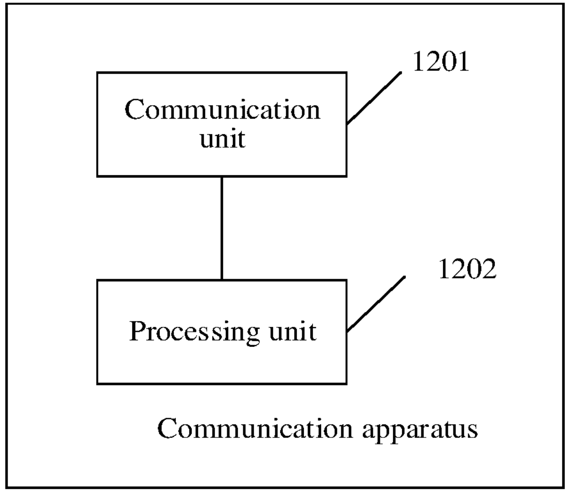
FIG. 12 is a schematic structural diagram of a communication apparatus according to an embodiment.

FIG. 12 is a schematic structural diagram of a communication apparatus according to an embodiment. The communication apparatus shown in FIG. 12 may be configured to implement some or all functions of the first network device in the uplink reference signal association method. The apparatus may be the first network device, an apparatus in the first network device, or an apparatus that can be used together with the first network device. The communication apparatus may alternatively be a chip system. The communication apparatus shown in FIG. 12 may include a communication unit 1201 and a processing unit 1202. The processing unit 1202 is configured to process data. A receiving unit and a sending unit are integrated into the communication unit 1201. The communication unit 1201 may also be referred to as a transceiver unit. Alternatively, the communication unit 1201 may be split into a receiving unit and a sending unit. The processing unit 1202 below is similar to the communication unit 1201, and details are not described below.

The processing unit 1202 is configured to generate first configuration information, where the first configuration information indicates an association relationship between uplink reference signals simultaneously sent on different carriers, and the uplink reference signals having the association relationship share an antenna port or the uplink reference signals having the association relationship have a phase difference. The communication unit 1201 is configured to send the first configuration information to a terminal device.

In a possible implementation, the processing unit 1202 is further configured to generate second configuration information, where the second configuration information indicates an association relationship between uplink reference signals simultaneously sent on different carriers; and the communication unit 1201 is further configured to send the second configuration information to a location management device.

In a possible implementation, the first configuration information further indicates that the uplink reference signals having the association relationship share the antenna port or the uplink reference signals having the association relationship have the phase difference; and/or the second configuration information further indicates that the uplink reference signals having the association relationship share an antenna port or the uplink reference signals having the association relationship have a phase difference.

In a possible implementation, in a process in which the terminal device sends the uplink reference signals having the association relationship, the phase difference between the uplink reference signals having the association relationship is a fixed value.

In a possible implementation, when the uplink reference signals have a plurality of antenna ports, same antenna port numbers of the uplink reference signals having the association relationship correspond to a same antenna port.

In a possible implementation, a manner in which the first configuration information indicates the association relationship between the uplink reference signals simultaneously sent on the different carriers may be: The first configuration information indicates an association relationship between uplink reference signal resources simultaneously sent on the different carriers. A manner in which the second configuration information indicates the association relationship between the uplink reference signals simultaneously sent on the different carriers may be: The second configuration information indicates an association relationship between uplink reference signal resources simultaneously sent on the different carriers.

In a possible implementation, the first configuration information includes configuration information of a plurality of carriers, the configuration information of the carrier includes an index of the carrier and configuration information of a bandwidth part (BWP) on the carrier, the configuration information of the BWP includes an index of the BWP and configuration information of an uplink reference signal resource set in the BWP, and the configuration information of the uplink reference signal resource set includes an index of the uplink reference signal resource set and configuration information of an uplink reference signal resource in the uplink reference signal resource set.

Configuration information of a first uplink reference signal resource set further includes at least one piece of first index information, and the first index information includes an index of a second carrier, an index of a second BWP on the second carrier, and an index of a second uplink reference signal resource set in the second BWP, to indicate that simultaneously sent uplink reference signal resources in the first uplink reference signal resource set and at least one second uplink reference signal resource set have an association relationship, where the first uplink reference signal resource set and the at least one second uplink reference signal resource set are resource sets configured on different carriers based on the first configuration information.

Alternatively, configuration information of a first BWP further includes at least one piece of second index information, and the second index information includes an index of a second carrier and an index of a second BWP on the second carrier, to indicate that simultaneously sent uplink reference signal resources in the first BWP and at least one second BWP have an association relationship, where the first BWP and the second BWP are BWPs configured on different carriers based on the first configuration information.

Alternatively, configuration information of a first carrier further includes an index of at least one second carrier, to indicate that simultaneously sent uplink reference signal resources on the first carrier and the at least one second carrier have an association relationship, where the first carrier and the second carrier are different carriers configured based on the first configuration information.

In a possible implementation, the index of the second carrier includes one or both of the following: an index of a serving cell in which the second carrier is located, and indication information indicating that the second carrier is a normal uplink carrier or a supplementary uplink carrier of the serving cell in which the second carrier is located.

In a possible implementation, the uplink reference signal resource is a sounding reference signal SRS resource; and the configuration information of the first BWP further includes an SRS configuration (SRS-Config), and the SRS configuration includes the at least one piece of second index information.

In a possible implementation, the second configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set.

Configuration information of a third uplink reference signal resource set further includes at least one piece of third index information, and the third index information includes an index of a fourth carrier and an index of a fourth uplink reference signal resource set on the fourth carrier, to indicate that simultaneously sent uplink reference signal resources in the third uplink reference signal resource set and at least one fourth uplink reference signal resource set have an association relationship, where the third uplink reference signal resource set and the at least one fourth uplink reference signal resource set are resource sets configured on different carriers based on the second configuration information.

Alternatively, configuration information of a third carrier further includes an index of at least one fourth carrier, to indicate that simultaneously sent uplink reference signal resources on the third carrier and the at least one fourth carrier have an association relationship, where the third carrier and the at least one fourth carrier are different carriers configured based on the second configuration information.

In a possible implementation, the index of the fourth carrier includes one or both of the following: an index of a serving cell in which the fourth carrier is located, and indication information indicating that the fourth carrier is a normal uplink carrier or a supplementary uplink carrier of the serving cell in which the fourth carrier is located.

In a possible implementation, the communication unit 1201 is further configured to receive capability information reported by the terminal device, where the capability information indicates whether the terminal device supports a plurality of simultaneously sent uplink reference signals in sharing an antenna port or indicates whether the terminal device supports a plurality of simultaneously sent uplink reference signals in having a phase difference.

In a possible implementation, the capability information is reported per frequency band, per frequency band group, per frequency band per frequency band group, or per frequency band group subset per frequency band group.

In a possible implementation, the communication unit 1201 is further configured to receive first information sent by the location management device, where the first information is used to request the first network device to configure uplink reference signals of a preset bandwidth, where the preset bandwidth is greater than 100 megahertz (MHz) or the preset bandwidth is greater than 400 MHz; or the first information is used to request the first network device to configure the association relationship between the uplink reference signals simultaneously sent on the different carriers.

In a possible implementation, the first information is further used to request the uplink reference signals having the association relationship to share the antenna port or the uplink reference signals having the association relationship to have the phase difference.

FIG. 12 is a schematic structural diagram of a communication apparatus according to an embodiment. The communication apparatus shown in FIG. 12 may be configured to implement some or all functions of the terminal device in the uplink reference signal association method. The apparatus may be a terminal device, an apparatus in the terminal device, or an apparatus that can be used together with the terminal device. The communication apparatus may alternatively be a chip system. The communication apparatus shown in FIG. 12 may include a communication unit 1201 and a processing unit 1202.

The communication unit 1201 is configured to receive first configuration information, where the first configuration information indicates an association relationship between uplink reference signals simultaneously sent on different carriers, and the uplink reference signals having the association relationship share an antenna port or the uplink reference signals having the association relationship have a phase difference. The communication unit 1201 is further configured to send the uplink reference signals having the association relationship.

In a possible implementation, the first configuration information further indicates that the uplink reference signals having the association relationship share the antenna port or the uplink reference signals having the association relationship have the phase difference.

In a possible implementation, in a process in which the terminal device sends the uplink reference signals having the association relationship, the phase difference between the uplink reference signals having the association relationship is a fixed value.

In a possible implementation, when the uplink reference signals have a plurality of antenna ports, same antenna port numbers of the uplink reference signals having the association relationship correspond to a same antenna port.

In a possible implementation, a manner in which the first configuration information indicates the association relationship between the uplink reference signals simultaneously sent on the different carriers may be: The first configuration information indicates an association relationship between uplink reference signal resources simultaneously sent on the different carriers.

In a possible implementation, the first configuration information includes configuration information of a plurality of carriers, the configuration information of the carrier includes an index of the carrier and configuration information of a bandwidth part (BWP) on the carrier, the configuration information of the BWP includes an index of the BWP and configuration information of an uplink reference signal resource set in the BWP, and the configuration information of the uplink reference signal resource set includes an index of the uplink reference signal resource set and configuration information of an uplink reference signal resource in the uplink reference signal resource set.

Configuration information of a first uplink reference signal resource set further includes at least one piece of first index information, and the first index information includes an index of a second carrier, an index of a second BWP on the second carrier, and an index of a second uplink reference signal resource set in the second BWP, to indicate that simultaneously sent uplink reference signal resources in the first uplink reference signal resource set and at least one second uplink reference signal resource set have an association relationship, where the first uplink reference signal resource set and the at least one second uplink reference signal resource set are resource sets configured on different carriers based on the first configuration information.

Alternatively, configuration information of a first BWP further includes at least one piece of second index information, and the second index information includes an index of a second carrier and an index of a second BWP on the second carrier, to indicate that simultaneously sent uplink reference signal resources in the first BWP and at least one second BWP have an association relationship, where the first BWP and the at least one second BWP are BWPs configured on different carriers based on the first configuration information.

Alternatively, configuration information of a first carrier further includes an index of at least one second carrier, to indicate that simultaneously sent uplink reference signal resources on the first carrier and the at least one second carrier have an association relationship, where the first carrier and the at least one second carrier are different carriers configured based on the first configuration information.

In a possible implementation, the index of the second carrier includes one or both of the following: an index of a serving cell in which the second carrier is located, and indication information indicating that the second carrier is a normal uplink carrier or a supplementary uplink carrier of the serving cell in which the second carrier is located.

In a possible implementation, the uplink reference signal resource is a sounding reference signal SRS resource; and the configuration information of the first BWP further includes an SRS configuration (SRS-Config), and the SRS configuration includes the at least one piece of second index information.

In a possible implementation, the communication unit 1201 is further configured to report capability information to a first network device, where the capability information indicates whether the communication apparatus supports a plurality of simultaneously sent uplink reference signals in sharing an antenna port or indicates whether the communication apparatus supports a plurality of simultaneously sent uplink reference signals in having a phase difference.

In a possible implementation, the communication unit 1201 is further configured to report the capability information to a location management device, where the capability information indicates whether the communication apparatus supports a plurality of simultaneously sent uplink reference signals in sharing an antenna port, or indicates whether the communication apparatus supports a plurality of simultaneously sent uplink reference signals in having a phase difference.

In a possible implementation, the capability information is reported per frequency band, per frequency band group, per frequency band per frequency band group, or per frequency band group subset per frequency band group.

In a possible implementation, a manner in which the communication unit 1201 sends the uplink reference signals having the association relationship may be:

If the communication apparatus supports a plurality of simultaneously sent uplink reference signals in sharing an antenna port, or supports a plurality of simultaneously sent uplink reference signals in having a phase difference, the communication apparatus sends the uplink reference signals having the association relationship, and enables the uplink reference signals having the association relationship to share the antenna port or have the phase difference.

FIG. 12 is a schematic structural diagram of a communication apparatus according to an embodiment. The communication apparatus shown in FIG. 12 may be configured to implement some or all functions of the location management device in the uplink reference signal association method. The apparatus may be a location management device, may be an apparatus in the location management device, or may be an apparatus that can be used together with the location management device. The communication apparatus may alternatively be a chip system. The communication apparatus shown in FIG. 12 may include a communication unit 1201 and a processing unit 1202.

The communication unit 1201 is configured to receive second configuration information sent by a first network device, where the second configuration information indicates an association relationship between uplink reference signals simultaneously sent on different carriers, and the uplink reference signals having the association relationship share an antenna port or the uplink reference signals having the association relationship have a phase difference. The communication unit 1201 is further configured to send third configuration information to a second network device, where the third configuration information indicates an association relationship between uplink reference signals simultaneously sent on different carriers.

In a possible implementation, the second configuration information further indicates that the uplink reference signals having the association relationship share the antenna port or the uplink reference signals having the association relationship have the phase difference; and/or the third configuration information further indicates that the uplink reference signals having the association relationship share an antenna port or the uplink reference signals having the association relationship have a phase difference.

In a possible implementation, in a process in which the terminal device sends the uplink reference signals having the association relationship, the phase difference between the uplink reference signals having the association relationship is a fixed value.

In a possible implementation, when the uplink reference signals have a plurality of antenna ports, same antenna port numbers of the uplink reference signals having the association relationship correspond to a same antenna port.

In a possible implementation, a manner in which the second configuration information indicates the association relationship between the uplink reference signals simultaneously sent on the different carriers may be: The second configuration information indicates an association relationship between uplink reference signal resources simultaneously sent on the different carriers. A manner in which the third configuration information indicates the association relationship between the uplink reference signals simultaneously sent on the different carriers may be: The third configuration information indicates an association relationship between uplink reference signal resources simultaneously sent on the different carriers.

In a possible implementation, the second configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set.

Configuration information of a third uplink reference signal resource set further includes at least one piece of third index information, and the third index information includes an index of a fourth carrier and an index of a fourth uplink reference signal resource set on the fourth carrier, to indicate that simultaneously sent uplink reference signal resources in the third uplink reference signal resource set and at least one fourth uplink reference signal resource set have an association relationship, where the third uplink reference signal resource set and the at least one fourth uplink reference signal resource set are resource sets configured on different carriers based on the second configuration information.

Alternatively, configuration information of a third carrier further includes an index of at least one fourth carrier, to indicate that simultaneously sent uplink reference signal resources on the third carrier and the at least one fourth carrier have an association relationship, where the third carrier and the at least one fourth carrier are different carriers configured based on the second configuration information.

In a possible implementation, the index of the fourth carrier includes one or both of the following: an index of a serving cell in which the fourth carrier is located, and indication information indicating that the fourth carrier is a normal uplink carrier or a supplementary uplink carrier of the serving cell in which the fourth carrier is located.

In a possible implementation, the third configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set.

Configuration information of a fifth uplink reference signal resource set further includes at least one piece of fourth index information, and the fourth index information includes an index of a sixth carrier and an index of a sixth uplink reference signal resource set on the sixth carrier, to indicate that simultaneously sent uplink reference signal resources in the fifth uplink reference signal resource set and at least one sixth uplink reference signal resource set have an association relationship, where the fifth uplink reference signal resource set and the at least one sixth uplink reference signal resource set are resource sets configured on different carriers based on the third configuration information.

Alternatively, configuration information of a fifth carrier further includes an index of at least one sixth carrier, to indicate that simultaneously sent uplink reference signal resources on the fifth carrier and the at least one sixth carrier have an association relationship, where the fifth carrier and the at least one sixth carrier are different carriers configured based on the third configuration information.

In a possible implementation, the index of the sixth carrier includes one or both of the following: an index of a serving cell in which the sixth carrier is located, and indication information indicating that the sixth carrier is a normal uplink carrier or a supplementary uplink carrier of the serving cell in which the sixth carrier is located.

In a possible implementation, the communication unit 1201 is further configured to send first information to the first network device.

The first information is used to request the first network device to configure uplink reference signals of a preset bandwidth, where the preset bandwidth is greater than 100 megahertz (MHz) or the preset bandwidth is greater than 400 MHz.

Alternatively, the first information is used to request the first network device to configure the association relationship between the uplink reference signals simultaneously sent on the different carriers.

In a possible implementation, the first information is further used to request the uplink reference signals having the association relationship to share an antenna port or the uplink reference signals having the association relationship to have a phase difference.

In a possible implementation, the communication unit 1201 is further configured to receive capability information reported by the terminal device, where the capability information indicates whether the terminal device supports a plurality of simultaneously sent uplink reference signals in sharing an antenna port, or indicates whether the terminal device supports a plurality of simultaneously sent uplink reference signals in having a phase difference.

In a possible implementation, the capability information is reported per frequency band, per frequency band group, per frequency band per frequency band group, or per frequency band group subset per frequency band group.

In a possible implementation, the communication unit 1201 is further configured to receive a measurement result sent by the second network device, where the measurement result is obtained by the second network device by measuring the uplink reference signals having the association relationship, and the measurement result includes indexes of resource sets in which the uplink reference signals having the association relationship are located and/or indexes of carriers on which the uplink reference signals having the association relationship are located.

FIG. 12 is a schematic structural diagram of a communication apparatus according to an embodiment. The communication apparatus shown in FIG. 12 may be configured to implement some or all functions of the second network device in the uplink reference signal association method. The apparatus may be a second network device, an apparatus in the second network device, or an apparatus that can be used together with the second network device. The communication apparatus may alternatively be a chip system. The communication apparatus shown in FIG. 12 may include a communication unit 1201 and a processing unit 1202.

The communication unit 1201 is configured to receive third configuration information, where the third configuration information indicates an association relationship between uplink reference signals simultaneously sent on different carriers, and the uplink reference signals having the association relationship share an antenna port or the uplink reference signals having the association relationship have a phase difference. The communication unit 1201 is further configured to measure the uplink reference signals having the association relationship.

In a possible implementation, the third configuration information further indicates that the uplink reference signals having the association relationship share the antenna port or the uplink reference signals having the association relationship have the phase difference.

In a possible implementation, in a process in which the terminal device sends the uplink reference signals having the association relationship, the phase difference between the uplink reference signals having the association relationship is a fixed value.

In a possible implementation, when the uplink reference signals have a plurality of antenna ports, same antenna port numbers of the uplink reference signals having the association relationship correspond to a same antenna port.

In a possible implementation, a manner in which the third configuration information indicates the association relationship between the uplink reference signals simultaneously sent on the different carriers may be: The third configuration information indicates an association relationship between uplink reference signal resources simultaneously sent on the different carriers.

In a possible implementation, the third configuration information includes configuration information of a plurality of carriers, the configuration information of the carrier includes an index of the carrier and configuration information of an uplink reference signal resource set on the carrier, and the configuration information of the uplink reference signal resource set includes an index of the uplink reference signal resource set and configuration information of an uplink reference signal resource in the uplink reference signal resource set.

Configuration information of a fifth uplink reference signal resource set further includes at least one piece of fourth index information, and the fourth index information includes an index of a sixth carrier and an index of a sixth uplink reference signal resource set on the sixth carrier, to indicate that simultaneously sent uplink reference signal resources in the fifth uplink reference signal resource set and at least one sixth uplink reference signal resource set have an association relationship, where the fifth uplink reference signal resource set and the at least one sixth uplink reference signal resource set are resource sets configured on different carriers based on the third configuration information.

Alternatively, configuration information of a fifth carrier further includes an index of at least one sixth carrier, to indicate that simultaneously sent uplink reference signal resources on the fifth carrier and the at least one sixth carrier have an association relationship, where the fifth carrier and the at least one sixth carrier are different carriers configured based on the third configuration information.

In a possible implementation, the index of the sixth carrier includes one or both of the following: an index of a serving cell in which the sixth carrier is located, and indication information indicating that the sixth carrier is a normal uplink carrier or a supplementary uplink carrier of the serving cell in which the sixth carrier is located.

In a possible implementation, the communication unit 1201 is further configured to send a measurement result to a location management device, where the measurement result is obtained by the communication apparatus by measuring the uplink reference signals on the uplink reference signal resources having the association relationship, and the measurement result includes indexes of resource sets in which the uplink reference signals having the association relationship are located and/or indexes of carriers on which the uplink reference signals having the association relationship are located.

Figure 13A:
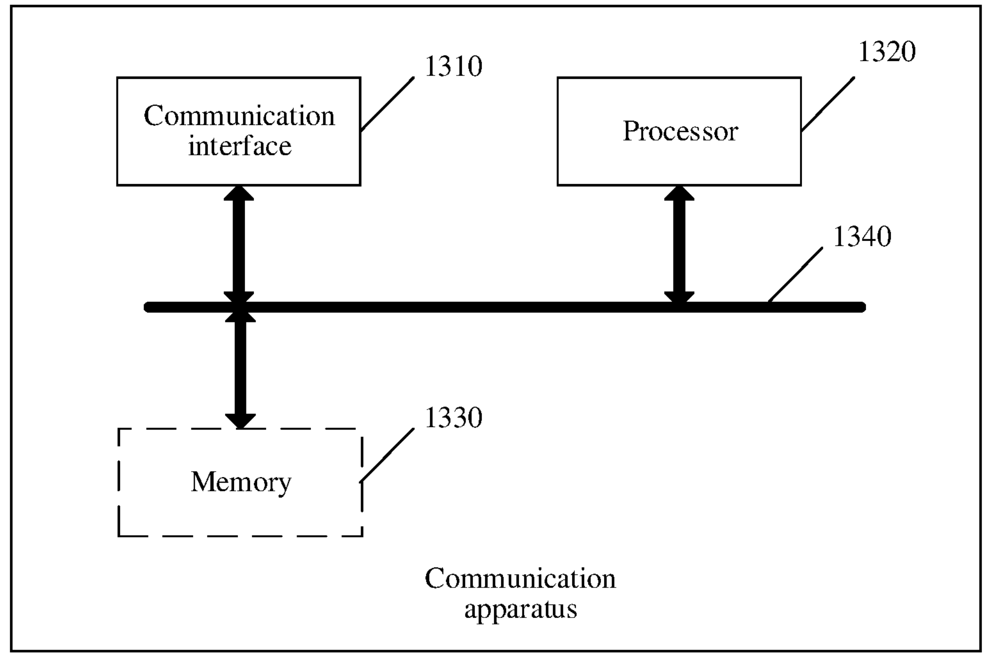
FIG. 13*a* is a schematic structural diagram of another communication apparatus according to an embodiment.

FIG. 13*a* shows a communication apparatus 130 according to an embodiment. The communication apparatus 130 is configured to implement a function of the first network device in FIG. 4, FIG. 9, or FIG. 11. The apparatus may be a first network device or an apparatus used in the first network device. The apparatus used in the first network device may be a chip system or a chip in the first network device. Alternatively, the communication apparatus 130 is configured to implement a function of the terminal device in FIG. 4, FIG. 9, or FIG. 11. The apparatus may be a terminal device or an apparatus used in the terminal device. The apparatus used in the terminal device may be a chip system or a chip in the terminal device. Alternatively, the communication apparatus 130 is configured to implement a function of the location management device in FIG. 9 or FIG. 11. The apparatus may be a location management device or an apparatus used in the location management device. The apparatus used in the location management device may be a chip system or a chip in the location management device. Alternatively, the communication apparatus 130 is configured to implement a function of the second network device in FIG. 9 or FIG. 11. The apparatus may be a second network device or an apparatus used in the second network device. The apparatus used in the second network device may be a chip system or a chip in the second network device. The chip system may include a chip, or may include a chip and another discrete component.

The communication apparatus 130 includes at least one processor 1320, configured to implement a data processing function of the first network device, the terminal device, the location management device, or the second network device in the method provided in the embodiments. The apparatus 130 may further include a communication interface 1310, configured to implement receiving and sending operations of the first network device, the terminal device, the location management device, or the second network device in the method provided in embodiments. In the embodiments, the communication interface may be a transceiver, a circuit, a bus, a module, or a communication interface of another type, and is configured to communicate with another device by using a transmission medium. For example, the communication interface 1310 is used by an apparatus in the apparatus 130 to communicate with another device. The processor 1320 receives and sends data through the communication interface 1310, and is configured to implement the method shown in FIG. 4, FIG. 9, or FIG. 11 in the foregoing method embodiments.

The apparatus 130 may further include at least one memory 1330, configured to store program instructions and/or data. The memory 1330 is coupled to the processor 1320. The coupling in embodiments may be an indirect coupling or a communication connection between apparatuses, units, or modules in an electrical form, a mechanical form, or another form, and is used for information exchange between the apparatuses, the units, or the modules. The processor 1320 may operate in collaboration with the memory 1330. The processor 1320 may execute the program instructions stored in the memory 1330. At least one of the at least one memory may be included in the processor.

In this embodiment, a connection between the communication interface 1310, the processor 1320, and the memory 1330 may not be limited. In this embodiment, the memory 1330, the processor 1320, and the communication interface 1310 are connected to each other through a bus 1340 in FIG. 13*a*. The bus is represented by using a bold line in FIG. 13*a*. A connection manner between other components is merely an example for description, and is not limited thereto. The bus may be classified into an address bus, a data bus, a control bus, and the like. For ease of representation, only one bold line is used to represent the bus in FIG. 13*a*, but this does not mean that there is only one bus or only one type of bus.

When the apparatus 130 is an apparatus used in the first network device, the terminal device, the location management device, or the second network device, for example, when the apparatus 130 is a chip or a chip system, the communication interface 1310 may output or receive a baseband signal. When the apparatus 130 is the first network device, the terminal device, the location management device, or the second network device, the communication interface 1310 may output or receive a radio frequency signal. In this embodiment, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams in the embodiments. The general-purpose processor may be a microprocessor, any conventional processor, or the like. The operations in the methods with reference to the embodiments may be directly performed and completed by a hardware processor or may be performed and completed by a combination of hardware in the processor and a software module.

Figure 13B:
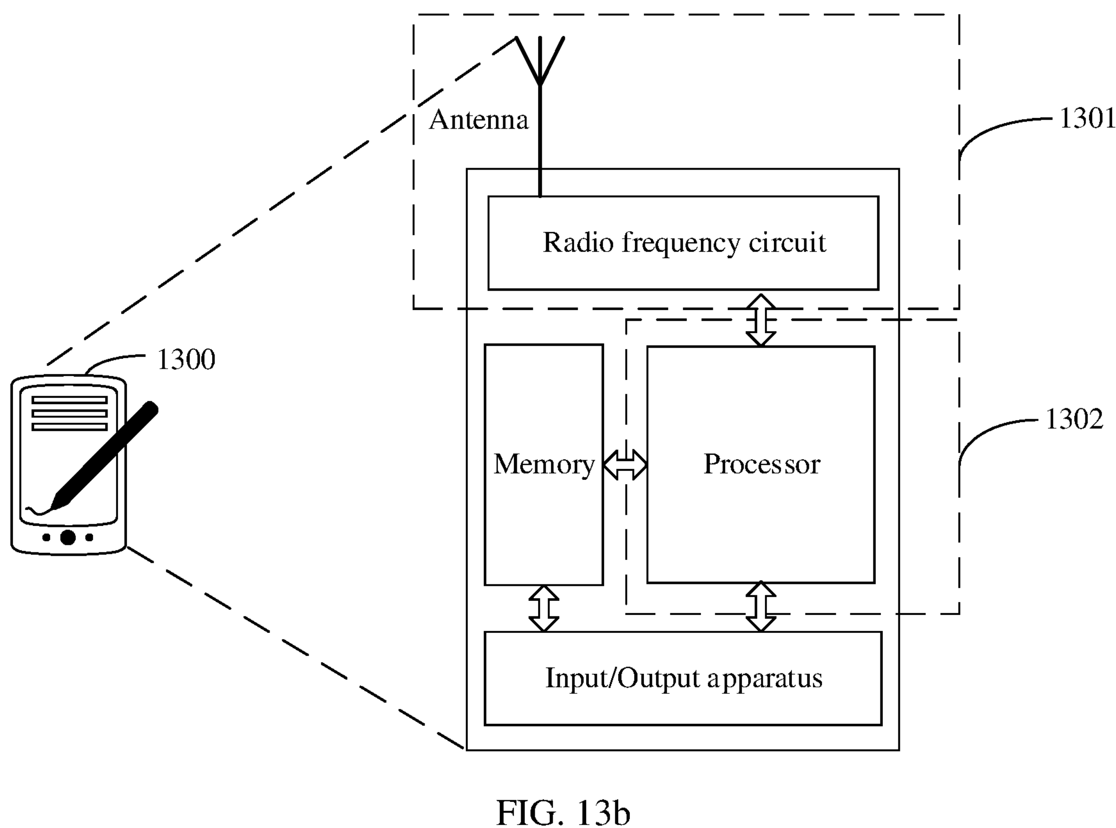
FIG. 13*b* is a schematic structural diagram of still another communication apparatus according to an embodiment.

For example, FIG. 13*b* is a schematic structural diagram of another terminal device 1300 according to an embodiment. The terminal device may perform the operations performed by the terminal device in the foregoing method embodiments.

For ease of description, FIG. 13*b* shows only main components of the terminal device. As shown in FIG. 13*b*, the terminal device 1300 includes a processor, a memory, a radio frequency circuit, an antenna, and an input/output apparatus. The processor may be configured to: process a communication protocol and communication data, control the entire terminal device, execute a software program, and process data of the software program, for example, support the terminal device in performing the procedure described in FIG. 4, FIG. 9, or FIG. 11. The memory may be configured to store the software program and data. The radio frequency circuit may be configured to: perform conversion between a baseband signal and a radio frequency signal and process the radio frequency signal. The antenna may be configured to receive and send a radio frequency signal in a form of an electromagnetic wave. The terminal device 1300 may further include an input/output apparatus, for example, a touch-screen, a display, or a keyboard. The input/output apparatus may be configured to: receive data input by a user, and output data to the user. It should be noted that some types of terminal devices may have no input/output apparatus.

After the terminal device is powered on, the processor may read the software program in a storage unit, interpret and execute the software program, and process the data of the software program. When data needs to be sent in a wireless manner, the processor performs baseband processing on the to-be-sent data, and outputs a baseband signal to the radio frequency circuit. After performing radio frequency processing on the baseband signal, the radio frequency circuit sends a radio frequency signal outward in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

Persons skilled in the art may understand that, for ease of description, FIG. 13*b* shows only one memory and one processor. An actual terminal device may include a plurality of processors and a plurality of memories. The memory may also be referred to as a storage medium, a storage device, or the like. This is not limited in the embodiments.

In an optional implementation, the processor may include a baseband processor and a central processing unit (CPU). The baseband processor may be configured to process a communication protocol and communication data. The CPU may be configured to control the entire terminal device, execute a software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

For example, in this embodiment, as shown in FIG. 13*b*, the antenna and the radio frequency circuit that have sending and receiving functions may be considered as a communication unit 1301 of the terminal device 1300, and the processor having a processing function may be considered as a processing unit 1302 of the terminal device 1300.

The communication unit 1301 may also be referred to as a transceiver machine, a transceiver, a transceiver apparatus, a transceiver unit, or the like, and is configured to implement the sending and receiving functions. Optionally, a component that is in the communication unit 1301 and that is configured to implement the receiving function may be considered as a receiving unit, and a component that is in the communication unit 1301 and that is configured to implement the sending function may be considered as a sending unit. That is, the communication unit 1301 includes the receiving unit and the sending unit. For example, the receiving unit may also be referred to as a receiver, a receive machine, or a receiving circuit, and the sending unit may also be referred to as a transmitter, a transmit machine, or a transmitting circuit.

In some embodiments, the communication unit 1301 and the processing unit 1302 may be integrated into one component, or may be separated as different components. In addition, the processor and the memory may be integrated into one component, or may be separated as different components.

The communication unit 1301 may be configured to perform receiving and sending operations of the terminal device in the foregoing method embodiments. The processing unit 1302 may be configured to perform a data processing operation of the terminal device in the foregoing method embodiments.

An embodiment may further provides a non-transitory computer-readable storage medium. The non-transitory computer-readable storage medium stores instructions. When the instructions are run on a processor, a method procedure in the foregoing method embodiment is implemented.

An embodiment may further provide a computer program product. When the computer program product runs on a processor, a method procedure in the foregoing method embodiment is implemented.

It should be noted that, for brief description, the foregoing method embodiment is represented as a combination of a series of actions. However, persons skilled in the art should understand that the embodiments may not be limited to the described order of the actions, because some operations may be performed in other orders or simultaneously. It should be further appreciated by persons skilled in the art that the involved actions and modules are not necessarily required by the embodiments.

Cross reference may be made to descriptions of the embodiments and the descriptions of the embodiments have respective foci. For a part not described in detail in an embodiment, refer to related descriptions of another embodiment. For ease of description and brevity, for functions of the apparatuses and devices provided in the embodiments and operations performed by the apparatuses and devices, refer to related descriptions of the method embodiments. The method embodiments and the apparatus embodiments may also be mutually referenced, combined, or cited.

Finally, it should be noted that the foregoing embodiments are merely intended for describing the solutions rather than limiting. Although described in detail with reference to the foregoing embodiments, persons of ordinary skill in the art should understand that they may still make modifications without departing from the scope of the solutions of the embodiments.

The invention claimed is:

1. A method, comprising:

generating first configuration information, wherein the first configuration information indicates an association relationship between uplink reference signal resource sets on different carriers; and the association relationship between uplink reference signal resource sets also indicates that there is an association relationship between uplink reference signals that are simultaneously sent in the associated uplink reference signal resource sets; wherein the uplink reference signals having the association relationship share a same antenna port, and the same antenna port means that a channel over which a symbol on an antenna port is carried can be inferred from a signal over which another symbol on a same antenna port is carried; and phases of the uplink reference signals having the association relationship are continuous; and sending the first configuration information to a terminal device.

2. The method according to claim 1, wherein the first configuration information further indicates that the uplink reference signals having the association relationship share the same antenna port or that the uplink reference signals having the association relationship have a phase difference.

3. The method according to claim 2, wherein the phase difference between the uplink reference signals having the association relationship is a fixed value.

4. The method according to claim 1, wherein a phase difference between the uplink reference signals having the association relationship is a fixed value.

5. The method according to claim 1, further comprising:

generating second configuration information, wherein the second configuration information indicates the association relationship between uplink reference signal resource sets on different carriers;

sending the second configuration information to a location management device.

6. The method according to claim 5, wherein the second configuration information further indicates that the uplink reference signals having the association relationship share the same antenna port or that the uplink reference signals having the association relationship have a phase difference.

7. The method according to claim 1, further comprising:

receiving first information from a location management device;

the first information is used to request the first network device to configure an uplink reference signal with a preset bandwidth, wherein the preset bandwidth is greater than 100 megahertz (MHz) or the preset bandwidth is greater than 400 MHz; or the first information is used to request the first network device to configure the association relationship between uplink reference signal resource sets on different carriers.

8. A method for associating uplink reference signals, comprising:

receiving first configuration information, wherein the first configuration information indicates an association relationship between uplink reference signal resource sets on different carriers; and the association relationship between uplink reference signal resource sets also indicates that there is an association relationship between uplink reference signals that are simultaneously sent in the associated uplink reference signal resource sets; wherein the uplink reference signals having the association relationship share a same antenna port, and the same antenna port means that a channel over which a symbol on an antenna port is carried can be inferred from a signal over which another symbol on a same antenna port is carried; and phases of the uplink reference signals having the association relationship are continuous; and sending the uplink reference signals having the association relationship.

9. The method according to claim 8, wherein the first configuration information further indicates that the uplink reference signals having the association relationship share the same antenna port or that the uplink reference signals having the association relationship have a phase difference.

10. The method according to claim 8, wherein a phase difference between the uplink reference signals having the association relationship is a fixed value.

11. The method according to claim 9, wherein the phase difference between the uplink reference signals having the association relationship is a fixed value.

12. A method for associating uplink reference signals, comprising:

receiving second configuration information from a first network device, wherein the second configuration information indicates an association relationship between uplink reference signal resource sets on different carriers; and the association relationship between uplink reference signal resource sets also indicates that there is an association relationship between uplink reference signals that are simultaneously sent in the associated uplink reference signal resource sets; wherein the uplink reference signals having the association relationship share a same antenna port, and the same antenna port means that a channel over which a symbol on an antenna port is carried can be inferred from a signal over which another symbol on a same antenna port is carried; and phases of the uplink reference signals having the association relationship are continuous; and sending third configuration information to a second network device, wherein the third configuration information indicates the association relationship between uplink reference signal resource sets on different carriers.

13. The method according to claim 12, wherein the second configuration information further indicates that the uplink reference signals having the association relationship share the same antenna port or that the uplink reference signals having the association relationship have a phase difference.

14. The method according to claim 12, wherein the third configuration information further indicates that the uplink reference signals having the association relationship share an antenna port or that the uplink reference signals having the association relationship have a phase difference.

15. The method according to claim 12, wherein a phase difference between the uplink reference signals having the association relationship is a fixed value.

16. The method according to claim 13, wherein the phase difference between the uplink reference signals having the association relationship is a fixed value.

17. The method according to claim 14, wherein the phase difference between the uplink reference signals having the association relationship is a fixed value.

18. The method according to claim 12, further comprising:

sending first information to the first network device;

wherein the first information is used to request the first network device to configure an uplink reference signal with a preset bandwidth, and the preset bandwidth is greater than 100 megahertz (MHz).

19. The method according to claim 12, further comprising:

receiving a measurement result from the second network device, wherein the measurement result is obtained by the second network device by measuring the uplink reference signals having the association relationship; and the measurement result includes indexes of resource sets in which the uplink reference signals having the association relationship are located and/or indexes of carriers on which the uplink reference signals having the association relationship are located.

* * * * *